United States Patent [19]

Sakai et al.

[11] Patent Number: 5,798,703
[45] Date of Patent: Aug. 25, 1998

[54] MAT SENSOR

[75] Inventors: Masayoshi Sakai; Koichi Futsuhara; Toshihito Shirai, all of Urawa, Japan

[73] Assignee: The Nippon Signal Co., Ltd., Tokyo, Japan

[21] Appl. No.: 809,168

[22] PCT Filed: Jun. 24, 1996

[86] PCT No.: PCT/JP96/01743

§ 371 Date: Feb. 28, 1997

§ 102(e) Date: Feb. 28, 1997

[87] PCT Pub. No.: WO97/01773

PCT Pub. Date: Jan. 16, 1997

[30] Foreign Application Priority Data

Jun. 29, 1995 [JP] Japan ................ 7-164317

[51] Int. Cl.$^6$ ................ G08B 21/00
[52] U.S. Cl. ................ 340/666; 340/522; 340/562; 340/573; 340/665; 340/667; 307/119; 307/139
[58] Field of Search ................ 340/666, 561, 340/562, 573, 575, 568, 665, 667, 521, 522; 200/86 A, 86 R, 85 R, 85 A, DIG. 35; 307/119, 116, 139

[56] References Cited

U.S. PATENT DOCUMENTS

| | | | |
|---|---|---|---|
| 4,661,880 | 4/1987 | Futsuhara | 361/93 |
| 4,757,417 | 7/1988 | Futsuhara | 361/86 |
| 5,027,114 | 6/1991 | Kawashima et al. | 340/941 |

FOREIGN PATENT DOCUMENTS

| | | | |
|---|---|---|---|
| 58-24721 | 5/1983 | Japan | G01B 7/08 |
| 59-175512 | 10/1984 | Japan | H01H 13/16 |
| 1-291178 | 11/1989 | Japan | G01R 31/02 |
| 5-97024 | 12/1993 | Japan | H01H 13/16 |
| WO 94/23303 | 10/1994 | WIPO | G01P 13/00 |
| WO 94/23496 | 10/1994 | WIPO | H03K 5/13 |

OTHER PUBLICATIONS

Japanese Search Report from PCT/JP96/01743, filed Jun. 24, 1996.

*Primary Examiner*—Nina Tong
*Attorney, Agent, or Firm*—Wolf, Greenfield & Sacks, P.C.

[57] ABSTRACT

The invention relates to a highly reliable mat sensor which can also detect temporary faults in a sensor portion. Two sensor portions are provided, and agreement or disagreement of an ON/OFF condition of the output from the two sensor portions is detected, and when the output conditions of the two sensor portions are in agreement, then a normal judgment signal for both sensor portions is generated. When the normal judgment signal is generated and the two sensor portions are OFF, an operation permit signal for a movable portion of a machine is generated. Moreover, the presence or absence of a body is detected from a change in value of the electrostatic capacity of one sensor portion. In this way, a temporary poor contact attributable to deterioration of the sensor portion can also be detected, and the movable portion of the machine can be stopped.

39 Claims, 28 Drawing Sheets

OPERATION PERMIT SIGNAL

MAT SENSOR

TECHNICAL FIELD

The present invention relates to a mat sensor for dangerous locations where a person and a machine work together to carry out work, for ensuring the safety of an operator by stopping the operation of the machine when the presence of the operator is detected.

BACKGROUND ART

For example, with operating systems using robots, a safety control which prevents operation of a movable portion of a robot when an operator is present in a danger region around the robot (robot operating region), is incorporated into the operating system as a safety measure for the operator.

As a person sensor for this type of safety control, a mat sensor laid at the periphery of the movable portion of the machine is used. Such a mat sensor is shown for example in European Standard prEN1760 (Machine safety—Pressure sensing protection device—Part 1: Pressure sensing mat and floor).

With this type of mat sensor, a flexible intermediate insulation material is disposed between two mutually opposed electrode plates, while the outside is covered by an insulated covering. The construction is such that when an operator stands on the mat sensor, the upper electrode plate is pressed and bent by foot pressure so that the mutually opposed electrode plates come into contact, thus closing a circuit, so that an output indicating the presence of the operator is produced. This present detection output is used to stop the movable portion of a robot, thus ensuring the safety of the operator.

With a mat sensor of this construction however, there are a problems in that at the locations which are frequently stood on by the operator, eventually the intermediate insulation material becomes caught between the electrode plates, and also the electrode plates become contaminated with dust and dirt, or a hole forms in the outside insulated covering so that the electrode plates become corroded. Moreover, when used for a long time, there is always the possibility of deterioration in the electrical contact condition between the electrode plates due to the above problems. If a good electrical contact condition can no longer be obtained, then an operator absent detection output is produced in spite of the fact that an operator is in the danger region, which is highly undesirable from the point of ensuring operator safety.

Moreover, rather than occurring uniformly over the flat surface of the mat, it is common for such problems to occur at one part on the surface of the mat, while at other parts the mat sensor operates normally. Furthermore when such deterioration phenomena of the mat is in a partially advanced state, then it is common for erroneous detection attributable to this mat deterioration to occur sporadically, and in ways which cannot be easily reproduced.

The present invention addresses the above problems, with the object of a first aspect of the present invention being to provide a highly reliable mat sensor which prevents the occurrence of erroneous detection outputs attributable to mat deterioration or the like, by having the sensor portion as a dual system, and detecting agreement or disagreement between output conditions from the two systems. Moreover the object of a second aspect of the present invention is to provide a highly reliable mat sensor at a low cost by having the sensor portion as a single system, and detecting a change in electrostatic capacity between the electrode plates.

DISCLOSURE OF THE INVENTION

To meet the above objectives, a mat sensor according to a first aspect of the present invention comprises: a mat shaped body detection device including a plurality of sensor portions with pairs of mutually facing electrode plates which are contacted when the pressure from a body acts from above, thus producing a body present detection signal, and which are separated when the pressure is released, thus producing a body absent detection signal, an agreement or disagreement detection device for detecting agreement or disagreement between detection signals from the sensor portions of the body detection device, a judgment device for generating a normal judgment signal for the body detection device when agreement detection information is input from the agreement or disagreement detection device, and stopping the normal judgment signal when disagreement detection information is input from the agreement or disagreement detection device, and a sensor output generating device for generating, on the condition that a normal judgment signal is being generated from the judgment device, a sensor output signal indicating the absence of a body, when the outputs from the respective sensor portions of the body detection device are body absent detection signals.

With such a construction, if the sensor portion is normal, then when all of the plurality of sensor portions are generating body absent detection signals, a signal indicating the absence of a body is generated from the sensor output generating device. Furthermore, in a worst case scenario where the detection outputs from the sensor portions disagree, then a sensor output indicating the absence of a body, as a result of abnormality of the mat sensor, is not generated.

The construction may be such that the body detection device comprises a single mat with the electrode plates of a first sensor portion made up of a plurality of electrode plate members connected together in series, and the electrode plates of a second sensor portion similarly made up of a plurality of electrode plate members connected together in series, and the electrode plate members of the first sensor portion and the electrode plate members of the second sensor portion arranged alternately and at a narrower spacing than the footprint width of a body, within an insulation member.

With such a construction, the mat can be finished as a single mat, so that the thickness of the sensor portion can be made thinner, and convenience of use thus improved.

Moreover, the body detection device may be constructed with an insulation plate incorporated into a peripheral portion of the mat, so that foot pressure acts simultaneously on an electrode plate member of the first sensor portion and an electrode plate member of the second sensor portion.

With such a construction, then in the case where a single mat has two sensor portions thereinside, the pressure from a body can be reliably made to act on the two sensor portions, even if this acts at the edge of the mat.

Moreover the body detection device may be constructed with electrode plate members having surface areas less than those of the respective electrode plate members of the first and second sensor portions arranged at the central portion of the mat, densely arranged at the peripheral portion of the mat.

With such a construction there is no problem of a drop in the sensitivity due to pressure distribution as with the case of the insulation plate, thus having the effect that the detection sensitivity at the peripheral portion of the mat can be improved compared to the case where an insulation plate is provided.

Moreover, the construction may be such that the body detection device is constructed with a DC power source connected to one lead of a first electrode plate of the first sensor portion, and an other lead of the first electrode plate and one lead of a second electrode plate connected together via a first resistor, and one lead of a first electrode plate of the second sensor portion connected to one lead of a second electrode plate via a second resistor, and an other lead of the second electrode plate of the first sensor portion and an other lead of the first electrode plate of the second sensor portion connected together in series, and an other lead of the second electrode plate of the second sensor portion made a detection output terminal, and the agreement or disagreement detection device incorporates: a first window comparator with a first threshold value range set such that when the voltage of the detection output terminal when the respective first and second electrode plates of the first and second sensor portions are contacted simultaneously is input, an agreement detection output signal of logic value 1 is produced; a second window comparator with a second threshold value range set such that by input of a detection output terminal voltage for when the respective first and second electrode plates of the first and second sensor portions are separated simultaneously, an agreement detection output signal of logic value 1 is produced; and a first logical sum operating device for carrying out a logical sum operation on the respective output signals from the first and second window comparators, and the output signal from the first logical sum operating device is output to the judgment device, and the output signal from the second window comparator is output to the sensor output generating device.

With such a construction, a body presence or absence sensor output can be obtained using window comparators.

Furthermore, the construction may be such that the body detection device has: an AC signal source connected between the one leads of the respective electrode plates of the first and second sensor portions; first light emitting elements for ON detection of the sensor portions connected in parallel between the AC signal source and the respective sensor portions; second light emitting elements for OFF detection of the sensor portions connected in reverse current directions to the first light emitting elements between the other leads of the respective electrode plates of the first and second sensor portions; and first and second light receiving elements which respectively form photocouplers with the first and second light emitting elements of the respective sensor portions, and the agreement or disagreement detection device comprises: a first logical product operating device for carrying out a logical product operation on the output signals from the respective first light receiving elements of the first and second sensor portions; a second logical product operating device for carrying out a logical product operation on the output signals from the respective second light receiving elements of the first and second sensor portions; and a second logical sum operating device for carrying out a logical sum operation on the output signals from the first logical product operating device and the second logical product operating device, and the output signal from the second logical sum operating device is output to the judgment device, and the output signal from the second logical product operating device is output to the sensor output generating device.

With such a construction, photocouplers can be used.

Moreover, the construction may be such that the body detection device is constructed with: one lead of the first electrode plate of the first sensor portion connected to a positive pole of a signal generator via a third resistor, the other lead of the first electrode plate connected to one lead of the first electrode plate of the second sensor portion via a fourth resistor, and one lead of the second electrode plate of the first sensor portion connected to the other lead of the first electrode plate of the second sensor portion via a series circuit of a third light emitting element and a fifth resistor, and the other lead of the second electrode plate of the first sensor portion connected to one lead of the second electrode plate of the second sensor portion via a sixth resistor, and the other lead of the second electrode plate of the second sensor portion connected to a negative pole of the signal generator; a series circuit of a seventh resistor and fourth and fifth light emitting elements with current directions opposite to that of the third light emitting element connected in parallel with the series circuit of the third light emitting element and fifth resistor; and has third through fifth light receiving elements which respectively form photocouplers with the third through fifth light emitting elements of the respective sensor portions; and the agreement or disagreement device comprises a third logical sum operating device for carrying out a logical sum operation on the output signals from the third and fourth light emitting elements, and the output signal from the third logical sum operating device is output to the judgment device, and the output signal from the fifth light receiving element is output to the sensor output generating device.

With such a construction, the number of photocouplers can be reduced and the circuit thus simplified.

Furthermore, the construction may be such that there is provided a current monitoring device for detecting whether or not a current equal to or greater than a predetermined level is being supplied to the first and second sensor portions, and a third logical product operating device for carrying out a logical product operation on the output signal from the current monitoring device and the output signal from the third logical sum operating device, and the output signal from the third logical product operating device is output to the judgment device.

With such a construction, in the case where the contact resistance of the electrode plates becomes large due to influence of an oxidation film on the electrode plate surfaces, the normal judgment signal is stopped, and hence the reliability of the mat sensor can be improved.

Moreover, the construction may be such that the first and second sensor portions of the body detection device are connected in parallel with the AC signal source, and the agreement or disagreement detection device has two current detection devices for detecting the currents respectively flowing in the first sensor portion and second sensor portion, and a fifth logical product operating device for carrying out a logical product operation on the output signals from the respective current detection devices, and the output signal from the fourth logical product operating device and the output signal from the fifth logical product operating device are subjected to a logical sum operation by the fourth logical sum operating device.

With such a construction, the current supplied to one of the sensor portions is not influenced by the ON/OFF switching of the other sensor portion, and hence the influence from oxidation film on the electrode plate surfaces can be even more reliably judged, and the reliability of the mat sensor even further improved.

Moreover, the construction may be such that the body detection device has a third sensor portion with a pair of mutually facing electrode plates which are contacted when a body pressure acts .on a peripheral portion of the mat, thus producing a body present detection signal, and which are separated when the body pressure is released, thus producing a body absent detection signal, and the agreement or disagreement detection device outputs to the judgment device an output from a logical sum operation on a body present detection signal from the third sensor portion and the agreement or disagreement detection information from the first and second sensor portions, and an output from a logical product operation on body absent detection signals from the first through third sensor portions is output to the sensor output generating device.

With such a construction, with a mat sensor wherein two sensor portions are incorporated into a single mat, when an edge of the mat is stood on so that the third sensor portion is contacted, a normal judgment signal unrelated to the detection signals from the first and second sensor portions is produced. It is thus possible to prevent the situation where the edge of the mat is stood on and only one of the first and second sensor portions is contacted, so that in spite of the sensor portion being normal, a sensor portion disagreement signal is produced. Hence the convenience of using the mat sensor is improved.

sensor portion with a pair of mutually facing electrode plates which are contacted when a body pressure acts on a peripheral portion of the mat, thus producing a body present detection signal, and which are separated when the body pressure is released, thus producing a body absent detection signal, and power is respectively supplied to the first sensor portion and second sensor portion via the electrode plates of the third sensor portion.

With such a construction, there is no special requirement for a circuit for detecting contact or non contact of the electrode plates of the third sensor portion. Hence the simplification of the circuit configuration wherein the third sensor portion is provided is improved.

Moreover, the judgment device may be constructed such that when agreement detection information is input thereto from the agreement or disagreement detection device, the agreement detection information is self held by switching on a manual switch, and a normal judgment signal for the body detection device is then generated based on the self hold information, the manual switch is switched OFF, and when disagreement detection information is input thereto from the agreement or disagreement detection device, the self hold is released and the normal judgment signal is stopped.

With such a construction, if the mat sensor once shows abnormal, then provided that the manual switch is not again operated, a sensor output indicating the presence of a body is not produced. Consequently, assurance of operator safety is considerably improved.

Furthermore, the construction may be such that the judgment device comprises: a second self hold circuit with the power source voltage input to a reset terminal, and a power source voltage signal applied to a trigger terminal via an ON contact point of a second manual switch linked to a first manual switch, and an output therefrom fed back to the trigger terminal; a display device which is illuminated with an output of logic value 1 from the second self hold circuit; and a seventh logical product operating device for carrying out a logical product operation on a power source voltage signal input via an OFF contact point of the second manual switch and the logical product output from the sixth logical product operating device, and the output from the seventh logical product operating device is made the normal judgment signal.

With such a construction, it can be advised whether extinction of the output from the judgment device results from a disagreement in the operation of the sensor portions, or due to a drop in power source voltage (for example, the power source going OFF).

Moreover, the construction may be such that the agreement or disagreement detection device comprises timer device for measuring running time when the detection signals from the respective sensor portions are in disagreement, and outputting disagreement detection information to the judgment device when this time continues for more than a predetermined time.

With such a construction, any time difference in the generation of the detection outputs from the plurality of sensor portions can be absorbed, enabling an improvement in the safety of operation of the mat sensor.

Furthermore, the construction may be such that the agreement or disagreement device comprises: an eighth logical product operating device for generating an output of logic value 1 when high level outputs of logic value 1 respectively generated from first and second sensor portions when the pressure of a body acts thereon are simultaneously input; a NOT operating device for carrying out a NOT operation on the logical outputs from the first and second sensor portions; and a fifth logical sum operating device for carrying out a logical sum operation on both of the outputs from the eighth logical product operating device and the NOT operating device, and the output signal from the fifth logical sum operating device is output to the judgment device, and the output signal from the eighth logical product operating device is output to the sensor output generating device.

With such a construction, a sensor output can be produced using only the body absent detection signal from the sensor portion, and hence the circuit construction can be simplified.

Moreover, the body detection device may be constructed with a positive pole of a DC power source connected to one lead of the first electrode plate of the first sensor portion, a first electromagnetic relay disposed in series between the other lead of the first electrode plate and one lead of the second electrode plate, a second electromagnetic relay disposed in series between one lead of the first electrode plate and one lead of the second electrode plate of the second sensor portion, the other lead of the second electrode plate of the first sensor portion and the other lead of the first electrode plate of the second sensor portion connected in series, and the other lead of the second electrode plate of the second sensor portion connected to the negative pole of the DC power source via a resistor. The agreement or disagreement detection device may be constructed with a first series circuit of first make contact points of the first electromagnetic relay and first make contact points of the second electromagnetic relay, and a second series circuit of break contact points of the first electromagnetic relay and break contact points of the second electromagnetic relay connected in parallel. The judgment device may comprise a third electromagnetic relay, a manual switch and a fourth electromagnetic relay, and be constructed with a series circuit of the third electromagnetic relay and the ON contact points of the manual switch connected in series to the first and second series circuits, and first make contact points of the third electromagnetic relay connected in parallel with the ON contact points of the manual switch to give self hold contact points for the third electromagnetic relay, and a series circuit of the fourth electromagnetic relay, second make contact points of the third electromagnetic relay, and the OFF contact points of the manual switch connected in parallel with the first and second series circuits and the third electromagnetic relay. The sensor output generating device may comprise a series circuit of the second make contact points of the first electromagnetic relay, the second make contact points of the second electromagnetic relay, and the make contact points of the fourth electromagnetic relay.

With such a construction, electromagnetic relays can be used.

Moreover, in the case where a electromagnetic relay which is not susceptible to fusion faults is used, then the body detection device may be constructed with the first and second sensor portions connected in parallel with an AC signal source, a fifth electromagnetic relay connected between the first and second electrode plates of the first sensor portion via a first rectifying circuit, a primary side coil of a first transformer connected in series between the first sensor portion and the AC signal source, a sixth electromagnetic relay connected to a secondary side coil of the first transformer via a second rectifying circuit, a seventh electromagnetic relay connected between the first and second electrode plates of the second sensor portion via a third rectifying circuit, a primary side coil of a second transformer connected in series between the second sensor portion and the AC signal source, and an eighth electromagnetic relay connected to the secondary side coil of the second transformer via a fourth rectifying circuit. The agreement or disagreement detection device may be constructed with a series circuit of first make contact points of the fifth electromagnetic relay and first make contact points of the seventh electromagnetic relay, and a series circuit of first make contact points of the sixth electromagnetic relay and first make contact points of the eighth electromagnetic relay connected in parallel. The judgment device may comprise a ninth electromagnetic relay and a manual switch, and be constructed with a series circuit of the ninth electromagnetic relay and the ON contact points of the manual switch connected in series to the parallel circuit of the series circuit of the two first make contact points of the fifth and seventh electromagnetic relays, and the series circuit of the two first make contact points of the sixth and eighth electromagnetic relays, the first make contact points of the ninth electromagnetic relay connected in parallel with the ON contact points of the manual switch to give a self hold contact points for the ninth electromagnetic relay. The sensor output generating device may be constructed with the OFF contact points of the manual switch connected in series to a series circuit of respective second make contact points of the fifth electromagnetic relay, seventh electromagnetic relay and ninth electromagnetic relay.

With such a construction there is the advantage in that the circuit can be simplified compared to the case using electromagnetic relays where fusion faulting must be taken into consideration.

Furthermore, the construction may be such that the electrode plate materials for the plurality of sensor portions are respectively different.

With such a construction it is possible to avoid the situation where two sensor portions have similar faults at the same time under the same operating conditions, thus enabling a substantial reduction in the frequency of erroneous detection of agreement or disagreement, and a further improvement in the reliability of the mat sensor.

A mat sensor according to a second aspect of the present invention comprises: a mat shaped body detection device including a sensor portion with a pair of mutually facing electrode plates which are contacted when the pressure from a body acts from above, and which are separated when the pressure is released, an electrostatic capacitance value detection device for detecting a change in electrostatic capacitance value based on a change in spacing between the electrode plates of the sensor portion of the body detection device, and a sensor output generating device for generating a sensor output indicating the presence or absence of a body based on the detection results from the electrostatic capacitance value detection device.

With such a construction, it is possible to detect sensor portion abnormalities including poor contact and the like, even with the sensor portion as a single layer system. Consequently the circuit configuration of the mat sensor can be simplified, and cost reduced.

The construction may be such that the sensor output generating device comprises: a first rectifying device for rectifying an output from a parallel resonance circuit; a first level detection device for generating an output of logic value 1 when the rectified output from the first rectifying device is equal to or greater than a predetermined level; a first AC amplifying device for amplifying the rectified output from the first rectifying device and for magnifying along a time axis the change in the rectified output from the first rectifying device when the electrode plates of the sensor portion change from a separated condition to a contacted condition; a second level detection device for generating an output when the amplified output from the first AC amplifying device is equal to or greater than a predetermined level; and a first logical product operating device for carrying out a logical product operation on both of the outputs from the first and second level detection devices, and an output of logic value 1 from the first logical product operating device is made the sensor output indicating the absence of a body.

With such a construction, a sensor output indicating the absence of a body can be reliably stopped when the sensor portion is contacted, even in the case where the sensor portions is rapidly cycled repeatedly between the contacted and separated conditions (chattering and the like).

Moreover, the construction may be such that the sensor output generating device comprises: poor contact checking device for checking for the presence of poor contact of the electrode plates of the sensor portion and generating an output of logic value 1 when there is no poor contact, a first logical sum operating device for carrying out a logical sum operation on the output from the poor contact checking device and an output from a second logical product operating device, a first self hold device which generates an output when an input signal of logic value 1 is applied to a trigger terminal while the logical sum output from the first logical sum operating device is being input to a reset terminal, and self holds the trigger input signal, and a third logical product operating device for carrying out a logical product operation on the output from the first self hold device and the output from the second logical product operating device, and an output of logic value 1 from the third logical product operating device is made the sensor output.

With such a construction, poor contact of the electrode plates can be reliably detected irrespective of changes in the design of the circuit, even in the case of a change in the electrode plate area of the sensor portion.

Furthermore, the construction may be such that the sensor output generating device comprises: a poor contact checking device for checking for the presence of poor contact of the electrode plates of the sensor portion and generating an output of logic value 1 when there is no poor contact, an off-delay device for delaying a drop in the output from the poor contact checking device for a predetermined time, and a second self hold device with the output from the off-delay circuit input to the trigger terminal and the output from the second logical product operating device input to the reset terminal, with the output fed back to the trigger terminal, and an output of logic value 1 from the second self hold circuit is made the sensor output.

With such a construction, at the time of first using the mat sensor, a sensor output is not generated until first verified that a poor contact has not occurred in the sensor portion. Hence the mat sensor can only be used when normal, and operator safety is thus achieved.

Furthermore, the sensor output generating device may be constructed such that a drop in an output of a logical sum of the output from the poor contact checking device which checks for the presence of poor contact of the electrode plates of the sensor portion and generates an output of logic value 1 when there is no poor contact, and the output from the second logical product operating device, is delayed for a predetermined time by an off-delay device, and an output from the off-delay device is self held by switching on a manual switch, and a normal detection signal of the sensor portion is generated based on the self hold output when the manual switch is switched OFF, and an output of a logical product operation on the normal judgment signal and the output from the second logical product operating circuit is made the sensor output.

With such a construction, when a poor contact is present in the sensor portion, then if once the presence of a poor contact portion is detected so that the operation permit signal stops, the operation permit signal remains fixed at the stop side. Hence the presence of poor contact is not overlooked.

BRIEF DESCRIPTION OF THE DRAWINGS

FIG. 14 (B) is a circuit diagram of an agreement or disagreement detection device, and a judgment device of the eighth embodiment;

FIG. 14 (C) is a circuit diagram of a sensor output generating device of the eighth embodiment;

FIG. 15 (B) is a circuit diagram of an agreement or disagreement detection device, a judgment device, and a sensor output generating device of the ninth embodiment;

FIG. 16 (B) is a circuit diagram of an agreement or disagreement detection device, a judgment device, and a sensor output generating device of the tenth embodiment;

FIG. 17 (B) is a side view of FIG. 17 (A);

BEST MODE FOR CARRYING OUT THE INVENTION

As follows is a description of embodiments of the present invention with reference to the drawings.

Figure 1:
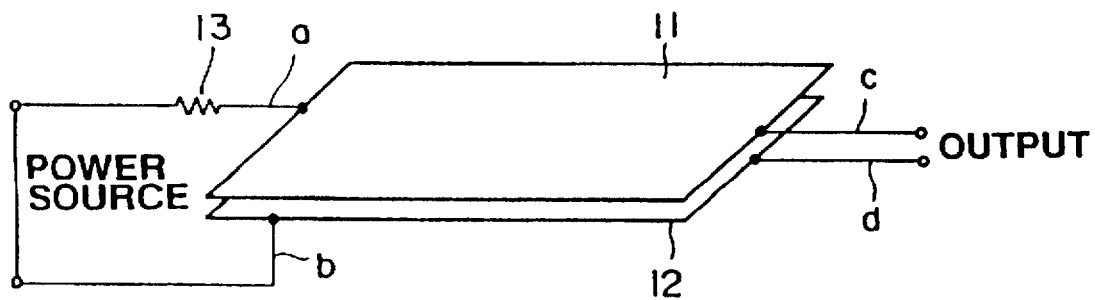
FIG. 1 is a schematic diagram showing a configuration for a sensor portion applicable to the present invention.
Figure 2:
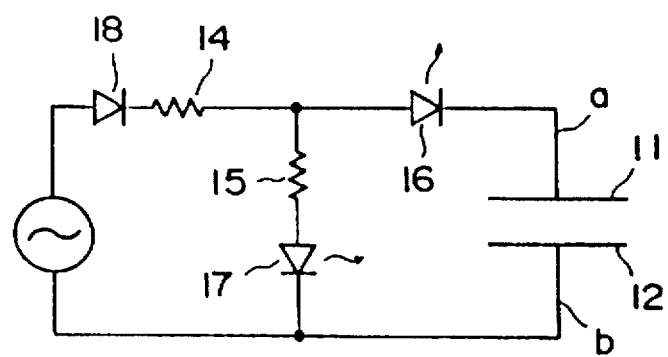
FIG. 2 is a schematic diagram showing another configuration for a sensor portion applicable to the present invention.

FIG. 1 and FIG. 2 show an example of a circuit configuration for a sensor portion applicable to a mat sensor of the present invention.

In FIG. 1, a pair of planar electrode plates 11, 12 facing each other in spaced apart relation, have respectively connected thereto two pairs of leads a, b and c, d making a total of four leads. A current is supplied between the electrode plates 11, 12 from a power source via a current reducing resistor 13 and the leads a, b, while an output current is sampled from the leads c, d. When the pressure from a body does not act from above, a voltage appears between the leads c, d, while when a pressure acts so that there is contact between the electrode plates 11, 12, and the leads a, b are short circuited, then a voltage does not appear between the leads c, d. With the sensor portion of the construction of FIG. 1, since four leads are connected to the electrodes comprising the pair of electrode plates 11, 12, then this is referred to as a four lead type.

With the sensor portion as shown in FIG. 2, since only two leads a, b are connected to the electrodes comprising the pair of electrode plates 11, 12, then this is referred to as a two lead type. In FIG. 2, numerals 14, 15 denote resistors, 16, 17 denote light emitting diodes, while 18 denotes a diode for improving peak inverse voltage. With this sensor portion, the construction is such that when the electrode plates 11, 12 are contacted due to pressure from a body, then the light emitting diode 16 emits light, while when the pressure is released so that the electrode plates 11, 12 separate, then the light emitting diode 17 emits light.

Figure 3:
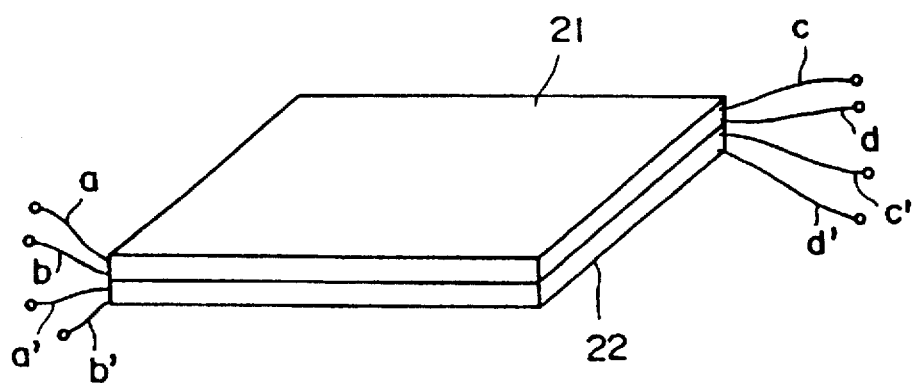
FIG. 3 is a layout diagram of a sensor portion of a first embodiment of the present invention.
Figure 4:
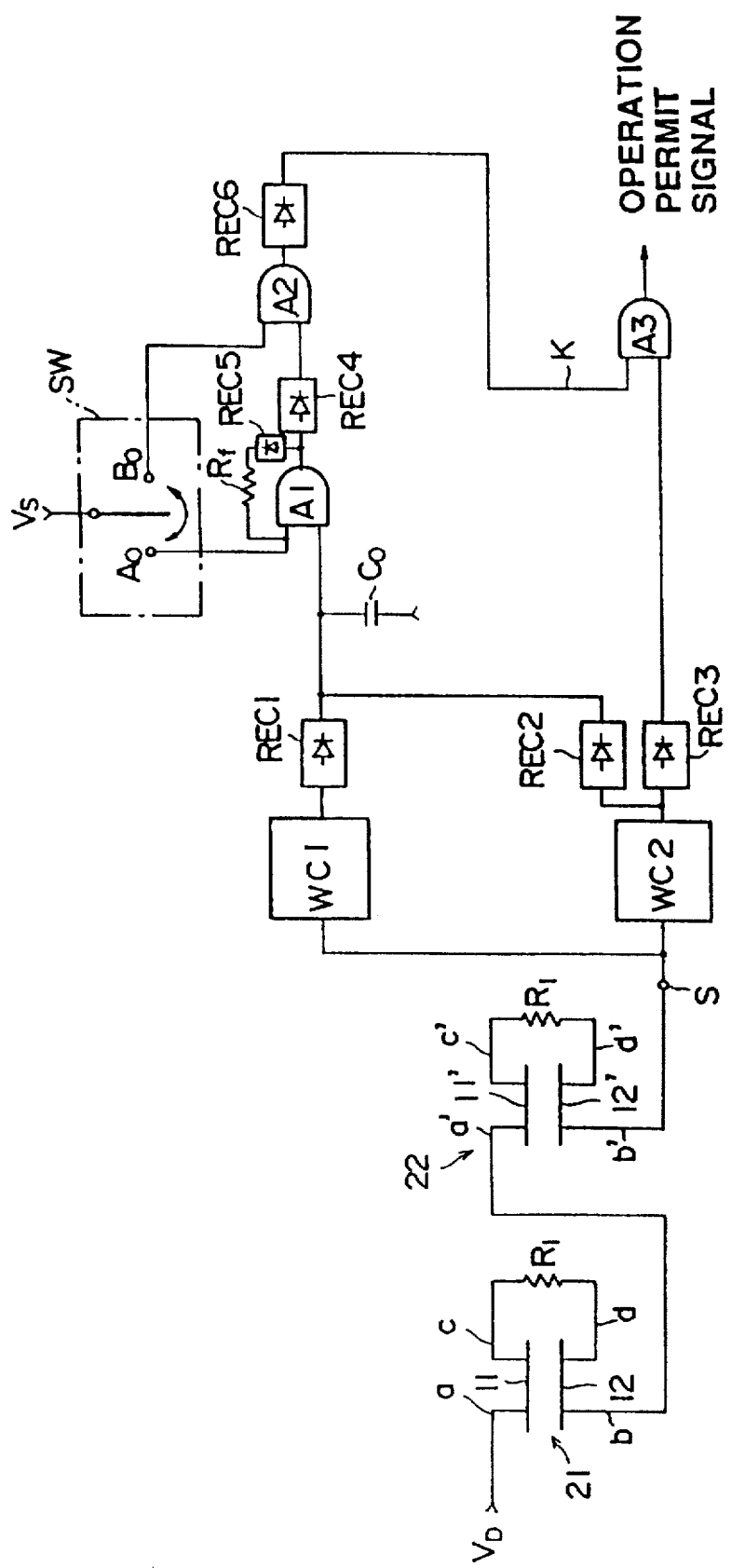
FIG. 4 is an overall circuit diagram of the first embodiment.

Next is a description of a first embodiment of a mat sensor according to a first aspect of the present invention, as shown in FIG. 3 and FIG. 4, wherein sensor portions constructed using the four lead construction of FIG. 1 are formed as a dual system. FIG. 3 shows a construction of a sensor portion of the embodiment. A first sensor portion 21 and a second sensor portion 22 are respectively formed in a mat shape, and are laid on top of each other as a first and second mat. The respective sensor portions 21, 22 are of the four lead construction as shown in FIG. 1, and as with the conventional arrangement, a pair of electrode plates 11, 12 are supported in spaced apart relation by means of a flexible intermediate insulation material, with the outside covered by a covering insulation material. The sensor portion is laid in a movable region for a movable portion of a machine such as a robot, where danger would arise if an operator were to enter when the machine was operating.

FIG. 4 shows a circuit configuration for the first embodiment.

In FIG. 4, a lead a of a first electrode plate 11 of the first sensor portion 21 is connected to a DC power source (not shown in the figure) so that a voltage $V_D$ is applied thereto. A lead c of the first electrode plate 11 and a lead d of a second electrode plate 12 are connected together by a resistor $R_1$ serving as a first resistor. A lead b of the second electrode plate 12 is connected to a lead a' of a first electrode plate 11' of the second sensor portion 22. Another lead c' of the first electrode plate 11' of the second sensor portion 22 is connected to a lead d' of a second electrode plate 12' via a resistor R2 serving as a second resistor of the same resistance value as the resistor R1, while a lead b' of the second electrode plate 12' is connected to an input terminal for first and second window comparators WC1, WC2, serving as a detection output terminal S of the sensor portion. Here the sensor portions 21, 22 constitute a body detection device.

The outputs from the window comparators WC1, WC2 are rectified by voltage doubler rectifying circuits REC1, REC2 and REC3. The rectified outputs from the voltage doubler rectifying circuits REC1, REC2 are wired-OR connected, and the resultant logical sum signal is input to one input terminal of an AND gate A1 via an OFF-delay circuit serving as a timer device comprising a capacitor $C_o$, for measuring whether or not disagreement in the operation of the sensor portions 21, 22 has continued for a predetermined time or more. With the other input terminal of the AND gate A1, a power source voltage $V_S$ can be input via an ON contact point $A_o$ of a first manual switch SW. The output from the AND gate A1 is input to one input terminal of an AND gate A2 corresponding to a sixth logical product operating device, via a voltage doubler rectifying circuit REC4, while with the other input terminal of the AND gate A2, the power source voltage $V_S$ can be input via an OFF contact point $B_o$ of the manual switch SW. Moreover, the output from the AND gate A1 is fed back to the power source voltage $V_S$ input terminal, via a voltage doubler rectifying circuit REC5 and a feedback resistor Rf. Consequently, the AND gate A1, the voltage doubler rectifying circuit REC5 and the feedback resistor Rf constitute a first self hold circuit with the input terminal for the logical sum signal as a reset terminal, and the input terminal for the power source voltage $V_S$ as a trigger terminal.

The output from the AND gate A2 is input via a voltage doubler rectifying circuit REC6 to an AND gate A3 serving as a ninth logical product operating device. Moreover, a rectified signal from the voltage doubler rectifying circuit REC3 of the window comparator WC2 is input to the AND gate A3, and a logical product operation carried out on both inputs.

The first and second window comparators WC1, WC2, the voltage doubler rectifying circuits REC1–REC3, the wired-OR connection portion corresponding to the first logical sum operating device, and the capacitor $C_o$, constitute an agreement or disagreement detection device, the AND gates A1, A2, the voltage doubler rectifying circuits REC4–REC6, and the manual switch SW, constitute a judgment device, while the AND gate A3 constitutes a sensor output generating device.

Here the window comparators WC1, WC2 are fail-safe window comparators made up of a plurality of resistors and transistors, so as to generate an oscillation output of logic value 1 only when the input signal level is within a predetermined range, and give an output of logic value 0 at the time of a fault. Moreover, the AND gates A1–A3 can be constructed using these window comparators. Such a fail-safe window comparator AND gate is known for example from U.S. Pat. No. 4,661,880, and International Patent Publication Nos. WO94/23303, and WO94/23496.

Figure 5:
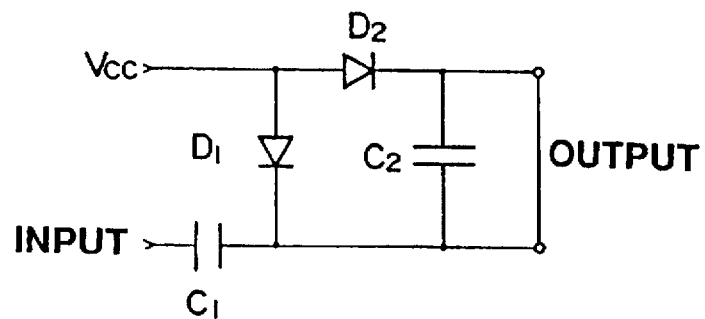
FIG. 5 is a circuit diagram of a voltage doubler rectifying circuit applicable to the first embodiment.

The voltage doubler rectifying circuit is constructed as shown in FIG. 5 from two diodes D1, D2, and two capacitors C1, C2, such that the input signal is superimposed with a constant voltage $V_{cc}$. Such as circuit is known for example from U.S. Pat. No. 5,027,114, and International Patent Publication No. WO94/23303.

The self hold circuit using the fail-safe AND gate is known for example from U.S. Pat. Nos. 4,757,417, 5,027, 114, and International Patent Publication Nos. WO94/23303, and WO94/23496.

The operation will now be explained.

When an operator enters the region where the mat shaped sensor portions 21, 22 are laid, and stands on the sensor portions 21, 22 so that the foot pressure causes contact (ON) between the electrode plates 11, 12 and 11', 12' of the sensor portions 21, 22, then the resistors $R_1$, $R_2$ are short circuited. On the other hand, when the foot pressure is released so that the electrode plates 11, 12 and 11', 12' are separated (OFF), then the two resistors $R_1$, $R_2$ are connected in series. Moreover, in the case where due to some fault in the sensor portion one or other of the sensor portions 21 or 22 becomes contacted in spite of there being no foot pressure, then only one of the resistors R1, R2 is short circuited.

The relation between the condition of the respective sensor portions 21, 22 and the voltage $V_o$ of the detection output terminal S of the sensor portion (corresponding to the input voltage of the window comparator) is as follows, with Ri as the input resistance for the window comparators WC1, WC2. R indicates the resistance value of the resistors $R_1$, $R_2$.

Both sensors ON: $V_o=V_D$

One ON: $V_o=[Ri/(R+Ri)]V_D$

Both sensors OFF: $V_o=[Ri/(2R+Ri)]V_D$

Figure 6:
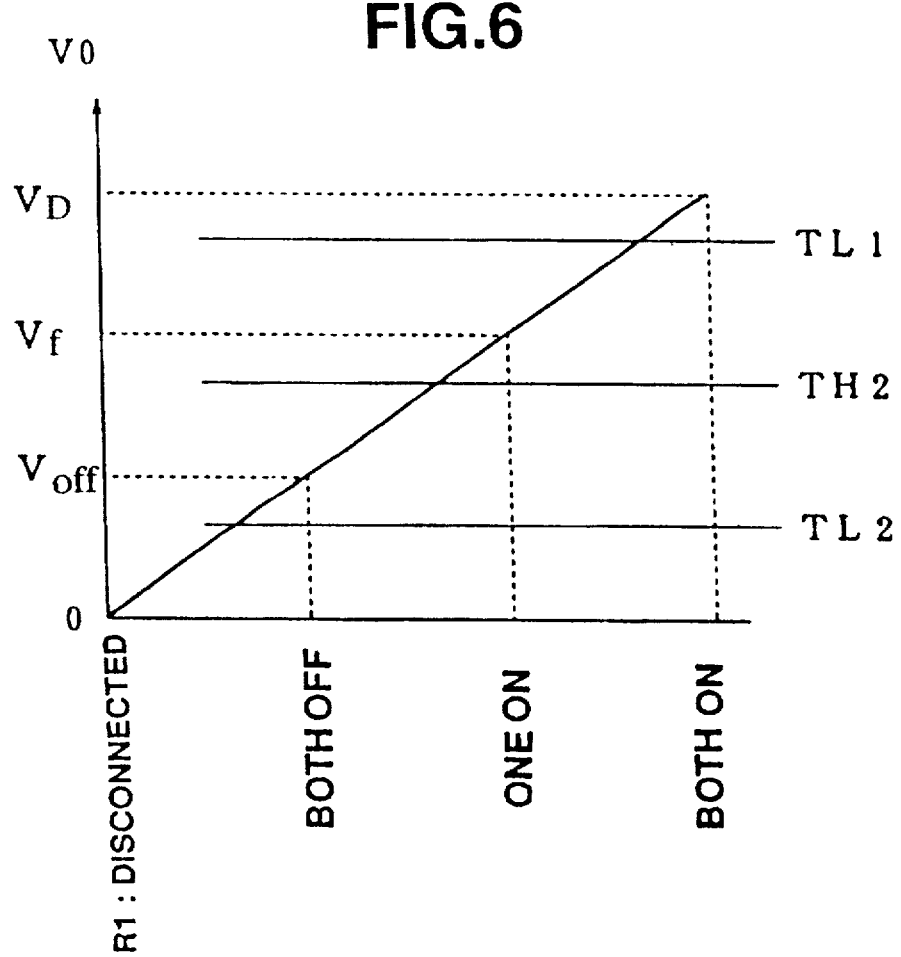
FIG. 6 is a diagram showing the relationship between output voltage of the sensor portion and threshold value of respective window comparators, of the first embodiment.

Here with $V_{ON}$ as the voltage for when both sensor portions are ON, $V_f$ as the voltage for when one sensor portion is ON, and $V_{OFF}$ as the voltage for when both sensor portions are OFF, then the relation between a lower limit threshold value TL1 corresponding to a first threshold value range of the first window comparator WC1 (the upper limit threshold value is a sufficiently high value), and an upper limit threshold value TH2 and a lower limit threshold value TL2 corresponding to a second threshold value range of the second window comparator WC2, is shown in FIG. 6.

From FIG. 6 it can be seen that the first window comparator WC1 generates an output voltage signal when the sensor portions 21, 22 are both ON, that is to say when there is foot pressure, while under other conditions, and with a disconnection of the resistors R1, R2, since the input voltage Vo falls below the threshold value TL1, then an output voltage signal is not produced. The second window comparator WC2 generates an output voltage signal when both sensors 21, 22 are OFF, that is to say when there is no foot pressure, while under other conditions, and with a disconnection of the resistors R1, R2, the input voltage Vo falls outside the threshold value range of the upper limit threshold value TH2 and the lower limit threshold value TL2 so that an output voltage signal is not produced.

Consequently, when the operation of both sensors 21, 22 is in agreement, then an output signal is generated from one or other of the first and second window comparators WC1, WC2, while when the operation of both sensors 21, 22 is in disagreement, then an output signal is not produced from either of the window comparators WC1, WC2.

When an output signal is generated from one or other of the window comparators WC1 or WC2, then the input level of the reset terminal of the AND gate A1 becomes a logic value 1. In this condition, if the manual switch SW is switched to the ON contact point $A_o$ side, then the power source voltage $V_s$ is applied to the trigger terminal of the AND gate A1 so that an oscillation output signal of logic value 1 is generated from the AND gate A1, and input to the AND gate A2 via the voltage doubler rectifying circuit REC4, and at the same time, is fed back to the trigger terminal to self hold the oscillation output signal. After this, if the manual switch SW is switched to the OFF contact point $B_o$ side, then the power source voltage $V_s$ is applied to the AND gate A2 so that an oscillation output signal of logic value 1 is generated from the AND gate A2 and input to the AND gate A3 via the voltage doubler rectifying circuit REC6. That is to say, only when it is verified that the sensor portions 21, 22 are normal, then an oscillation output signal is generated from the AND gate A1 with the switching ON of the manual switch SW, and the oscillation output signal is self held with the switching OFF of the manual switch SW, a judgment signal K indicating that the sensor portion is normal, is generated based on the oscillation output signal from the AND gate A2.

With the judgement signal K being input to the AND gate A3, then if a detection signal from the second window comparator WC2 indicating that the sensors 21, 22 are both OFF is input to the AND gate A3 via the voltage doubler rectifying circuit REC3, then an oscillation output signal of logic value 1 indicating that an operator is not present, is generated from the AND gate A3. The output signal of logic value 1 from the AND gate A3 is then used as an operation permit signal for a movable portion of a robot.

Moreover, when an operator steps onto the sensor portion so that the sensor portions 21, 22 both come ON, or when the operation of the sensor portions 21, 22 is in disagreement, then an output signal is not generated from the second window comparator WC2, and hence an oscillation output signal is not generated from the AND gate A3 (logic value 0), so that the operation permit signal is stopped, and the operation of the movable portion of the robot is promptly stopped.

Figure 7:
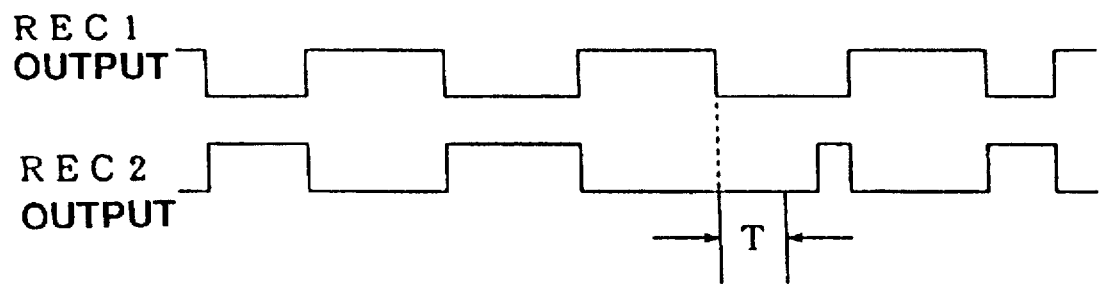
FIG. 7 is a diagram for explaining the operation of an off-delay circuit.

Furthermore, provided that the sensor portions 21, 22 are operating normally, then as shown in FIG. 7, an output signal is generated from one or other of the voltage doubler rectifying circuits REC1, REC2, while when the operation of the sensor portions 21, 22 is in disagreement and there is a time lapse in excess of a predetermined time T, then the discharge voltage level of the capacitor Co becomes lower than the oscillation threshold value level of the reset terminal of the AND gate A1 so that the self hold of the AND gate A1 is released and the oscillation output signal stops, thus cancelling the judgment signal K. That is to say, when the operation of the sensor portions 21, 22 is in disagreement, then after elapse of a time of or greater than a predetermined time, it is judged that the operation of the sensor portions is in disagreement, and the operation permit signal from the AND gate A3 is stopped.

The reason for having this time delay is to stop erroneous operation accompanying the time difference from when the foot pressure acts until the upper sensor portion 21 and the lower sensor portion 22 come ON. By providing an OFF-delay circuit using the capacitor Co, then the operational stability of the mat sensor of the present embodiment can be increased.

If the output signal from the AND gate A1 is once stopped, then provided that the manual switch SW is not switched ON again, an operation permit signal will not be generated from the AND gate A3. Therefore, with the sensor portions 21, 22, even if there is a temporary abnormality followed by immediate return to normal, provided someone such as the operator does not operate the manual switch SW, then the movable portion of the robot will not move. Hence danger such as where unexpectedly the movable portion of the robot suddenly moves due to automatic generation of an operation permit signal, can be prevented.

With this arrangement, the two sensor portions 21, 22 are laid on top of each other and agreement or disagreement in the operation of the two sensor portions 21, 22 is detected, and when in agreement, this normal information is self held as normal by a manual operation. Once the sensor portion shows an abnormality, the self hold of the normal information is released, and provided the manual operation is not repeated, a detection signal for non presence of the operator is not generated. Therefore guarantee of operator safety is remarkably improved compared to with the conventional mat sensor.

Figure 8:
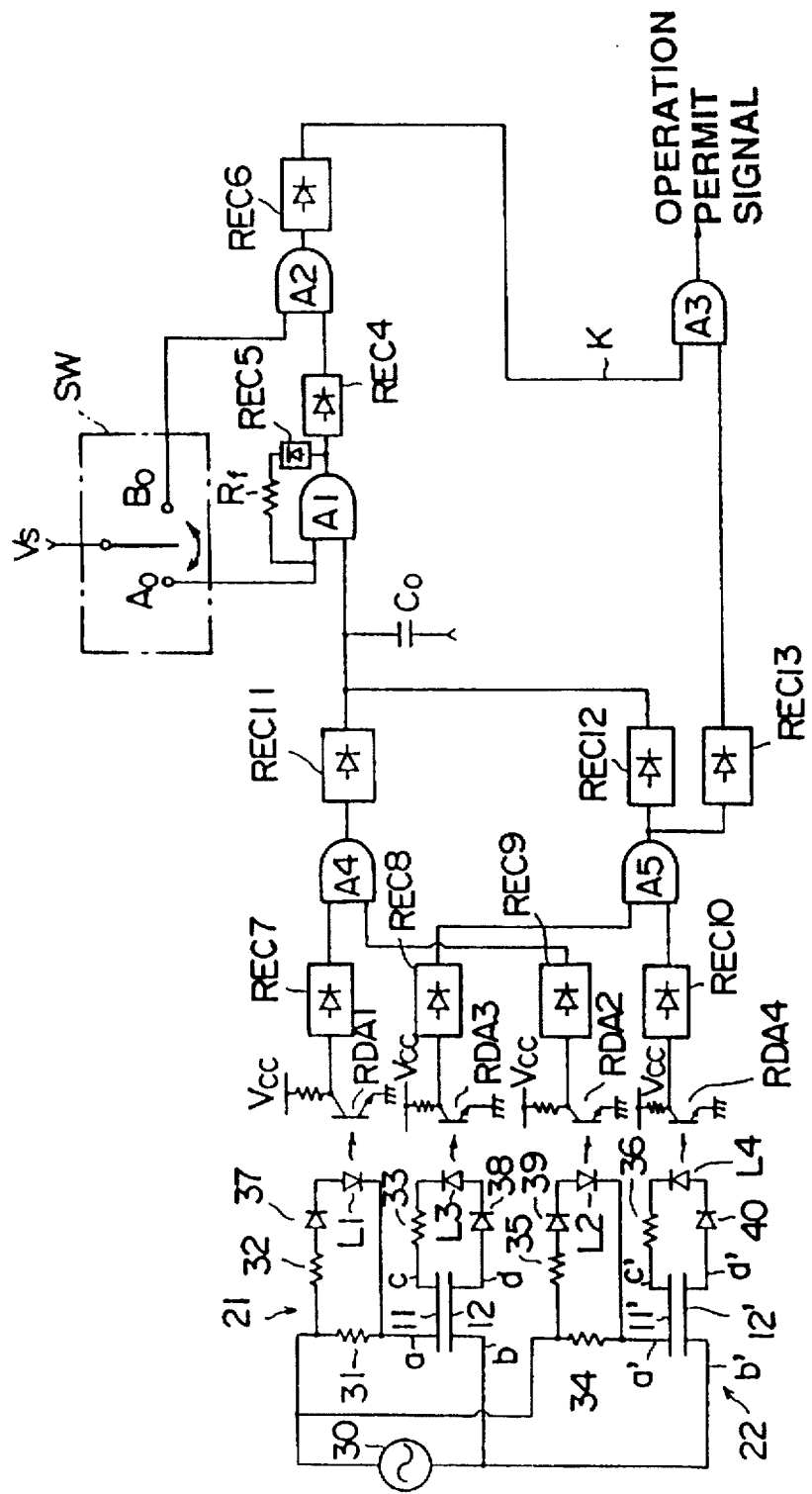
FIG. 8 is an overall circuit diagram of a second embodiment of the present invention.

FIG. 8 shows a second embodiment of the present invention.

FIG. 8 is an example for when the ON/OFF signal from a sensor portion of the four lead type is sampled using a photocoupler. Components the same as for the first embodiment are denoted by the same symbols, and description is omitted.

In FIG. 8, an AC power source 30 (AC signal source) supplies AC power to respective electrode plates 11, 12 and 11', 12' of sensor portions 21 and 22. Light emitting diodes L1, L2 serving as first light emitting elements for detecting when the sensor portions are ON, are connected in parallel between the AC power source 30 and respective sensor portions 21, 22. Light emitting diodes L3, L4 for detecting when the sensor portions are OFF, are connected between the respective electrode plates 11, 12 and 11', 12' of the respective sensor portions 21, 22 in reverse current directions to the light emitting diodes L1, L2. Numerals 31–36 denote resistors, while numerals 37–40 denote diodes which are inserted for improving the peak inverse voltage of the respective light emitting diodes L1–L4. Furthermore, photodiodes RDA1, RDA2 serving as first light receiving elements which form photocouplers with the respective light emitting diodes L1, L2, and photodiodes RDA3, RDA4 serving as second light receiving elements which respectively form photocouplers with the light emitting diodes L3, L4, are respectively positioned opposite to the light emitting diodes L1–L4.

The light received outputs from the photodiodes RDA1, RDA2 are input to an AND gate A4 serving as a first logical product operation device via respective voltage doubler rectifying circuits REC7, REC9, while the light received outputs from the photodiodes RDA3, RDA4 are input to an AND gate A5 serving as a second logical product operation device via respective voltage doubler rectifying circuits REC8, REC10, and the output signals from both AND gates A4, A5 are wired-OR connected by means of voltage doubler rectifying circuits REC11, REC12, and input to a reset terminal of the AND gate A1 shown in the first embodiment. The wired-OR connection corresponds to a second logical sum operating device.

The output signal from the AND gate A5 is input to the AND gate A3 shown in the first embodiment, via a voltage doubler rectifying circuit REC13.

Next is a description of the operation.

With the sensor portion of this embodiment, when the electrode plates 11, 12 and 11', 12' of the respective sensor portions 21, 22 are contacted with each other (ON), the light emitting diodes L1, L2 are illuminated while the light emitting diode L3, L4 are not illuminated. On the other hand, when the electrode plates 11, 12 and 11', 12' of the respective sensor portions 21, 22 are separated from each other (OFF), the light emitting diodes L3, L4 are illuminated while the light emitting diodes L1, L2 are not illuminated.

As a result, the AND gate A4 generates an oscillating output signal when the sensor portions 21, 22 are both ON, while the AND gate A5 generates an oscillating output signal when the sensor portions 21, 22 are both OFF. Consequently, when the operating conditions of the sensor portions 21, 22 are in agreement, the normal information for the sensor portions 21, 22 is self held by the AND gate A1 with the switching ON of the manual switch SW, in a similar manner to with the first embodiment, and a normal judgment signal K is generated. As a result, an operation permit signal will be generated only if a sensor portion OFF detection signal showing that an operator is not present, is input via the voltage doubler rectifying circuit REC13 to the AND gate A3.

With the construction of this embodiment also, once the operation of the sensor portions is in disagreement, then provided that the manual switch SW is not switched ON again, an operation permit signal will not be produced. Moreover, due to the operation of the capacitor Co, then erroneous operation due to the time difference between the operation of the first sensor portion 21 and the second sensor portion 22 can be prevented. Consequently, this arrangement has the same effect as for the first embodiment.

Figure 9:
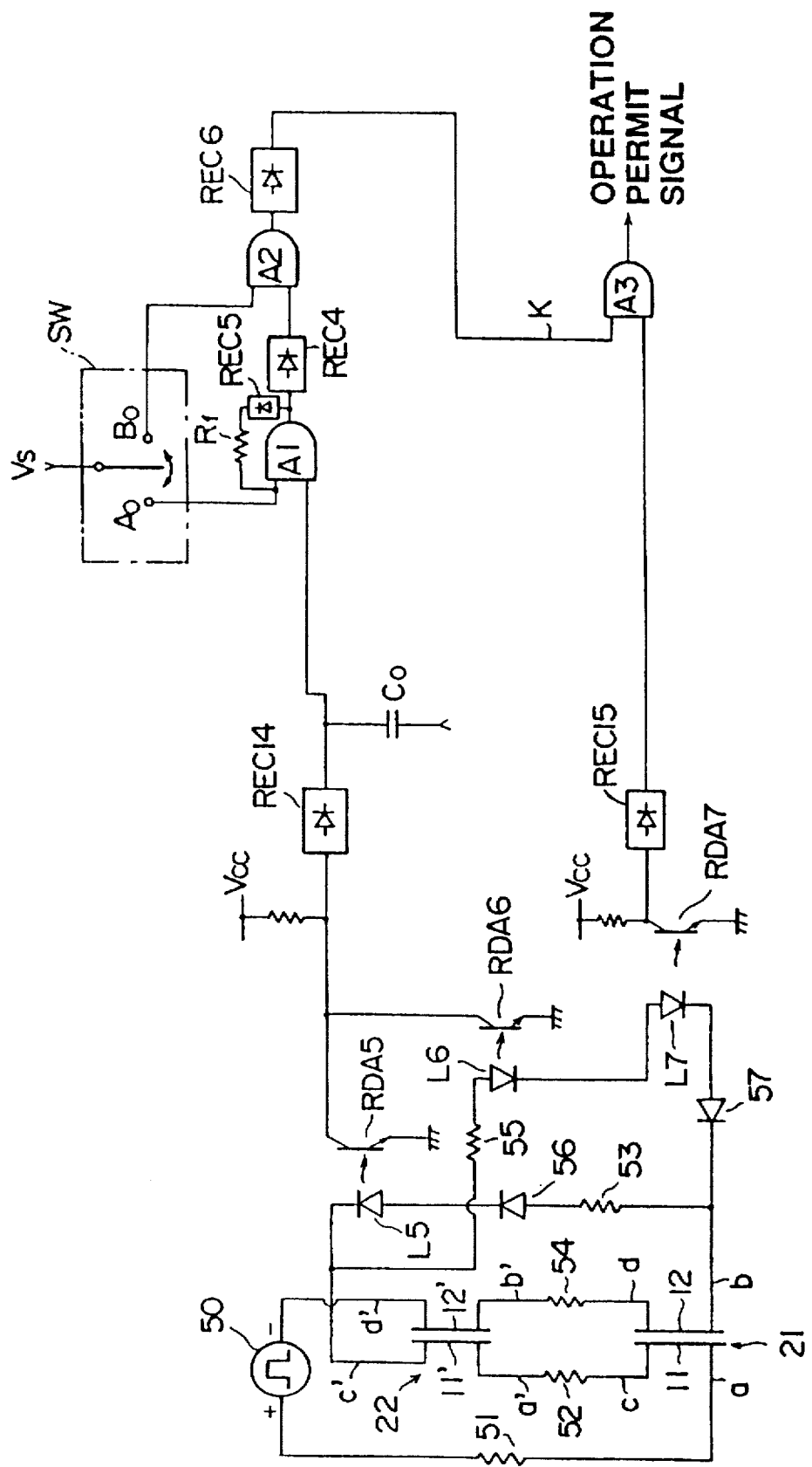
FIG. 9 is an overall circuit diagram of a third embodiment of the present invention.

FIG. 9 shows a third embodiment of the present invention.

FIG. 9 is an example of another construction for when the ON/OFF signal from a sensor portion of the four lead type is sampled using a photocoupler. Components the same as for the first embodiment are denoted by the same symbols, and description is omitted.

In FIG. 9, a positive pole of a signal generator 50 is connected to a lead a of a first electrode plate 11 of a first sensor portion 21 via a resistor 51 serving as a third resistor, while a lead c of the first electrode plate 11 and a lead a' of a first electrode plate 11' of a second sensor portion 22 are connected via a resistor 52 serving as a fourth resistor. A lead b of a second electrode plate 12 of the first sensor portion 21 is connected to a lead c' of the first electrode plate 11' of the second sensor portion 22 via a series circuit of a resistor 53 serving as a fifth resistor, a light emitting diode L5 serving as a third light emitting element, and a diode 56 for improving the peak inverse voltage, while a lead d of the second electrode plate 12 is connected to a lead b' of a second electrode plate 12' of the second sensor portion 22 via a resistor 54 serving as a sixth resistor, and a lead d' of the second electrode plate 12' of the second sensor portion 22 is connected a negative pole of the signal generator 50. Moreover, a series circuit of light emitting diodes L6, L7 serving as fourth and fifth light emitting elements, a resistor 55 serving as a seventh resistor, and a diode 57 for improving the peak inverse voltage is connected in parallel with the series circuit of the light emitting diode L5, the resistor 53 and the diode 56. The light emitting diodes L6, L7 are connected with current directions opposite to that of the light emitting diode L5. Furthermore, photodiodes RDA5, RDA6, RDA7 serving as third through fifth light receiving elements which respectively form photocouplers with the light emitting diodes L5, L6, L7, are respectively positioned opposite the light emitting diodes L5–L7.

The light received outputs from the photodiodes RDA5, RDA6 is made a logical sum output by a wired-OR connection, and is rectified by a voltage doubler rectifying circuit REC14 and input to the reset terminal of the AND gate A1 shown in the first embodiment. Moreover, the light received output from the photodiode RDA7 is rectified by a voltage doubler rectifying circuit REC15 and input to the AND gate A3 shown in the first embodiment. Here the wired-OR connection corresponds to a third logical sum operating device.

Next is a description of the operation.

With the present embodiment, when the first sensor portion 21 and the second sensor portion 22 are both ON, the light emitting diode L5 is illuminated, while when the first sensor portion 21 and the second sensor portion 22 are both OFF, the light emitting diodes L6, L7 are illuminated, and when one or other of the sensor portions 21, 22 is ON, then none of the light emitting diodes L5–L7 is illuminated.

Consequently, when the operation of both the sensor portions 21, 22 is in disagreement, then the input level to the reset terminal of the AND gate A1 becomes a logic value 0, and the normal judgment signal K is cancelled. The output signal from the AND gate A3 thus becomes a logic value 0, and the operation permit signal is stopped.

When the operation of the two sensor portions 21, 22 is in agreement, then since at least one of the light emitting diodes L5, L6 is illuminated, the input level to the reset terminal of the AND gate A1 becomes a logic value 1 so that the normal information for the sensor portion is self held, and the judgment signal K is generated, so that when the sensor portions 21, 22 go OFF, an operation permit signal is generated.

The construction of the third embodiment has the same effect similar as the first and second embodiments with the additional effect that the number of photocouplers and AND gates can be reduced compared to with the second embodiment. Hence the number of components is reduced and circuit construction thus simplified.

In cases where for example copper plate or the like are used for the electrode plates of the sensor portion, then an oxidation film is likely to form on the electrode plate surface. If an oxidation film forms, then the contact resistance of the electrode plates increases. As is known, the contact resistance of the electrode plates is dependent on the current flowing between the electrode plates, and if the current is large, the contact resistance is reduced. Therefore, to keep the influence of oxidation layer formation as small as possible, it is necessary to supply a comparatively large current to the electrode plates.

Figure 10:
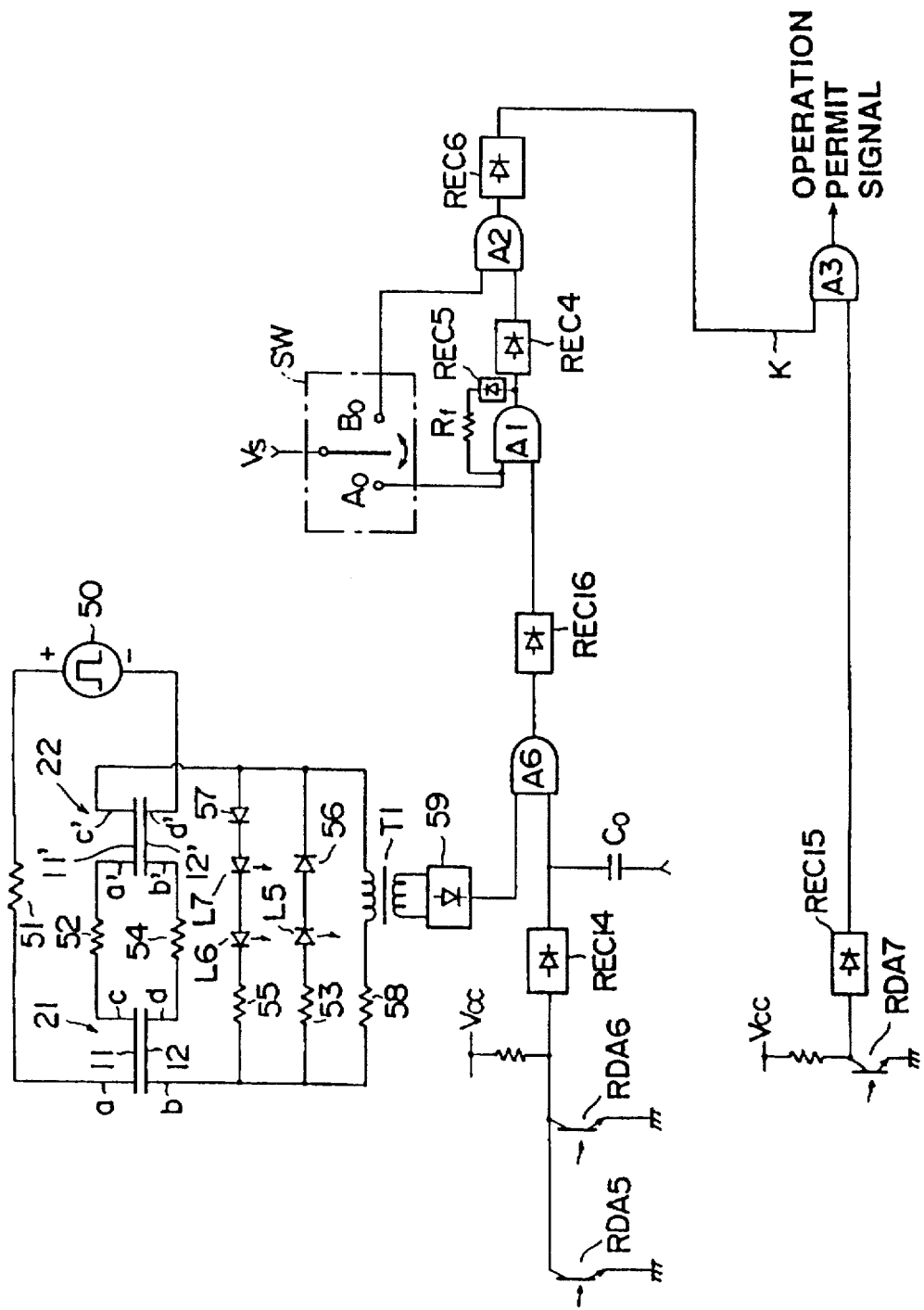
FIG. 10 is an overall circuit diagram of a fourth embodiment of the present invention.

FIG. 10 shows a fourth embodiment of the present invention, with a function for monitoring whether or not such a current is being supplied to the electrode plates, added to the construction of the third embodiment shown in FIG. 9, and is constructed so as to self hold the normal information for the sensor portion on the proviso that this current is flowing.

In FIG. 10, with the fourth embodiment, in addition to the construction of the third embodiment shown in FIG. 9, a series circuit of a transformer T1 and a resistor 58 is connected in parallel with the series circuits including the respective light emitting diodes L5–L7, so as to pass a large current between the electrode plates of the sensor portions 21, 22. The secondary side output from the transformer T1 is rectified by a rectifying circuit 59 and input to one input terminal of an AND gate A6 serving as a third logical product operating device. A wired-OR output from the photodiodes RDA5, RDA6 is input to the other input terminal of the AND gate A6. Here the current monitoring device comprises the series circuit of the transformer T1 and the resistor 58, and the rectifying circuit 59.

With this construction, only when a current flows in the transformer T1 is the self hold output signal of the AND gate A1 generated (the output signal showing that the sensor portion is normal). When a current does not flow in the transformer T1, then the self hold output signal from the AND gate A1 is not generated, and an operation permit signal is not generated from the AND gate A3 due to the sensor portion being abnormal. At the time of a disconnection fault or the like of the resistor 58, then since there is no output signal from the transformer T1, an output signal from the AND gate A6 is not generated, and the self hold output is also not generated.

With the fourth embodiment, in the case where an oxidation film occurs on the electrode plate surface so that the object detection performance of the sensor portion drops, the operation permit signal is stopped. Hence the reliability of the mat sensor is even further improved.

Figure 11:
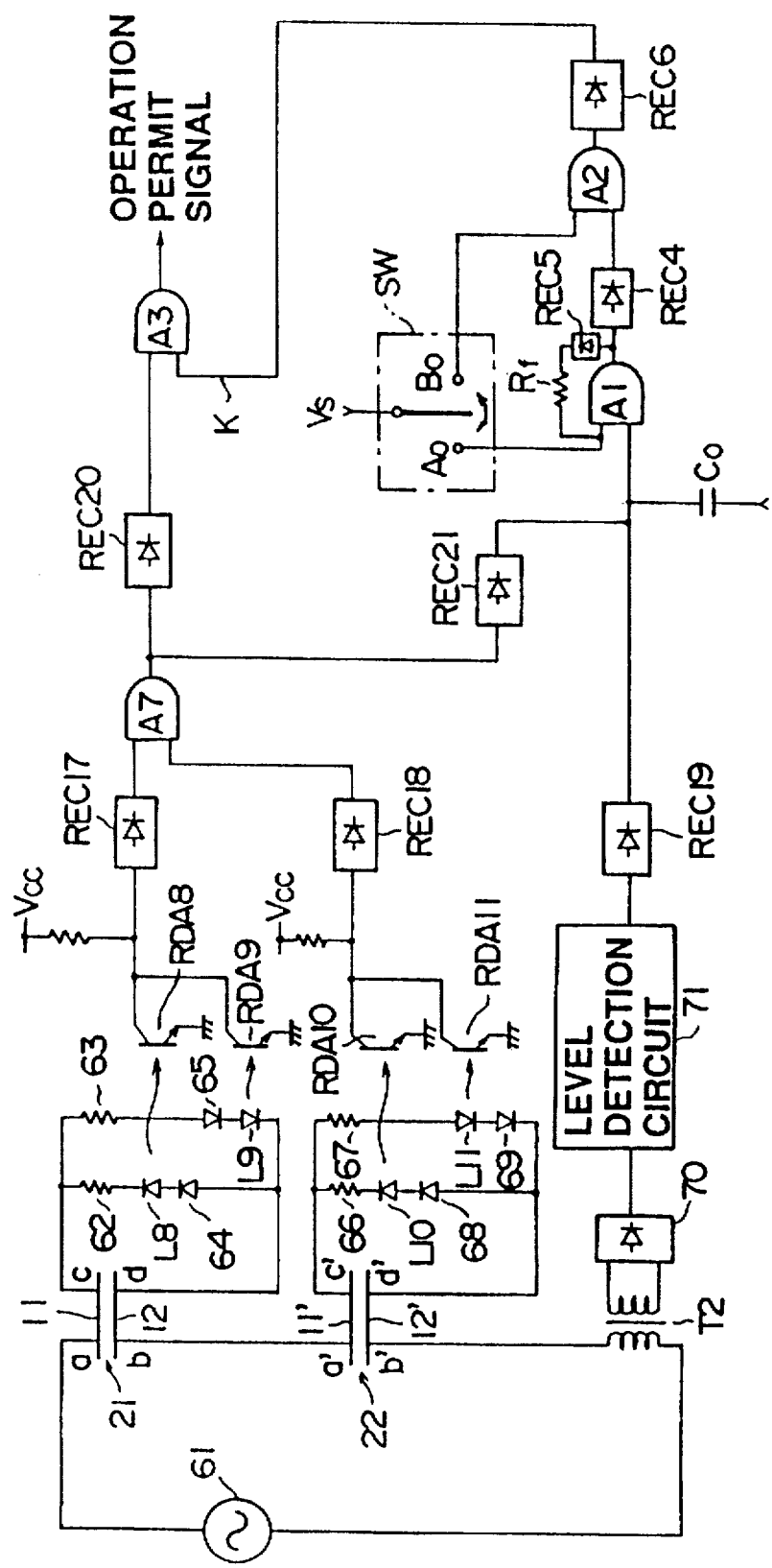
FIG. 11 is an overall circuit diagram of a fifth embodiment of the present invention.

FIG. 11 shows a fifth embodiment of the present invention. Components the same as for the first embodiment are denoted by the same symbols, and description is omitted.

In FIG. 11, a first sensor portion 21 and a second sensor portion 22 are connected in series to an AC power source 61 serving as an AC signal source. Two light emitting diodes L8, L9 serving as sixth light emitting elements for detecting the OFF condition of the first sensor portion 21 are connected with the current directions opposite to each other between first and second electrode plates 11 and 12 of the first sensor portion 21. Numerals 62, 63 denote current reducing resistors, while numerals 64, 65 denote diodes for improving the peak inverse voltage. Similarly, two light emitting diodes L10, L11 serving as seventh light emitting elements for detecting the OFF condition of the second sensor portion 22 are connected with the current directions opposite to each other between first and second electrode plates 11' and 12' of the second sensor portion 22. Numerals 66, 67 denote current reducing resistors, while numerals 68, 69 denote diodes for improving the peak inverse voltage. Furthermore, two photodiodes RDA8, RDA9 serving as sixth light receiving elements which respectively form photocouplers with the light emitting diodes L8, L9, and two photodiodes RDA10, RDA11 serving as seventh light receiving elements which respectively form photocouplers with the light emitting diodes L10, L11, are respectively positioned opposite to the light emitting diodes L8–L11.

The light received output from the photodiodes RDA8, RDA9 is made a logical sum output by a wired-OR connection, and rectified by a voltage doubler rectifying circuit REC17 and input to one input terminal of an AND gate A7 serving as a fourth logical product operating device. Moreover, the light received output from the photodiodes RDA10, RDA11 is made a logical sum output by a wired-OR connection, and rectified by a voltage doubler rectifying circuit REC18 and input to the other input terminal of the AND gate A7.

A transformer T2 serving as a current detection device, is disposed in the series circuit of the AC power source and the first and second sensor portions 21, 22, for detecting a current flowing in the series circuit. The secondary side output from the transformer T2 is rectified by a rectifying circuit 70 and then level detected by a level detection circuit 71 serving as a current level detection circuit using for example the beforementioned window comparator or the like, and the output from the level detection circuit 71 is then rectified by a voltage doubler rectifying circuit REC19.

The logical product output signal from the AND gate A7 is input to the AND gate A3 shown in the first embodiment, via a voltage doubler rectifying circuit REC20. Moreover, the logical product output signal from the AND gate 7 is voltage doubler rectified by a voltage doubler rectifying circuit REC21, and wired-OR connected to the voltage doubler rectified output signal from the level detection circuit 71 and input to the reset terminal of the AND gate A1 of the first embodiment. Here the wired-OR connection corresponds to a fourth logical sum operating device.

Next is a description of the operation.

With the fifth embodiment, when the first sensor portion 21 and the second sensor portion 22 are both OFF, then the light emitting diodes L8, L10 are illuminated by the half wave of the AC power source 61, and the light emitting diodes L9, L11 are illuminated by the following half wave, so that an output signal of logic value 1 is generated from the AND gate A7 and input to the reset terminal of the AND gate A1. At this time, due to the current reducing resistors 62, 63, 66, 67, only a small current flows in the transformer T2, so that the input signal level input to the level detection circuit 71 from the secondary side of the transformer T2 is lower than a previously set threshold value level, and an output signal is thus not generated from the level detection circuit 71.

On the other hand, when the first sensor portion 21 and the second sensor portion 22 are both ON, then the respective light emitting diodes L8–L11 are short circuited and extinguished so that the output signal from the AND gate A7 is not generated. At this time, a large current flows in the transformer T2, so that the input signal level for input to the level detection circuit 71 from the secondary side of the transformer T2 is higher than the previously set threshold value level, and hence an output signal of logic value 1 is generated from the level detection circuit 71 and input to the reset terminal of the AND gate A1.

Consequently, when the operation of both sensor portions 21, 22 is in agreement, the input level to the reset terminal of the AND gate A1 becomes a logic value 1, and the normal judgment signal K is: generated with the switching ON of the manual switch SW. Then when an output signal of logic value 1 is generated from the AND gate A7, an operation permit signal is produced. Moreover, when the operation of both sensor portions 21, 22 is in disagreement, an output signal from the AND gate A7 is not generated, and since the current flowing in the transformer T2 will also be small, then the self hold of the AND gate A1 is released. Hence, the operation permit signal from the AND gate A3 is stopped.

With this embodiment also, as with the fourth embodiment shown in FIG. 10, since the current flowing in the sensor portions 21, 22 is monitored, then in the case where an oxide film occurs on the electrode plate surface so that the body detection performance of the sensor portion drops, the operation permit signal is stopped, and hence the reliability of the mat sensor is improved.

Figure 12:
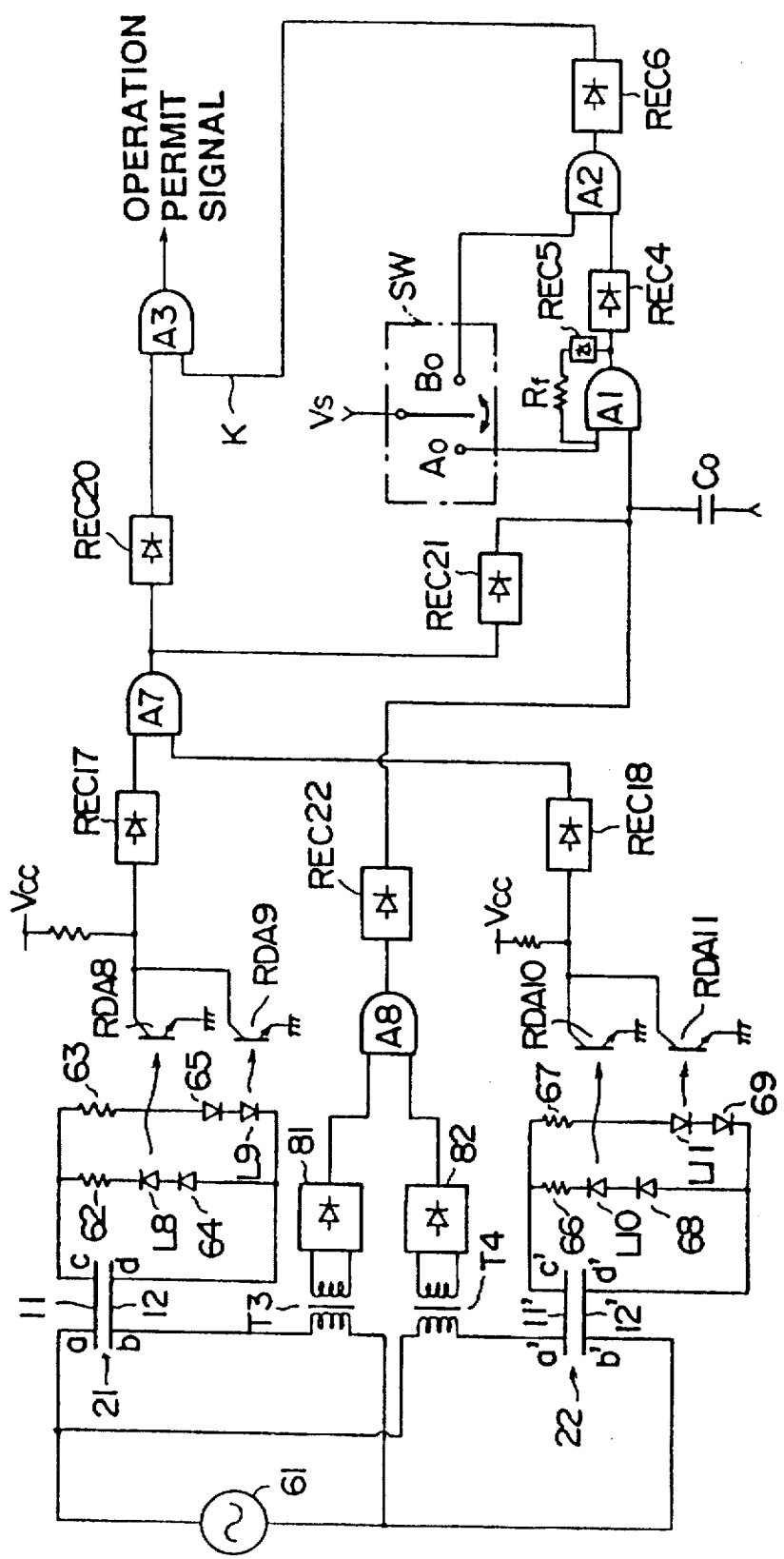
FIG. 12 is an overall circuit diagram of a sixth embodiment of the present invention.

FIG. 12 shows a sixth embodiment of the present invention.

With the construction of the fifth embodiment shown in FIG. 11, when one of the sensors 21, 22 is ON and the other is OFF, a large current cannot flow in the electrode plate of the sensor portion which is ON. FIG. 12 gives an example of an improvement to the mat sensor of FIG. 11, so that even when one of the sensor portions 21, 22 is ON and the other is OFF, a large current can flow in the electrode plate of the sensor portion which is ON. Components the same as for the fifth embodiment shown in FIG. 11 are denoted by the same symbols, and description is omitted.

In FIG. 12, with the fifth embodiment, the sensor portions 21, 22 are connected in parallel with the AC power source 61, with a transformer T3 disposed in the series circuit of the first sensor portion 21 and the AC power source 61, and a transformer T4 disposed in the series circuit of the second sensor portion 22 and the AC power source 61. The secondary side outputs from the respective transformers T3, T4 serving as current detection devices are respectively rectified by rectifying circuits 81, 82, and input to an AND gate A8 serving as a fifth logical product operating device. The rectified output from a voltage doubler rectifying circuit REC22 based on the output from the AND gate A8, and the rectified output from the AND gate A7 are then wired-OR connected and input to the reset terminal of the AND gate A1.

Next is a description of the operation.

When the first sensor portion 21 and the second sensor portion 22 are both ON, a high level output signal is generated concurrently from the two rectifying circuits 81, 82, and an output signal of logic value 1 is generated from the AND gate A8, so that an agreement detection signal for both sensor portions being ON is input to the reset terminal of the AND gate A1.

Here with the construction of the present embodiment, when the first sensor portion 21 is ON, a large current flows in the transformer T3 irrespective of the ON/OFF condition of the second sensor portion 22. Moreover, when the second sensor portion 22 is ON, a large current flows in the transformer T4 irrespective of the ON/OFF condition of the first sensor portion 21.

In this way, even if an oxide film is formed on the electrode plate surfaces of the respective sensor portions 21, 22, the influence on the contact resistance due to the oxide film can be minimized, and hence the ON condition of the sensor portion can be reliably detected and the reliability of the mat sensor thus improved.

Figure 13:
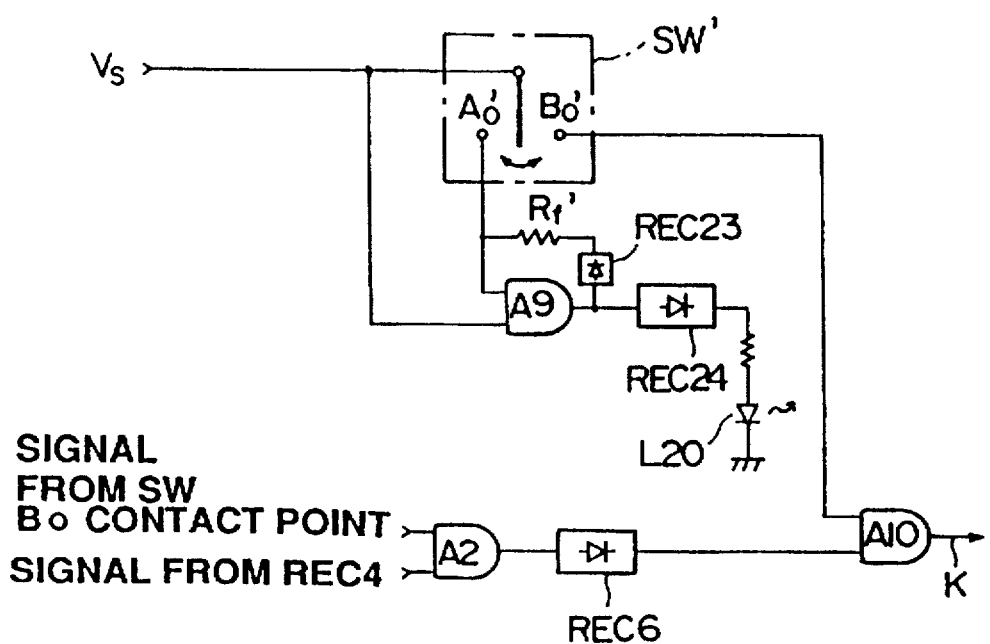
FIG. 13 is a partial circuit diagram of a seventh embodiment of the present invention.

Next is a description of a seventh embodiment as shown in FIG. 13.

With the embodiment of FIG. 13, a function has been added to the abovementioned respective embodiments to distinguish whether the release of the self hold of the first self hold circuit is caused by disagreement of the operation of the sensor portions, or by switching OFF of the power source for the mat sensor.

In FIG. 13, an AND gate 9, a voltage doubler rectifying circuit REC23, and a feed back resistor Rf constitute a second self hold circuit configured in the same manner as for the first self hold circuit. A power source voltage $V_s$ is input directly to a reset terminal of the AND gate A9 of the second self hold circuit, and is also input to the trigger terminal via a contact point Ao' of a second manual switch SW' linked to the first manual switch SW. An output signal from the AND gate A9 is supplied via a voltage doubler rectifying circuit REC24 to a light emitting diode L20 serving as a display device. Moreover, a rectified output signal from a voltage doubler rectifying circuit REC6 is input to an AND gate A10 serving as a seventh logical product operating device together with the power source voltage $V_s$ via an OFF contact point Bo' of the second manual switch SW', and an output signal from the AND gate A10 is then input to the AND gate A3 as the normal judgment signal K.

Next is a description of the operation.

When for example, an operating switch for the mat sensor (not shown in the figure) is switched ON to apply the power source, then an agreement detection output signal for the sensor portions is input to the reset terminal of the AND gate A1, and is self held by switching ON of the first manual switch SW, and input to the AND gate A2. Then by switching OFF the first manual switch SW, an output signal of logic value 1 from the AND gate A2 is input to one input terminal of the AND gate A10 via the voltage doubler rectifying circuit REC6. Moreover, by the ON/OFF switching of the second manual switch SW' linked to the operation of the first manual switch SW, then the AND gate A9 generates a self hold output signal, and the power source voltage $V_s$ is input to the other input terminal of the AND gate A10. Hence the normal judgment signal K for the sensor portions is input to the AND gate A3 from the AND gate A10. When a self hold output from the AND gate A9 is produced, then the light emitting diode L20 is illuminated, showing that the operating switch for the mat sensor is ON. If the power source voltage $V_s$ input to the reset terminal of the AND gate A9 drops below the threshold value, then the self hold of the AND gate A9 is released and the light emitting diode L20 extinguished, so that the normal judgment signal K from the AND gate A10 is cancelled.

Consequently, from the illumination or non illumination of the light emitting diode L20, it is possible to distinguish whether cancellation of the normal judgment signal K is caused by a drop in the power source voltage, or by disagreement of the operation of the sensor portions.

Figure 14A:
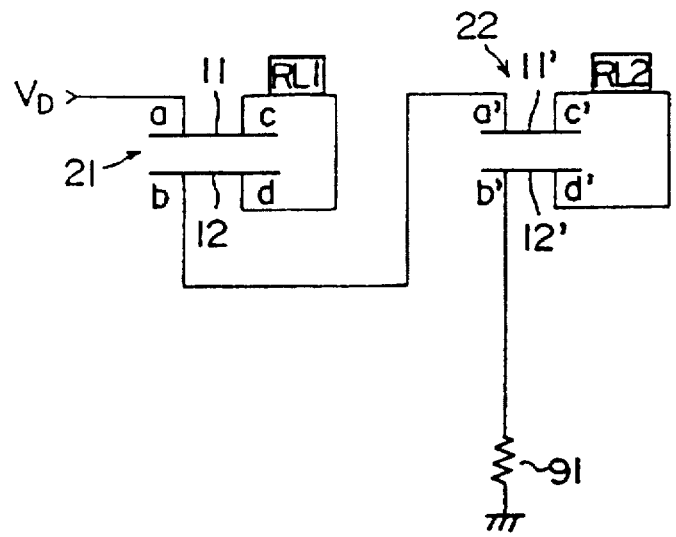
FIG. 14 (A) is a circuit diagram of a sensor portion of an eighth embodiment of the present invention.
Figure 14B:
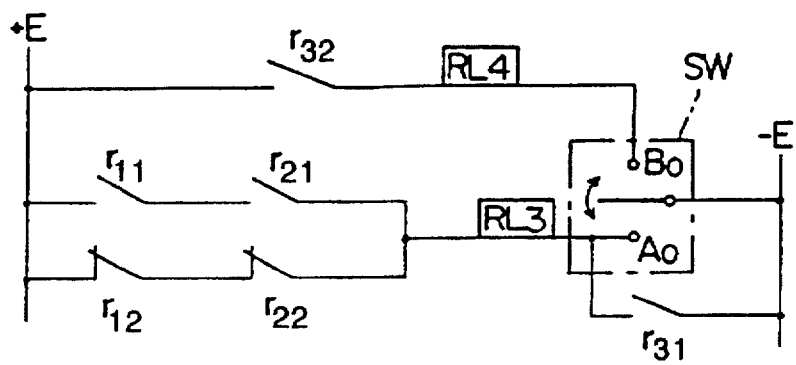
Figure 14C:
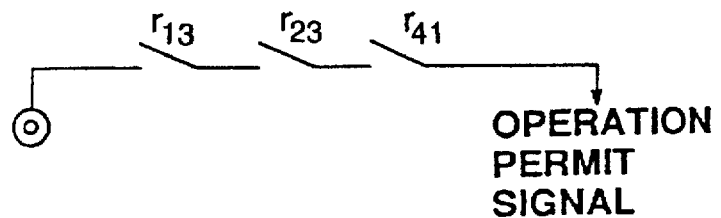

FIG. 14 shows an eighth embodiment of the present invention.

FIG. 14 is an example of a mat sensor constructed using a four lead type sensor portion and an electromagnetic relay. Components the same as for the first embodiment are denoted by the same symbols, and description is omitted.

In FIG. 14 (A), the connecting lead configuration for the sensor portion is the same as for the first embodiment shown in FIG. 4. The difference from the first embodiment is that instead of the respective resistors R1, R2 provided in the first and second sensor portions 21, 22, a first electromagnetic relay RL1 and a second electromagnetic relay RL2 are provided, and the lead b' of the second electrode plate 12' of the second sensor portion 22 which constitutes the detection output terminal S for the sensor portion, is connected to earth via a resistor 91.

Moreover, the parts corresponding to the agreement or disagreement detection device, the judgment device, and the sensor output generating device are made up as shown in FIGS. 14 (B) and (C) with two electromagnetic relays RL3, RL4 and a plurality of relay contact points.

In FIGS. 14 (B) and (C), a first series circuit of respective first make contact points $r_{11}$, $r_{21}$ of the first and second electromagnetic relays RL1, RL2, and a second series circuit of respective break contact points $r_{12}$, $r_{22}$ of the first and second electromagnetic relays RL1, RL2, are connected in parallel. The agreement or disagreement detection device comprises these first and second series circuits.

A series circuit of the third electromagnetic relay RL3 and an ON contact point Ao of a first manual switch SW is connected in series to the parallel circuit of the first and second series circuits, between the positive and negative electrodes of the power source. First make contact points $r_{31}$ of the third electromagnetic relay RL3 are connected in parallel with the ON contact point Ao of the manual switch SW, as a self hold contact point for the third electromagnetic relay RL3.

Furthermore, the fourth electromagnetic relay RL4 and second make contact points $r_{32}$ of the third electromagnetic relay RL3 are connected to an OFF contact point Bo of the manual switch SW. This series circuit of the fourth electromagnetic relay RL4, the second make contact points $r_{32}$ of the third electromagnetic relay RL3, and the OFF contact point $B_o$ of the manual switch SW is connected in parallel with the first and second series circuits and the third electromagnetic relay RL3. These third and fourth electromagnetic relays RL3, RL4, the manual switch SW, and the make contact points $r_{31}$, $r_{32}$ constitute a judgment device.

One end of a series circuit of the make contact points $r_{13}$, $r_{23}$ of the first and second electromagnetic relays RL1, RL2, and the make contact points $r_{41}$ of the fourth electromagnetic relay RL4 is connected to a DC power source, while the other end becomes the output terminal for the operation permit signal. The sensor output generating device is thus constructed from these.

Next is a description of the operation.

When there is no foot pressure acting on the sensor portions 21, 22 (when the operator is not present), then the first and second electromagnetic relay RL1, RL2 are excited, and their respective first make contact points $r_{11}$ and $r_{21}$ thus come ON. At this time, if the manual switch SW is switched by the operator to the ON contact point Ao side, then the third electromagnetic relay RL3 becomes excited, so that its first make contact points $r_{31}$ comes ON. Hence after this, even when the manual switch SW is switched by the operator to the OFF contact point Bo side, the third electromagnetic relay RL3 remains self held. Subsequently, even if there is foot pressure so that the first and second electromagnetic relays RL1, RL2 simultaneously become non excited, since the respective break contact points $r_{12}$, $r_{22}$ then come ON, then the electromagnetic relay RL3 remains in the self held condition. In this condition, if the first and second electromagnetic relays RL1, RL2 are again excited due to the absence of the operator, then the respective second make contact points $r_{13}$, $r_{23}$ come ON, and since the fourth electromagnetic relay RL4 is excited due to the OFF condition of the manual switch SW (the condition where the OFF contact point $B_o$ is ON) so that the make contact points r41 are ON, then an operation permit signal is generated.

On the other hand, if in a worst case scenario only one of the first and second electromagnetic relays RL1, RL2 is excited (the disagreement detection condition), then the power supply to the third electromagnetic relay RL3 is stopped so this becomes non excited and its make contact points r31 go OFF, resetting the self hold. Hence provided the operator does not again switch on the manual switch SW, the third electromagnetic relay RL3 remains non excited. Since the fourth electromagnetic relay RL4 is not excited provided that the second make contact points $r_{32}$ of the third electromagnetic relay RL3, and the OFF contact points Bo of the manual switch SW are not ON, then in the case of disagreement in the operation of the sensor portions 21, 22, the operation permit signal will not be generated.

That is to say, with the embodiment of FIG. 14, if even once a disagreement operation occurs in the first and second electromagnetic relays RL1, RL2, then provided that the operator does not again operate the switch SW, then the operation permit signal will not be generated. Moreover, in a worst case scenario where the operator leaves the manual switch switched to the ON contact point Ao side, then the fourth electromagnetic relay RL4 is not excited so that the operation permit signal is not generated.

Figure 15:
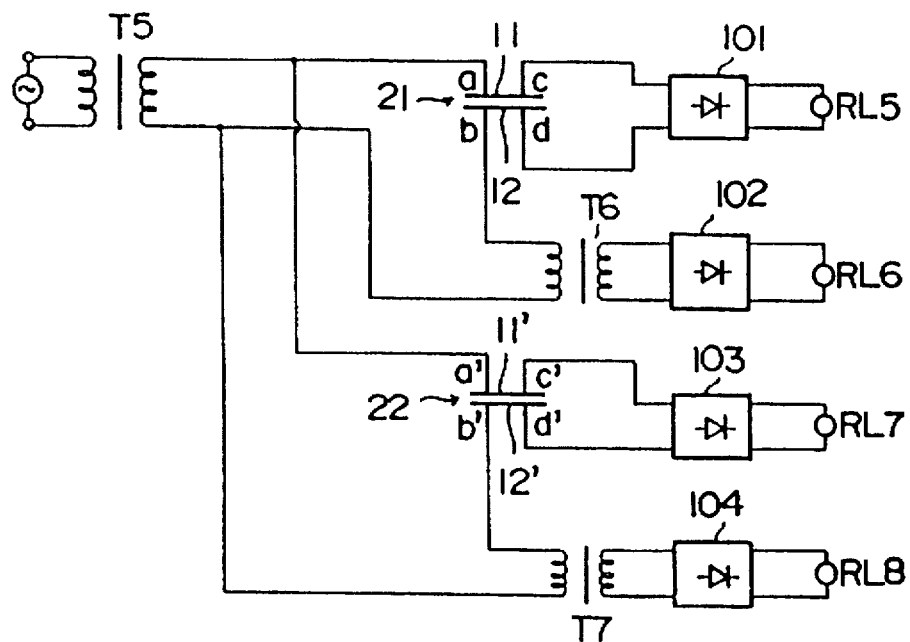
FIG. 15 (A) is a circuit diagram of a sensor portion of a ninth embodiment of the present invention.
Figure 15:
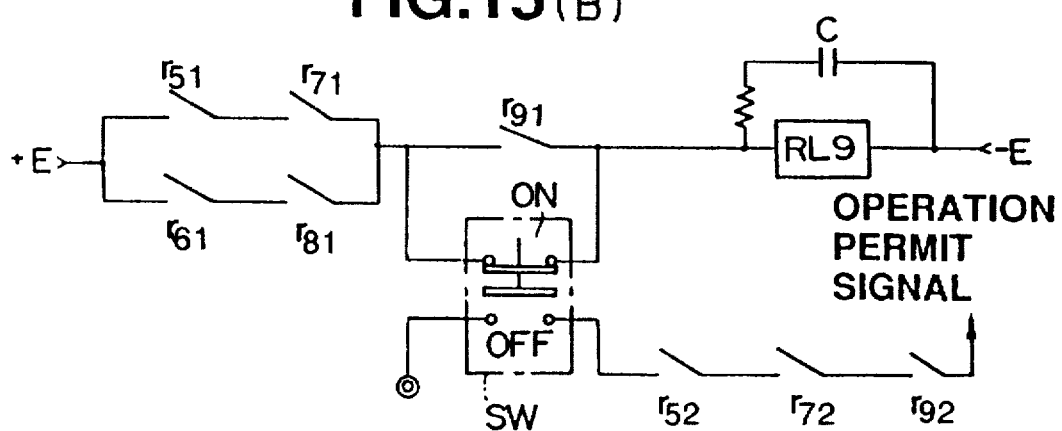

FIG. 15 shows a ninth embodiment of the present invention.

This embodiment is for the case where an electromagnetic relay using contact points which do not fuse, such as carbon contact points, is used. Components the same as for the first embodiment are denoted by the same symbols, and description is omitted.

FIG. 15 (A) shows the connecting lead configuration for the sensor portion, with first and second sensor portions 21, 22 connected in parallel to an AC power source via a transformer T5. A fifth electromagnetic relay RL5 is connected between the first and second electrode plates 11, 12 of the first sensor portion 21 via a rectifying circuit 101 serving as a first rectifying circuit, a primary coil of a transformer T6 serving as a first transformer is connected in series between the first sensor portion 21 and the transformer T5, and a sixth electromagnetic relay RL6 is connected to the secondary coil side of the transformer T6 via a rectifying circuit 102 serving as a second rectifying circuit. In a similar manner, a seventh electromagnetic relay RL7 is connected between the first and second electrode plates 11', 12' of the second sensor portion 22 via a rectifying circuit 103 serving as a third rectifying circuit, a primary coil of a transformer T7 serving as a second transformer is connected in series between the second sensor portion 22 and the transformer T5, and an eighth electromagnetic relay RL8 is connected to the secondary winding side of the transformer T7 via a rectifying circuit 104 serving as a fourth rectifying circuit.

The agreement or disagreement detection device, the judgment device, and the sensor output generating device are constructed as shown in FIG. 15 (B).

In FIG. 15 (B) a series circuit of respective first make contact points $r_{s1}$, $r_{71}$ of the fifth and seventh electromagnetic relays RL5, RL7, and a series circuit of respective first make contact points $r_{61}$, $r_{81}$ of the sixth and eighth electromagnetic relays are connected in parallel, to thus detect the agreement or disagreement of the operation of two sensor portions.

Moreover, a series circuit of the ON contact points of a manual switch SW, and a ninth electromagnetic relay RL9, is connected in series to the parallel circuit of the series circuits of the two first make contact points $r_{s1}$, $r_{71}$ and the two first make contact points $r_{61}$, $r_{81}$, while first make contact points $r_{91}$ of the ninth electromagnetic relay RL9 are connected in parallel with the ON contact points of the manual switch SW to give self hold contact points for the ninth electromagnetic relay RL9. Moreover, an OFF-delay circuit comprising a capacitor C is connected in parallel with the ninth electromagnetic relay RL9. The above parts correspond to the judgment device.

Furthermore, the sensor output generating device is constructed with one end of a series circuit of the respective second make contact points $r_{s2}$, $r_{72}$ and $r_{92}$ of the fifth electromagnetic relay RL5, the seventh electromagnetic relay RL7 and the ninth electromagnetic relay RL9, and the OFF contact points of the manual switch SW connected to the power source, and the operation permit signal generated from the other end.

Next is a description of the operation.

When the sensor portions 21, 22 are both ON, then the sixth and eighth electromagnetic relays RL6, RL8 are excited by the rectified output from the respective rectifying circuits 102, 104 based on the outputs from the transformers T6, T7, so that their make contact points $r_{61}$, $r_{81}$ come ON. Moreover, when the sensor portions 21, 22 are both OFF, then the fifth and seventh electromagnetic relays RL5, RL7 are excited by the rectified output from the respective rectifying circuits 101, 103, so that the make contact points $r_{s1}$, $r_{71}$ come ON.

As a result, with switching on of the manual switch SW, the ninth electromagnetic relay RL9 becomes excited and its first make contact points $r_{91}$ thus come ON to give self hold, so that it remains in the excited condition even after the manual switch SW is switched OFF. Moreover, at this time, the make contact points $r_{92}$ of the ninth electromagnetic relay RL9 come ON. In this condition, if the fifth and seventh electromagnetic relays RL5, RL7 of the sensor portions become excited (indicating absence of the operator), so that the make contact points $r_{s2}$, $r_{72}$ come ON, then since the make contact points $r_{92}$ are ON, the operation permit signal is generated.

If the operation of the sensor portions is in disagreement, then the self hold of the ninth electromagnetic relay RL9 is released and hence after this, provided that the manual switch SW is not again operated, an operation permit signal will not be generated.

Moreover, when the operation of the two sensor portions 21, 22 is in disagreement, the self hold of the ninth electromagnetic relay RL9 is maintained for a predetermined time by the OFF-delay circuit comprising the capacitor C. That is to say, it is judged that the operation of the sensor portions 21, 22 is in disagreement after being in disagreement for more than a predetermined time, and the operation permit signal from the AND gate A3 is then stopped. As a result, when the foot pressure acts, erroneous operation attributable to the time difference until the upper sensor portion 21 and the lower sensor portion 22 come ON, is prevented. Hence the operation stability of the mat sensor can be increased.

The ninth embodiment, has the effect of simplifying the circuit construction.

Figure 16A:
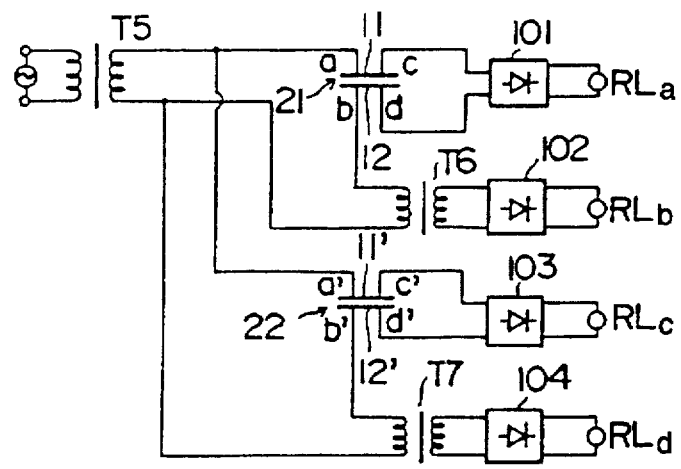
FIG. 16 (A) is a circuit diagram of a sensor portion of a tenth embodiment of the present invention.
Figure 16B:
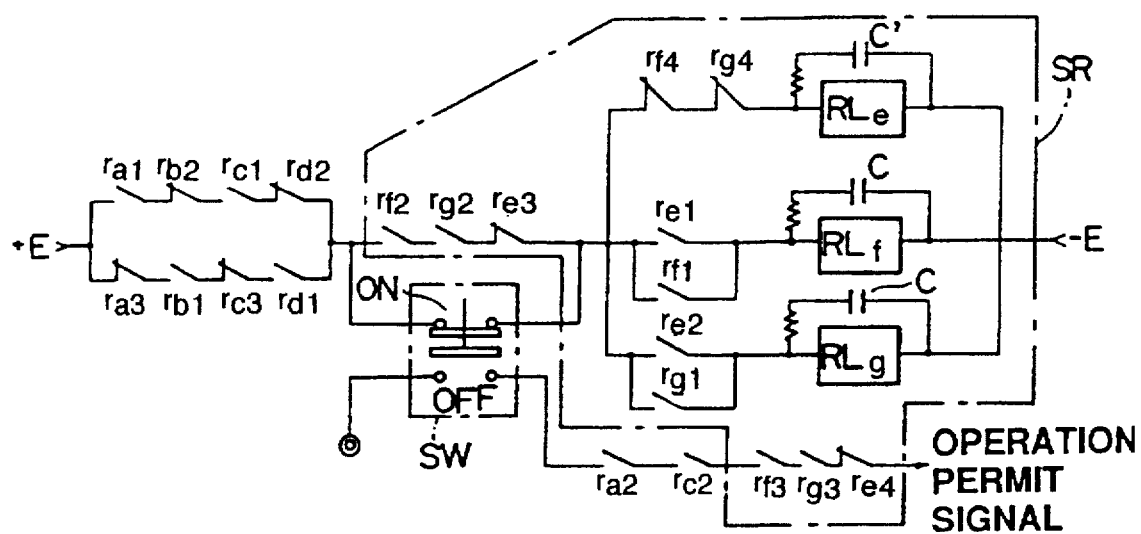

FIG. 16 shows a tenth embodiment of the present invention.

This embodiment is for the case where safety relays are used. Components the same as for the ninth embodiment are denoted by the same symbols, and description is omitted.

With the construction of the body detection device of the this embodiment as shown in FIG. 16(A), the connecting lead configuration for the first sensor portion 21 and the second sensor portion 22 is the same as for the ninth embodiment of FIG. 15. However the electromagnetic relays connected to the respective rectifying circuits 101–104 are different. For the electromagnetic relays RLa–RLd of this embodiment, ones with standard metal contact points are used. Here the electromagnetic relay RLa corresponds to a tenth electromagnetic relay, the electromagnetic relay RLb corresponds to an eleventh electromagnetic relay, the electromagnetic relay RLc corresponds to a twelfth electromagnetic relay, while the electromagnetic relay RLd corresponds to a thirteenth electromagnetic relay. Moreover, with this embodiment, the rectifying circuits 101–104 correspond to fifth through eighth rectifying circuits, while the transformers T6 and T7 correspond to third and fourth transformers.

The agreement or disagreement detection device, the judgment device and the sensor output generating device are constructed as shown in FIG. 16 (B).

In FIG. 16 (B) the agreement or disagreement detection device is constructed with a series circuit of respective first make contact points $r_{a1}$, $r_{c1}$ of the electromagnetic relays RLa, RLc, and respective break contact points $r_{b2}$, $r_{d2}$ of the electromagnetic relays RLb, RLd, and a series circuit of respective break contact points $r_{a3}$, $r_{c3}$ of the electromagnetic relays RLa, RLc and respective make contact points $r_{b1}$, $r_{d1}$ of the electromagnetic relays RLb, RLd, connected in parallel.

Moreover the judgment device comprises a safety relay SR incorporating three electromagnetic relays RLe–RLg corresponding to fourteenth through sixteenth electromagnetic relays, and a manual switch. Basically, this involves a series circuit of series connected respective break contact points $r_{f4}$, $r_{g4}$ of the electromagnetic relays RLf, RLg, and the electromagnetic relay RLe, a series circuit of parallel connected first make contact points $re_1$ of the electromagnetic relay RLe and first make contact, points $r_{f1}$, of the electromagnetic relay RLf, and the electromagnetic relay RLf, and a series circuit of parallel connected second make contact points $r_{e2}$ of the electromagnetic relay RLe and the first make contact points $r_{g1}$ of the electromagnetic relay RLg, and the electromagnetic relay RLg, connected in parallel.

Moreover, the parallel circuit of the three series circuits incorporating the electromagnetic relays RLe through RLg, is connected in series to the ON contact points of the manual switch SW, while a series circuit of respective second make contact points $r_{f2}$, $r_{g2}$ of the electromagnetic relays RLf, RLg, and first break contact points $r_{e3}$ of the electromagnetic relay RLe is connected in parallel with the ON contact points of the manual switch SW, to thus constitute a self hold contact point circuit. In addition, OFF-delay circuits comprising respective capacitors C are connected in parallel with the electromagnetic relays RLf, RLg, while an OFF-delay circuit comprising a capacitor C' is connected in parallel with the electromagnetic relay RLe. The above arrangement constitutes the judgment device.

Furthermore, the sensor output generating device is constructed with the OFF contact points of the manual switch SW connected in series to a series circuit of respective second make contact points $r_{a2}$, $r_{c2}$ of the electromagnetic relays RLa, RLc, respective third make contact points $r_{f3}$, $r_{g3}$ of the electromagnetic relays RLf, RLg, and second break contact points $r_{e4}$ of the electromagnetic relay RLe, with the switch SW end connected to the power source, and the operation permit signal is generated from the other end.

Next is a description of the operation.

When the sensor portions 21, 22 are both OFF, then in a similar manner to with the circuit of FIG. 15, the electromagnetic relays RLa, RLc are excited while the electromagnetic relays RLb, RLd are non excited, and hence the make contact points, $r_{a1}$, $r_{c1}$ and the break contact points $r_{b2}$, $r_{d2}$ both come ON. Moreover, when the sensor portions 21, 22 are both ON, the electromagnetic relays RLa, RLc are non excited while the electromagnetic relay s RLb, RLd are excited, and hence the break contact points, $r_{a3}$, $r_{c3}$ and the make contact points $r_{b1}$, $r_{d1}$ both come ON. Moreover, in the initial condition, the electromagnetic relays RLf, RLg are non excited so that their break contact points $r_{f4}$, $r_{g4}$ are ON.

As a result, with switching on of the manual switch SW, the electromagnetic relay RLe becomes excited so that the make contact points $r_{e1}$, $r_{e2}$ come ON and the electromagnetic relays RLf, RLg become excited. Hence the make contact points $r_{f1}$, $r_{g1}$ come ON, and are respectively self held, and at the same time, the break contact points $r_{f4}$, $r_{g4}$ of the electromagnetic relays RLf, RLg go OFF so that the electromagnetic relay RLe becomes non excited. As a result, the make contact points $r_{f2}$, $r_{g2}$ and the break contact points $r_{e3}$ which are in parallel with the ON contact points of the manual switch SW, come ON together so that the safety relay SR is self held, and this condition is maintained even after the manual switch SW is switched OFF. Moreover at this time, the break contact points $r_{e4}$ of the electromagnetic relay RLe and the make contact points $r_{f3}$, $r_{g3}$ of the electromagnetic relays RLf, RLg both come ON.

If in this condition the electromagnetic relays RLa, RLc of the sensor portion become excited (indicating absence of the operator), then their make contact points $r_{a2}$, $r_{c2}$ both come ON, and the operation permit signal is generated.

If the operation of the sensor portions is in disagreement, then the shelf hold of the safety relay SR is released and hence after this, provided that the manual switch SW is not again operated, the operation permit signal will not be generated.

Moreover, when the operation of the two sensor portions 21, 22 is in disagreement, the self hold of the electromagnetic relays RLf, RLg is maintained for a predetermined time by the OFF-delay circuit comprising the capacitor C. As a result, when the foot pressure acts, erroneous operation attributable to the time difference until the upper sensor portion 21 and the lower sensor portion 22 come ON, is prevented. Hence the operation stability of the mat sensor can be increased. The capacitor C' connected in parallel with the electromagnetic relay RLe is for maintaining the operational stability of the safety relay SR.

With the above respective embodiments, the example has been given for where a four lead type sensor is used. However it will be apparent that the two lead type sensor shown in FIG. 2 can also be used.

With the above respective embodiments, two sensor portions, namely the first sensor portion 21 and the second sensor portion 22 are arranged on top of each other, however in this case the mat becomes thick.

Figure 17A:
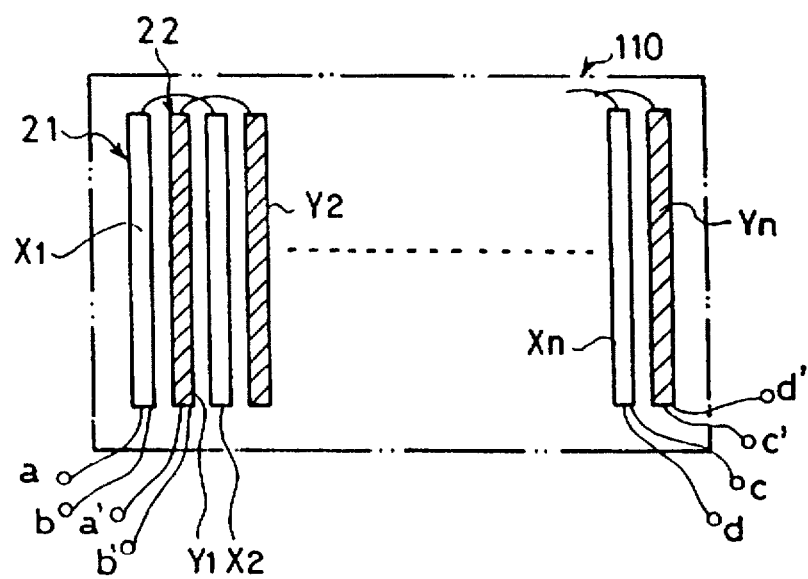
FIG. 17 (A) is a schematic diagram showing another embodiment of a sensor portion applicable to the present invention.
Figure 17B:
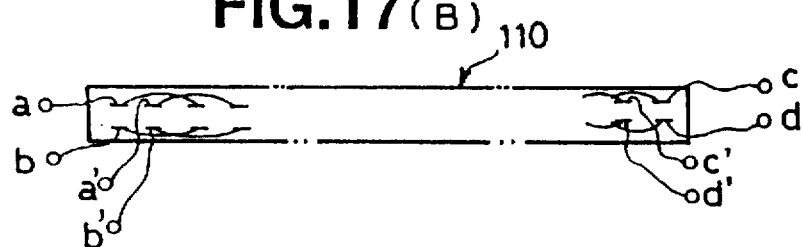

Embodiments for where the first sensor portion 21 and the second sensor portion 22 are combined into a single mat to thus give a thinner mat and make it more convenient to use are given below With an eleventh embodiment shown in FIG. 17, the respective electrode plates of the first and second sensor portions 21, 22 , respectively comprise a plurality of elongate electrode plate members $X_1$–$X_n$ and $Y_1$–$Y_n$, and as shown in FIG. 17(A), these are arranged within a mat 110 alternately parallel to each other, and at a narrower spacing than the footprint width of a body (for example an operators foot width). The respective electrode plate members $X_1$–$X_n$ and $Y_1$–$Y_n$ of the first and second sensor portions 21, 22 comprise, as shown in FIG. 17 (B), respective pairs of mutually facing electrode plate members. Consequently, when an operator stands on the mat 110, then at least one pair of each electrode plate member of the sensor portions 21, 22 is simultaneously contacted. The electrode plate members $X_1$–$X_n$ make up an electrode comprising pairs of electrode plates of the first sensor portion 21 as a whole with the upper electrode plate members thereof and the lower electrode plate members thereof respectively connected in series. Moreover the electrode plate members $Y_1$–$Y_n$ make up an electrode comprising pairs of electrode plates of the second sensor portion 22 as a whole with the upper electrode plate members thereof and the lower electrode plate members thereof respectively connected in series.

With such a construction, the leads for respectively connecting to the electrode plate members $X_1$, $Y_1$ of the first sensor portion 21 and the second sensor portion 22 on the left hand side in FIG. 17, correspond to the leads a, b, and a', b' shown in FIG. 4, while the leads for respectively connecting to the electrode plate members Xn, Yn on the right hand side in FIG. 17, correspond to the leads c, d, and c', d' shown in FIG. 4.

The circuit configuration other than for the sensor portions, may be the same as for the beforementioned embodiments, and hence description is here omitted.

Next is a description of the operation.

When an operator is not on the mat 110 so that the electrode plate members $X_1$–$X_n$ and $Y_1$–$Y_n$ are all OFF (separated condition), then an object not present detection signal is generated simultaneously from the first and second sensor portions 21, 22, and an operation permit signal is generated. If an operator is present on the mat 110 so that at least one of each of the electrode plate members $X_1$–$X_n$ and $Y_1$–$Y_n$ are simultaneously ON (contact condition), then an object present detection signal is generated simultaneously from the first and second sensor portions 21, 22, and the operation permit signal is stopped. Moreover, if for some reason the output signals from the first sensor portion 21 and the second sensor portion 22 disagree, then as with the beforementioned respective embodiments, the operation permit signal is stopped.

With such a sensor portion construction, there is the advantage that the mat can be in one piece, and the sensor portion can thus be made thinner than with the sensor portion construction wherein two mats are laid on top of each other, thus making it more convenient to use.

Figure 18:
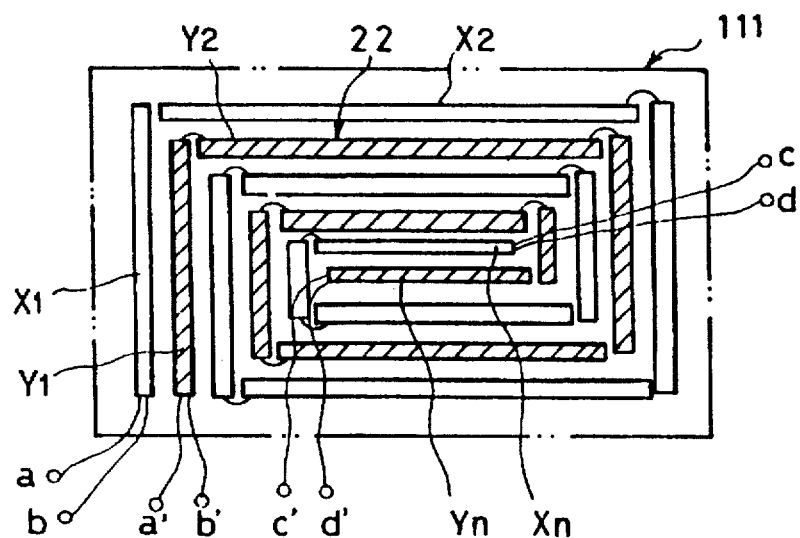
FIG. 18 is a schematic diagram showing another embodiment of a sensor portion applicable to the present invention.

With a twelfth embodiment shown in FIG. 18, the electrode plate members $X_1$–$X_n$ and the electrode members $Y_1$–$Y_n$ are arranged in the mat 111 in alternate spirals, having the same operational effect as for the eleventh embodiment. The construction of the electrode plate members $X_1-X_n$ and $Y_1-Y_n$, and the connections of the electrical wiring are the same as in FIG. 17 and hence description is omitted.

With the mats 110 and 111 of FIG. 17 and FIG. 18, when only the edge of the mat is stood on, then only the electrode plate member of one sensor portion is contacted, so that even when the sensors are normal, a disagreement can occur in the output signals from the sensor portions. An example of a sensor portion construction for preventing such a situation is shown in FIG. 19.

Figure 19:
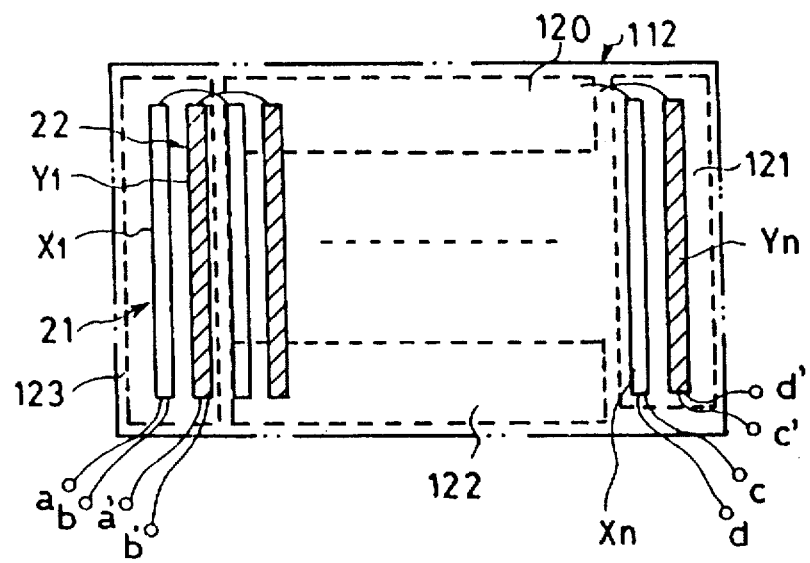
FIG. 19 is a schematic diagram showing another embodiment of a sensor portion applicable to the present invention.

With a mat 112 of a thirteenth embodiment shown in FIG. 19, in addition to the configuration of the electrode plate arrangement of FIG. 17, insulation plates 120–123 are incorporated into the peripheral portions of the mat.

With such a construction, if an operator steps on any of the insulation plates 120–123 in the peripheral portions of the mat 112, then since the foot pressure acts over the whole of the insulation plate, the respective electrode plate members of the first sensor portion 21 and the second sensor portion 22 within the region of the insulation plate are operated together. Consequently, even if only the edge of the mat is stood on, if the sensors are normal, then the occurrence of a disagreement in the sensor output signals can be prevented.

If the insulation plates 120, 123 are made too large then the foot pressure becomes dispersed, so that it is difficult to cause contact of the electrode plate members, and hence a drop in sensor sensitivity is likely.

Figure 20:
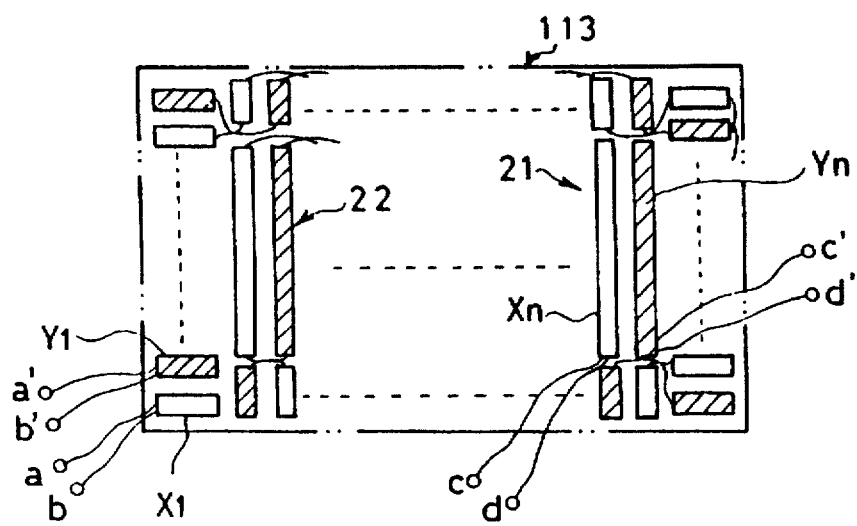
FIG. 20 is a schematic diagram showing another embodiment of a sensor portion applicable to the present invention.

With a fourteenth embodiment shown in FIG. 20, instead of providing the insulation plates 120–123, a large number of electrode plate members of a smaller size than the electrode plate members at the center are provided at the peripheral portions of the mat 113, thus increasing the electrode plate member density at the peripheral portion.

In this case, the problem of a drop in sensitivity with the mat provided with insulation plates is overcome. However it is necessary to prepare electrode plate members of different sizes.

Figure 21:
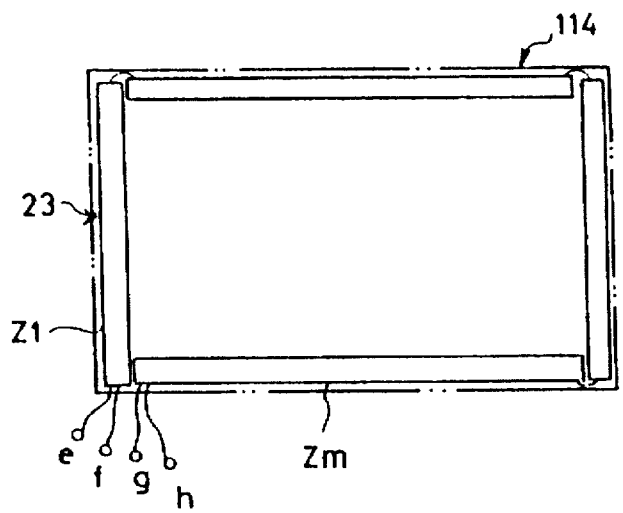
FIG. 21 is a schematic diagram showing another embodiment of a sensor portion applicable to the present invention.

As shown in FIG. 21, a separate third sensor portion may be provided at the respective peripheral portions of a mat, which is constructed for example with the electrode plate member arrangements of FIG. 17 and FIG. 18.

With this fifteenth embodiment shown in FIG. 21, a third sensor portion 23 comprises a plurality of pairs of mutually facing electrode plate members $Z_1-Z_m$, similar to with the first and second sensor portions 21, 22. Also with the respective electrode plate members $Z_1-Z_m$ of the third sensor portion 23, the upper electrode plate members and lower electrode plate members are connected in series, so that in total they make up electrode plates of the third sensor portion 23.

This construction gives eight combinations for the ON/OFF conditions for the first through third sensor portions 21, 22 and 23, as per the following Table 1.

TABLE 1

| ON/OFF condition for the sensor portions | | |
|---|---|---|
| First sensor portion | Second sensor portion | Third sensor portion |
| ON | ON | ON |
| ON | OFF | ON |
| OFF | ON | ON |
| OFF | OFF | ON |
| ON | ON | OFF |

TABLE 1-continued

| ON/OFF condition for the sensor portions | | |
|---|---|---|
| First sensor portion | Second sensor portion | Third sensor portion |
| ON | OFF | OFF |
| OFF | ON | OFF |
| OFF | OFF | OFF |

With this construction, when the peripheral edge portion of the mat 114 is stood on so that the third sensor portion 23 is ON, there can be cases where only one of the first sensor portion 21 and the second sensor portion 22 is stood on, and hence even if the first sensor portion 21 and the second sensor portion 22 are normal, the ON/OFF condition of both may not be in agreement. Moreover when the peripheral edge portion of the mat 114 is not being stood on so that the third sensor portion 23 is OFF, then if the first sensor portion 21 and the second sensor portion 22 are normal, the ON/OFF conditions for both will always be in agreement. When using the mat sensor, then in general, the effective detection region of the mat sensor (the detection region where it is dangerous when the operator approaches) is positioned in a region where the first and second sensor portions 21, 22 will always be stood on. The situation where only the peripheral portion is stood on and the central portion is not stood on, can arise due to tampering or in the case where there is no intention to approach the region where the mat is placed (the danger region). In this case, the warning of an abnormality due to an ON/OFF disagreement of the first sensor 21 and the second sensor 22 is undesirable, irrespective of whether or not the sensor portions are normal.

Figure 22:
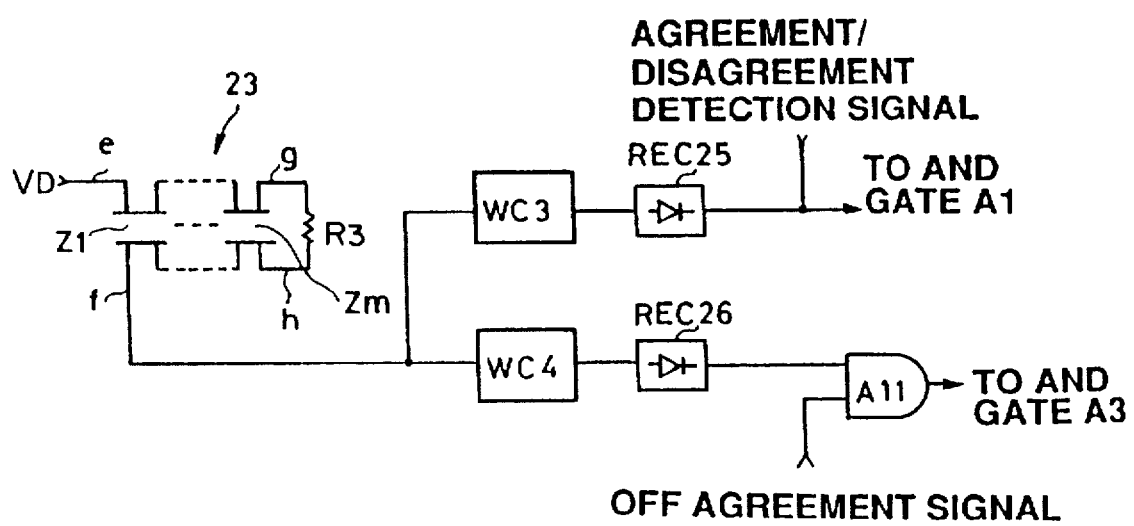
FIG. 22 is a partial circuit diagram of a mat sensor circuit using the sensor portion of FIG. 21.

A circuit for when the mat 114 is used which takes into consideration convenience of use, is shown in FIG. 22, having for example the basic construction of the circuit of FIG. 4. With this circuit, processing is such that agreement detection of the first sensor portion 21 and the second sensor portion 22 is only carried out when the third sensor portion 23 is OFF, while when the third sensor portion 23 is ON, the agreement detection signal is masked (to give judgment of agreement even if there is disagreement between the first sensor portion 21 and the second sensor portion 22). The processing of the signal from the first and second sensor portions 21, 22 is the same as in FIG. 4. A description is given here of the circuit for processing the signal from the third sensor portion 23.

In FIG. 22, a lead e of the third sensor portion 23 is connected to a DC power source (not shown in the figure), and subjected to a voltage $V_D$. A lead g and a lead h are connected via a resistor R3. A lead f serves as the detection output of the third sensor portion 23, and is connected to the input terminals of third and fourth window comparators WC3, WC4.

The outputs from the window comparators WC3, WC4 are respectively rectified by voltage doubler rectifying circuits REC25, REC26. The rectified output from the voltage doubler rectifying circuit REC25 is wired-OR connected to the rectified output (agreement or disagreement detection signal) from the voltage doubler rectifying circuits REC1, REC2 of FIG. 4, and the resultant logical sum signal is input to the AND gate A1 of FIG. 4 via the capacitor $C_o$. On the other hand, the rectified output from the voltage doubler rectifying circuit REC26 is input to one input terminal of an AND gate A11. The rectified output (OFF agreement signal) from the voltage doubler rectifying circuit REC3 of FIG. 4 is input to the other input terminal of the AND gate A11. The output from the AND gate A11 is input to the AND gate A3 of FIG. 4.

The window comparators WC3, WC4, the AND gate A11, and the voltage doubler rectifying circuits REC25, REC26, are the beforementioned known conventional devices.

Next is a description of the operation.

When one of the electrode plate members $Z_1$–$Z_m$ is stood on (third sensor portion 23 ON), then the resistor R3 is short circuited, while when all of the electrode plate members $Z_1$–$Z_m$ are separated (third sensor portion OFF), then the resistor R3 is connected in series. Consequently, if the sensor output voltage value for when the third sensor portion 23 is ON is $V_{ON}$ and the voltage value for when OFF is $V_{OFF}$, then the lower limit threshold value TL3 for the window comparator WC3 is set so that $V_{ON}$>TL3 (the upper limit threshold value is set sufficiently high), while the upper limit threshold value TH4 and the lower limit threshold value TL4 of the window comparator WC4 are set so that TL4<$V_{OFF}$<TH4. A proviso is that TL3 is set greater than TH4.

In this way, when the third sensor portion 23 is ON, the rectified output from the voltage doubler rectifying circuit REC25 is input to the AND gate A1 regardless of the agreement or disagreement of the first and second sensor portions 21, 22, and a normal judgment signal K is produced based on the output from the AND gate A2 of FIG. 4. On the other hand, when the third sensor portion 23 is OFF, the rectified output from the voltage doubler rectifying circuit REC26 is input to the one input terminal of the AND gate A11. At this time, if the first and second sensors portions 21, 22 are both OFF, then the rectified output from the voltage doubler rectifying circuit REC3 is also input to the other input terminal of the AND gate A11, so that an output of logic value 1 from the AND gate A11 is input to the AND gate A3, and an operation permit signal is thus produced.

With such a construction, then even if the operator stands on the peripheral edge portion of the mat 114 with no intention of approaching the danger region where there is the possibility of being struck by the movable portion of the machine, information indicating a fault in the sensor will not be produced.

The circuit configurations for processing the signals from the respective sensor portions have been described for the present embodiment with reference to FIG. 4. However, it will be apparent that this processing can be similarly realized with the circuit configurations of the beforementioned other embodiments.

Figure 23:
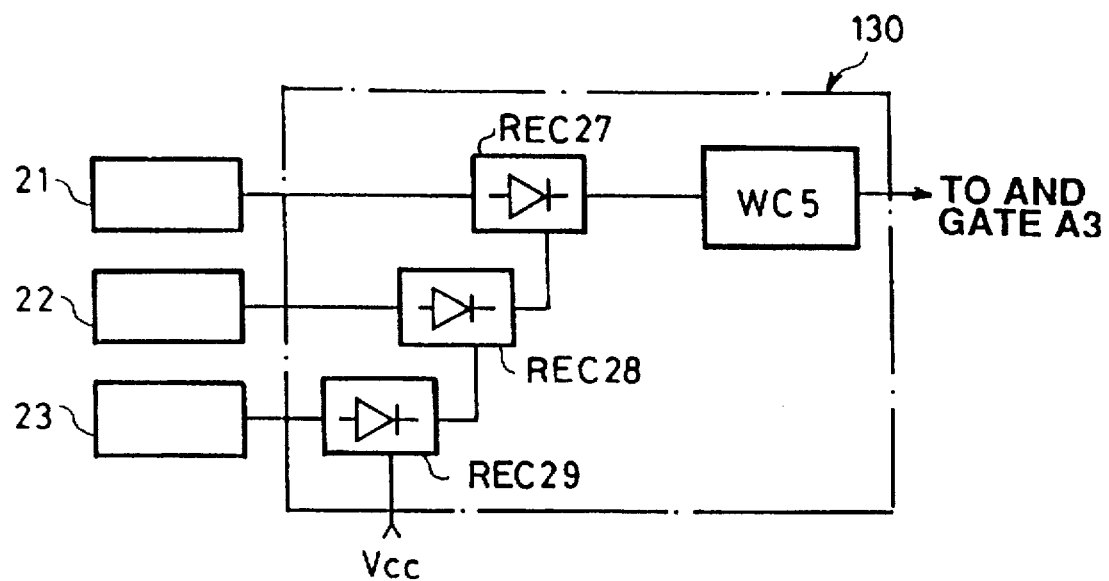
FIG. 23 is a different circuit diagram for a fail-safe AND gate.

Moreover, in the case wherein the ON/OFF detection signals from the first sensor portion 21 and the second sensor portion 22 are output independently, for example with the circuit configuration for the embodiment shown in FIG. 8, then the construction may be such that instead of using the AND gate A11, the respective OFF detection signals output from the respective sensor portions 21, 22, 23 are subjected to a logical product operation using an AND gate circuit 130 as shown in FIG. 23, which is made up using voltage doubler rectifying circuits and a window comparator.

In FIG. 23, rectifying circuits REC27, REC28, REC29, which take the respective output signals from the respective sensor portions 21, 22, 23, and a window comparator WC5, are the beforementioned known devices. The rectifying circuit REC27 generates an output superimposed with the rectified output from the voltage doubler rectifying circuit REC28, the voltage doubler rectifying circuit REC28 generates an output superimposed with the rectified output from the voltage doubler rectifying circuit REC29, and the voltage doubler rectifying circuit REC29 generates an output superimposed with a constant voltage $V_{cc}$. The output from the voltage doubler rectifying circuit REC 27 becomes the addition value for the three voltage doubler rectifying circuits REC27–REC29, giving essentially an addition circuit. The output from the window comparator WC5 is rectified via a voltage doubler rectifying circuit and input to the AND gate A3. The respective sensor portions 21, 22, 23 are constructed such that when OFF, then an AC output is generated, using for example a photocoupler or the like.

If the DC output level from the respective voltage doubler rectifying circuits REC27–REC29 based on the AC output from the respective sensor portions 21–23 is $V_d$, then the output level from the voltage doubler rectifying circuit REC27 for when all of the sensor portions 21–23 are OFF is $3V_d+V_{cc}$, while if one is ON, this is $2V_d+V_{cc}$. Consequently, the lower limit threshold value for the window comparator WC5 is set between $3V_d+V_{cc}$ and $2V_d+V_{cc}$.

With such a construction, if all of the sensor portions 21, 22, 23 are OFF, then the output level from the voltage doubler rectifying circuit REC27 becomes $3V_d+V_{cc}$, being higher than the threshold value, so that the output from the window comparator WC5 becomes a logic value 1. The AND gate circuit 130 thus gives an output of logic value 1, and an operation permit signal is produced from the AND gate A3. The AND gate circuit 130 has a fail safe construction in that at the time of a fault in the voltage doubler rectifying circuits REC27–REC29 or in the window comparator WC5, the output becomes a logic value 0.

Figure 24:
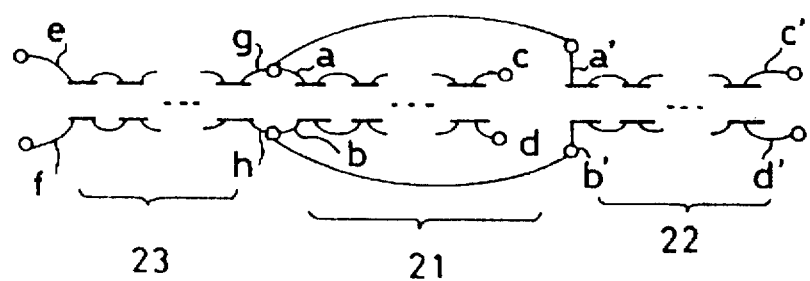
FIG. 24 is a different connection diagram for three sensor portions.

A description will now be given of a different embodiment as shown in FIG. 24, in which the ON/OFF detection circuit of the third sensor portion 23 can be omitted.

In FIG. 24, the construction is such that the first sensor portion 21 and the second sensor portion 22 are connected in parallel with the power source as with the embodiment of FIG. 8, while the third sensor portion 23 is connected in series between the parallel connected first and second sensor portions 21, 22, and the power source. The third sensor portion 23 is wired so that the third sensor portion 23 is disposed commonly in the power supply path for the first and second sensor portions 21, 22, and respective power supply voltages are thus supplied to the first and second sensor portions 21, 22 via the third sensor portion 23.

With such a construction, when the third sensor portion 23 is ON, then there is no potential difference at the two edges of the electrode plates of the first sensor portion 21 and the second sensor portion 22, regardless of their ON/OFF condition. Hence it is judged that the first and second sensor portions 21, 22 are both ON, and an operation permit signal is thus not produced. On the other hand, when the third sensor portion 23 is OFF, then the ON/OFF conditions of the first sensor portion 21 and the second sensor portion 22 are respectively detected separately, to thus detect agreement or disagreement, and at the time of agreement with both OFF, then the operation permit signal is produced.

With such a construction, it is not necessary to additionally provide a circuit for detecting the ON/OFF condition of the third sensor portion 23, and hence the circuit construction can be simpler than for the circuits of FIG. 22 and FIG. 23.

Figure 25:
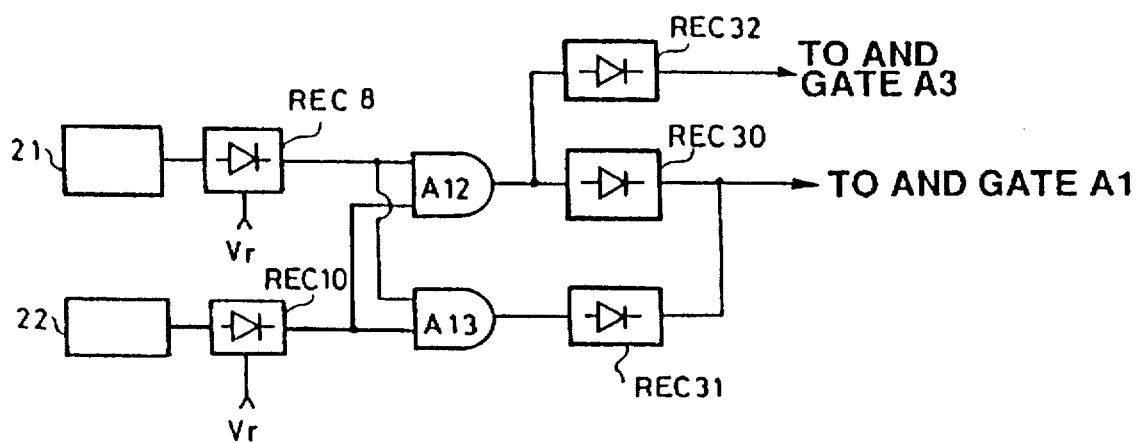
FIG. 25 is a different circuit diagram for detecting agreement or disagreement.

Next is a description of an embodiment shown in FIG. 25, of a circuit for carrying out agreement or disagreement detection using only the OFF detection signal from the sensor portion.

In FIG. 25, a first sensor portion 21 and a second sensor portion 22 are constructed such that when the respective electrode plates are OFF, an AC signal is generated. For example, the construction may be such that with the circuit of FIG. 8, only the light emitting diodes L3, L4 are used. The AC signals from the respective sensor portions 21, 22, as in FIG. 8, are rectified by voltage doubler rectifying circuits REC8, REC10. The rectified output from the voltage doubler rectifying circuits REC8, REC10 are input to respective AND gates A12, A13. The outputs from the AND gates A12, A13 are rectified by voltage doubler rectifying circuits REC30, REC31 and wired-OR connected and input to the AND gate A1. Moreover, the output from the AND gate A12 is rectified by a voltage doubler rectifying circuit REC32 and input to the AND gate A3.

Here if the DC level of the signal rectified by the voltage doubler rectifying circuits REC8, REC10 when the respective sensor portions 21, 22 are OFF is $V_d$, and the DC bias voltage superimposed by the voltage doubler rectifying circuits REC8, REC10 is Vr, then with the AND gate A12, the lower limit threshold value is set between Vd and Vd+Vr so that an output is produced when the first and second sensor portions 21, 22 both generate an output (when OFF). Moreover with the AND gate A13, the upper limit threshold value is set between Vr and Vd+Vr, while the lower limit threshold value is set between the power source voltage $V_{cc}$ of the AND gate A13 and Vr ($V_{cc}$<Vr), so that an output is produced when both the first and second sensor portions 21, 22 do not give an output (when ON). Consequently, the AND gate A12 corresponds to an eighth logical product operating device while the AND gate A13 correspond to a NOT operating device which essentially produces a NOT operation output for the OFF detection signal from the first and second sensor portions 21, 22. Moreover, the wired-OR connection configuration for the voltage doubler rectifying circuits REC30, REC31 corresponds to a fifth logical sum operating device.

Consequently, when the sensor portions 21, 22 are both OFF, the output level from the voltage doubler rectifying circuits REC8, REC10 are both at a high level of $V_d+V_r$, being higher than the lower limit threshold value of the AND gate A12. Hence an output is produced from the AND gate A12. This output is input to the AND gates A1, A3, and an operation permit signal is thus produced. Moreover, when the sensor portions 21, 22 are both ON, the output level from the voltage doubler rectifying circuits REC8, REC10 are both a low level of $V_r$, which is within the range of the upper and lower threshold values of the AND gate A13. Hence an output is generated from the AND gate A13. This output is input to the AND gate A1, however since an output is not produced from the AND gate A12, then the operation permit signal is not produced. In the case where the ON/OFF condition of the sensor portions 21, 22 is in disagreement, then an output is not produced from either of the AND gates A12, A13.

Such a construction is a fail-safe circuit which uses a dual signal, being a binary signal having a negation relationship with each other. With the voltage doubler rectifying circuits REC8, REC10, if faulty then the output level is always less than $V_r$, so that even if an AC signal is input from the sensor portions 21, 22, the output level does not become $V_r+V_d$ and hence there is no output generated from the AND gate A12. Consequently, there is no output of the operation permit signal.

If with the abovementioned respective embodiments, the electrode plate materials for the first sensor portion 21 and the second sensor portion 22 are different materials, for example, one is made from copper sheet which is susceptible to an oxide film such as copper oxide, while the other is made from corrosion resistant stainless steel, then it is unlikely for the same type of fault to occur simultaneously with the two sensor portions under the same circumstances. Hence the frequency of erroneous detection for agreement or disagreement can be considerably reduced, and the reliability of the mat sensor thus increased.

Next is a description of an embodiment of a second aspect.

The mat sensor of the second aspect has the sensor portion as a single system, and detects the presence or absence of a body by detecting a change in electrostatic capacity between electrodes.

Figure 26:
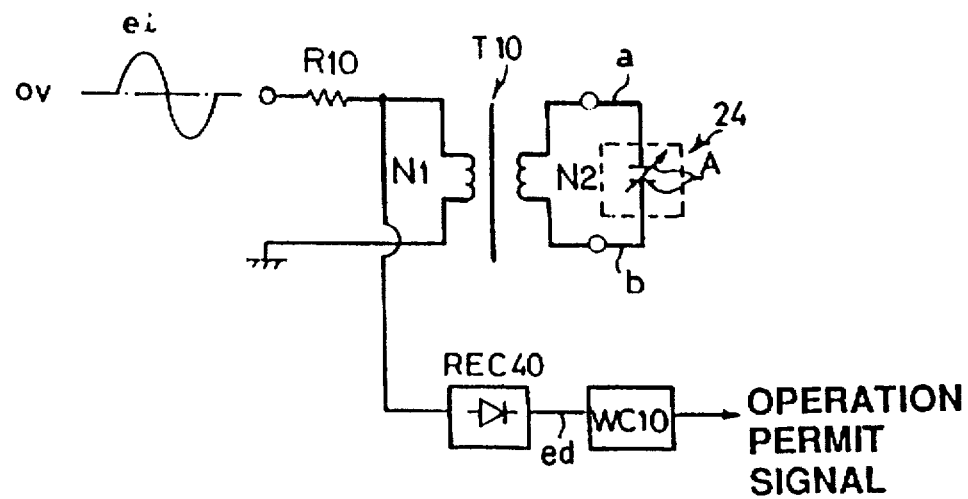
FIG. 26 is a circuit diagram of a first embodiment of a second aspect, which uses a change in electrostatic capacitance value.

FIG. 26 is a circuit diagram of a first embodiment of the second aspect.

In FIG. 26, a sensor portion 24 of this embodiment is of a two lead configuration, with respective single leads a, b connected to a pair of electrode plates A facing each other in spaced apart relation. The electrodes comprising the pair of electrode plates A, are supported in spaced apart relation by means of a flexible intermediate insulation material, with their outside covered by a covering insulation material. A transformer T10 of the second invention, serving as a first transformer, has an AC input signal $e_i$ from a signal source (not shown in the figure) applied by way of a resistor R10 to a primary coil N1. The two ends of a secondary coil $N_2$ are connected to the sensor portion 24 via leads a, b, thus constituting a parallel resonant circuit with the electrode plates A acting as a capacitor. Here the sensor portion 24 corresponds to the body detection device, while the resistor R10 and the transformer T16 constitute an electrostatic capacitance value detection device.

The input terminal of a voltage doubler rectifying circuit REC40 is connected to an intermediate point between the resistor R10 and the primary coil of the transformer T10. The voltage doubler rectifying circuit REC40, rectifies the input signal and outputs this with a constant voltage Vcc superimposed thereon. The output from the voltage doubler rectifying circuit REC40 is applied to the input terminal of a window comparator WC10 serving as a first window comparator. The window comparator WC10 is the beforementioned known fail-safe window comparator which generates an output of logic value 1 when an input signal level is within a predetermined threshold value range, with the output becoming a logic value 0 when outside of the threshold value range or at the time of a fault. The window comparator WC10 and the voltage doubler rectifying circuit REC40 constitute a sensor output generating device.

Next is a description of the operation.

The input signal $e_i$ is voltage divided by the resistor R10 and the impedance of the primary coil $N_1$ side of the transformer T10, and input to the voltage doubler rectifying circuit REC40 where it is rectified and superimposed with a constant voltage $V_{cc}$ and then input to the window comparator WC10 as a DC signal $e_d$.

When the sensor portion 24 is not being stood on, the spacing between the electrode plate pairs of the electrode plates A is increased. The impedance value of the secondary coil of the transformer T10 is set so as to give parallel resonance at the electrostatic capacity of the electrode plates at this time.

When the sensor portion 24 is stood on, the spacing between the electrode plates is reduced so that the electrostatic capacity of the electrode plates A is increased. At this time, the impedance as seen from the primary coil $N_1$ side of the transformer T10 becomes small, and hence the signal level of the input signal $e_i$ which is voltage divided by the resistor R10 and the impedance of the primary coil $N_1$ drops. When the electrode plates are electrically contacted (secondary coil $N_2$ short circuited), then the signal level input to the voltage doubler rectifying circuit REC40 becomes zero. Moreover, when an insulation film is formed on the electrode plate surface, for example by corrosion, then even if the sensor portion 24 is stood on, the electrode plates do not become electrically contacted (secondary coil $N_2$ not short circuited). In this case, the distance between the electrode plates is the thickness of the insulation film, which is much less than for the case where the sensor portion 24 is not being stood on, and hence the electrostatic capacity becomes very large so that the level of the signal input to the voltage doubler rectifying circuit REC40 drops. Moreover, if a disconnection fault occurs in the sensor portion 24 (open circuit of the secondary coil $N_2$), then there is only the self impedance of the primary coil $N_1$ of the transformer T10, so that the level of the signal input to the voltage double rectifying circuit REC40 drops. That is to say, with the circuit of the present embodiment, if the sensor portion 24 is stood on, or malfunctions (including deterioration), then the level of the signal input to the voltage doubler rectifying circuit REC40 drops.

If the primary coil $N_1$ of the transformer T10 becomes disconnected, then the input signal $e_i$ is input directly to the voltage doubler rectifying circuit REC40 via the resistor R10 without being voltage divided. If the input impedance of the window comparator WC10 is made sufficiently larger than the resistance value for the resistor R10, then the level of the DC signal from the voltage doubler rectifying circuit REC40 for input to the window comparator WC10 will become higher than for the case where the sensor portion 24 is not stood on.

Consequently, the lower limit threshold value for the window comparator WC10 is set between the level of the output signal from the voltage doubler rectifying circuit REC40 for when the sensor portion 24 is not being stood on, and the level of the output signal from the voltage doubler rectifying circuit REC40 for when an insulation layer is present so that the electrode plates are not electrically contacted (or for when the sensor portion 24 has a disconnection fault). Moreover the upper limit threshold value of the window comparator WC10 is set between the level of the input signal at the time of a disconnection in the primary coil $N_1$, and the level of the input signal for the case where the sensor portion 24 is not stood on.

If the upper limit threshold value and the lower limit threshold value of the window comparator WC10 are set in this way, then an output of logic value 1 is generated from the window comparator WC10 only when the sensor portion 24 is normal and is not being stood on. This output of logic value 1 serves as an operation permit signal for permitting operation of a movable portion of a machine. The construction is thus fail-safe in that at the time of a fault in the voltage doubler rectifying circuit REC40 or in the window comparator WC10, the output becomes a logic value 0, and hence an operation permit signal of logic value 1 is not generated when these components are faulty.

With such a construction, compared to the case where deterioration of the sensor portion is detected by detecting agreement or disagreement of the outputs from the two sensor portions, it is possible to detect deterioration such as poor contact, with only one sensor portion. Consequently it is possible to maintain safety similar to that for the case where two sensor portions are provided, and also there is the advantage in that costs can be reduced due to a reduction in the number of sensor portions and the resultant simplification of the circuit configuration.

Figure 27:
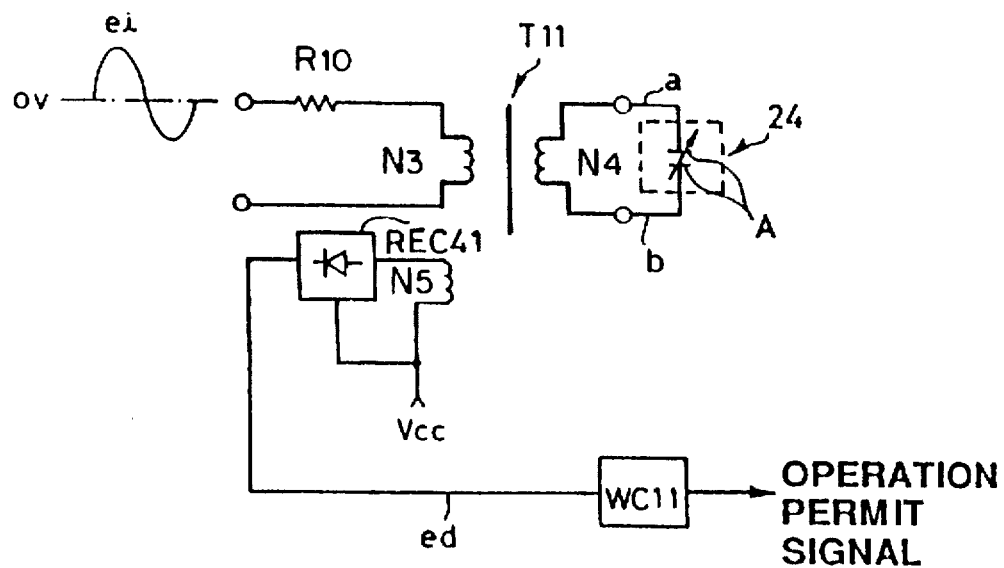
FIG. 27 is a circuit diagram of a second embodiment of the second aspect.

FIG. 27 shows a second embodiment. Components the same as for the first embodiment are denoted by the same symbols, and description is omitted.

In FIG. 27 there is provided a transformer T11 serving as a second transformer and having a primary coil $N_3$, a secondary coil $N_4$, and a tertiary coil $N_5$. The output from the tertiary coil $N_5$ is rectified by a voltage doubler rectifying circuit REC41 and input to a window comparator WC11. With this embodiment, the transformer T11 corresponds to an electrostatic capacitance value detection device, while the voltage doubler rectifying circuit REC41 and the window comparator WC11 constitute a sensor output generating device.

The operation of the second embodiment differs only in the operation at the time of a disconnection fault in the primary coil $N_3$, with other operation being the same as for the first embodiment. If a disconnection fault occurs in the primary coil $N_3$, the transmission path for the input signal $e_i$ is disconnected, and hence the level of the output from the tertiary coil $N_5$ becomes zero.

Consequently, with the second embodiment there is the advantage that the operation permit signal can be stopped at the time of a disconnection fault in the transmission path, even if an upper limit threshold value for the window comparator WC11 is not set.

The self inductance of the primary coil $N_3$ is set so that the level of the output from primary coil $N_3$ becomes sufficiently small when the sensor portion 24 is disconnected, and secondary coil N4 side thus open circuited, and at this time, the winding ratio for primary coil $N_3$ and tertiary coil $N_5$ is set so that the level of the output from tertiary coil $N_5$ also becomes small.

Figure 28:
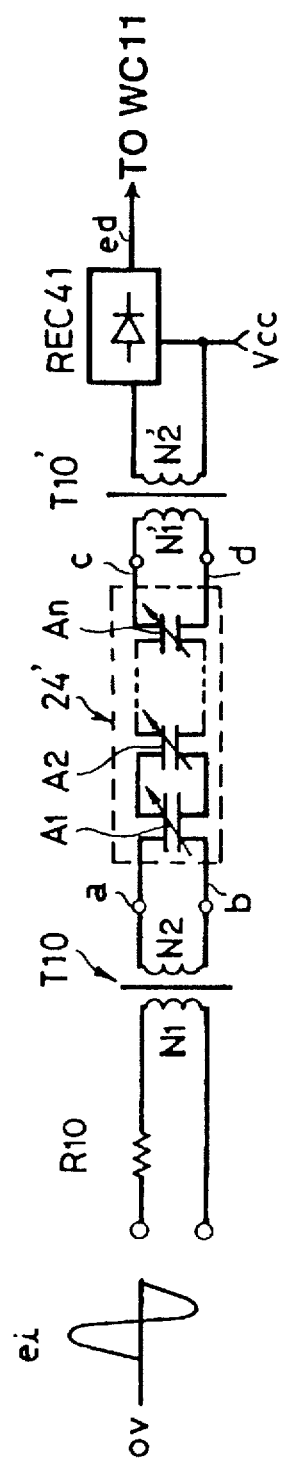
FIG. 28 is a circuit diagram of a third embodiment of the second aspect.

FIG. 28 shows a third embodiment. Components the same as for the first and second embodiments are denoted by the same symbols, and description is omitted.

In FIG. 28, a sensor portion 24' uses a four lead type construction for the respective electrode plates, with a plurality of electrode plate members $A_1$-$A_n$ respectively connected in series, so that in total they make up an electrode plate A. Two leads a, b of the four leads are connected to the electrode plate member A1, while two leads c, d of the four leads are connected to the final electrode plate member $A_n$. A secondary coil $N_2$ of a transformer T10 is connected to the leads a, b. Moreover, a primary coil $N_1'$ of a transformer T10' is connected to the leads c, d. The output from a secondary coil N2' of the transformer 10' is input to a voltage doubler rectifying circuit REC41. With this embodiment, the transformer T10 corresponds to a third transformer and the transformer T10' corresponds to a fourth transformer, and these transformers T10, T10' constitute an electrostatic capacitance value detection device.

In the case of a sensor portion construction as with this embodiment where the pair of electrode plates is made up from a plurality of electrode plate members, then with the circuit configurations of FIG. 26 and FIG. 27, the level drop in the rectified output signal occurring at the time of a disconnection of the final electrode plate member An must be detectable.

With the circuit configuration of the third embodiment, if a disconnection occurs between the electrode plate members $A_1$-$A_n$, then the input signal $e_i$ is not transmitted to the transformer T10', so that the level of the output from the voltage doubler rectifying circuit REC41 becomes zero and the output from the window comparator WC11 becomes a logic value 0. Consequently, a disconnection fault of the final electrode plate member An can also be readily detected. Other operation is the same as for the circuit of the second embodiment and description is thus omitted.

The parallel resonance of the third embodiment can be taken for example as the sum of the self inductance of the secondary coil $N_2$ of the transformer T10 and the electrostatic capacity between the respective electrode plate members of the sensor portion 24', with the inductance of the primary coil $N_1'$ of the transformer T10' set sufficiently large.

Now instead of using the transformer T10', the leads c, d can be connected directly to the voltage doubler rectifying circuit REC41. In this case, if the signal processing circuit including the voltage doubler rectifying circuit REC41 is located away from the sensor portion 24', then the electrostatic capacity of the leads for connecting the sensor portion 24' to the signal processing circuit must be considered. In the case where the transformer T10' is used, then if the transformers T10, T10' are placed close to the sensor portion 24', the electrostatic capacity of the wire for connecting the sensor portion 24' to the signal processing circuit will have no influence. Similarly with the circuit configurations for the first and second embodiments, if only the transformer T10 and the transformer T11 are placed close to the sensor portion 24, the electrostatic capacity of the wire for connecting the sensor portion 24 to the signal processing circuit will have not influence on the parallel resonance.

In the case where the ON/OFF of the sensor portions 24, 24' occurs in a rapid cycle (chattering or the like), then with the circuit of the first through third embodiments, there is the possibility that the DC signal $e_d$ for input to the window comparator will not follow the ON/OFF of the sensor portion 24 so that the signal level becomes averaged. In a worst case scenario where the averaged signal level stays in a range which satisfies the output generating condition for the window comparators WC10, WC11, then an operation permit signal for the movable portion of the machine will be produced irrespective of whether or not there is danger with the operator standing on the mat.

Figure 29:
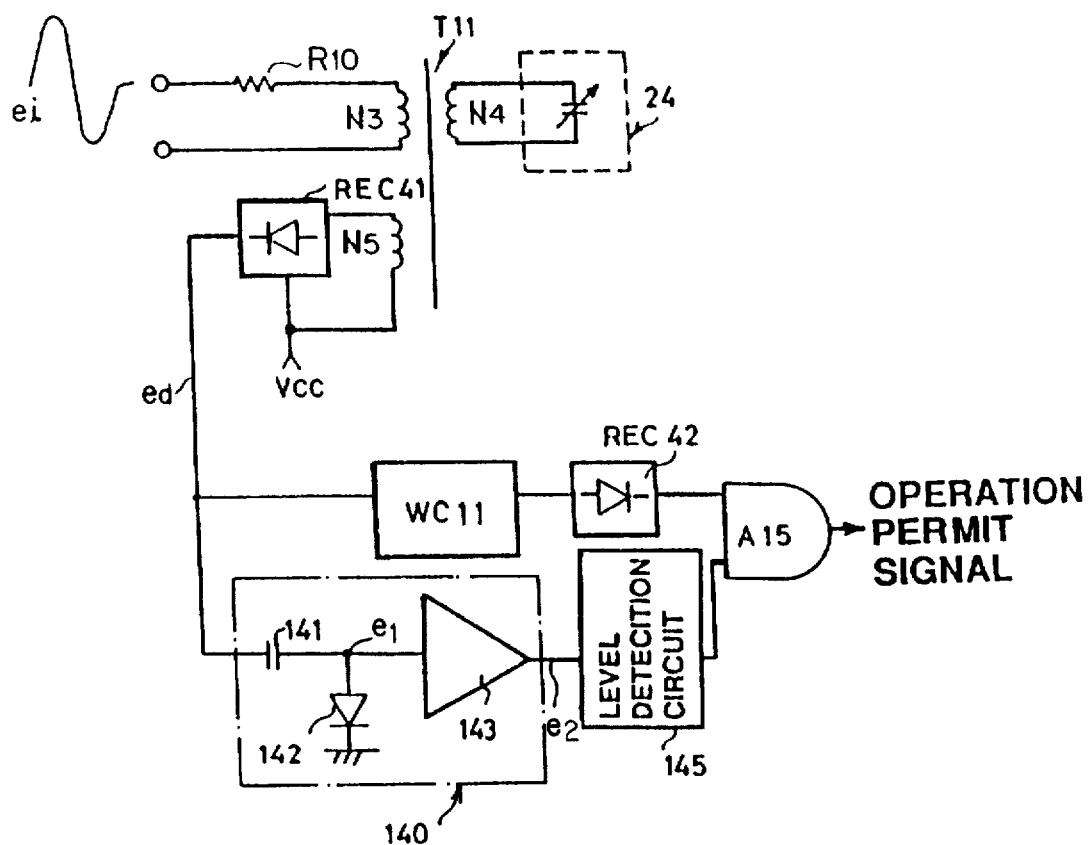
FIG. 29 is a circuit diagram of a fourth embodiment of the second aspect.

FIG. 29 shows a fourth embodiment of the present invention for preventing the occurrence of the abovementioned erroneous operation. With this embodiment an example of an improvement to the circuit of FIG. 27 is shown. However this is also applicable to the circuits of FIG. 26 and FIG. 28.

In FIG. 29, the output from a voltage doubler rectifying circuit REC41 serving as a first rectifying device, is input to a window comparator WC11 serving as a first level detection device, and is also input to a low frequency AC amplifying circuit 140 serving as a first AC amplifying device and comprising a capacitor 141, a diode 142 and an amplifier 143. The AC amplifying circuit 140 has the function of magnifying the signal change accompanying the ON operation of the sensor portion 24, on the time axis. An output signal $e_2$ from the AC amplifying circuit 140 is input to a level detection circuit 145 serving as a second level detection device. The output from the level detection circuit 145 is input to one input terminal of an AND gate A15 serving as a first logical product operating device. The output from the window comparator WC11 is input to the other input terminal of the AND gate A15 via a voltage doubler rectifying circuit REC42.

Figure 30:
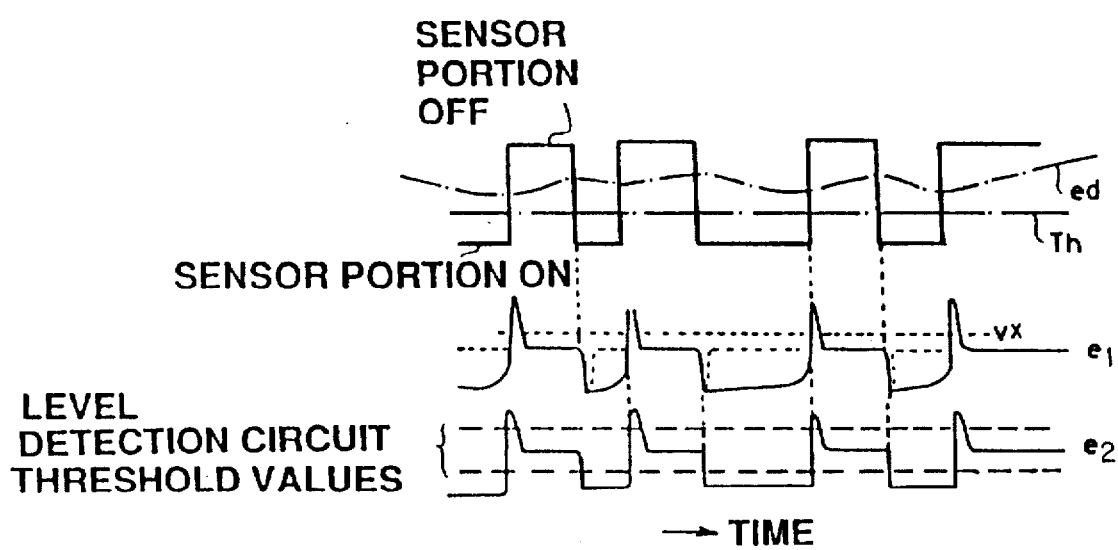
FIG. 30 is a time chart for explaining the operation of the fourth embodiment.

Next is a description of the operation of the circuit of the fourth embodiment with reference to FIG. 30.

When at the time of a rapid ON/OFF cycle for the sensor portion 24, the level of the output signal $e_d$ from the voltage doubler rectifying circuit REC41 is higher than the threshold value Th of the window comparator WC11, an AC signal is generated from the window comparator WC11, so that the input signal to the other input terminal of the AND gate A15 becomes a high level.

When in this condition the sensor portion 24 goes OFF, the level of the signal ed for input to the AC amplifying circuit 140 from the voltage doubler rectifying circuit REC41 is increased. In this case, an input signal $e_1$ for the amplifier 143 changes towards the positive side. However the charge of the capacitor 141 is rapidly discharged via the diode 142, so that the level of the input signal $e_1$ rapidly returns to the level at the time when there was no change in the signal $e_d$. When the sensor portion 24 comes ON so that the level of the signal ed drops, the level of the input signal $e_1$ for the amplifier 143 changes towards the negative side. In this case a reverse bias is applied to the diode 142. The time constant for the level of the input signal $e_1$ for the amplifier 143 to return to the origin is determined approximately by the capacity of the capacitor 141 and the resistances included in the amplifier 143 which are disposed in the path for charging the capacitor 141. By setting this time constant sufficiently large, then the change in the input signal $e_1$ for the amplifier 143 towards the negative side when the sensor portion 24 comes ON, is magnified along the time axis as shown by the full line in FIG. 30, so that after the sensor portion 24 comes ON, this is held for the time determined by the time constant.

In this way, when the sensor portion 24 goes OFF, the level of the input signal $e_1$ for the amplifier 143 is rapidly returned to the level at the time when there was no change in the output signal $e_d$ from the voltage doubler rectifying circuit REC41, while when the sensor portion 24 comes ON, this level returns slowly to the level at the time when there was no change in the output signal $e_d$ from the voltage doubler rectifying circuit REC41. The threshold value range of the level detection circuit 145 is set so that the level of the output signal $e_2$ from the amplifier 143, corresponding to when there was no change in the output signal ed from the voltage doubler rectifying circuit REC41, stays within the range.

Consequently, even at the time of a rapid ON/OFF cycle for the sensor portion 24, when the sensor portion 24 is ON, the output from the level detection circuit 145 is stopped, so that the operation permit signal from the AND gate A15 is stopped.

FIG. 30 shows the operating time chart for the case where the amplifier 143 is a non inversion amplifier.

Figure 31:
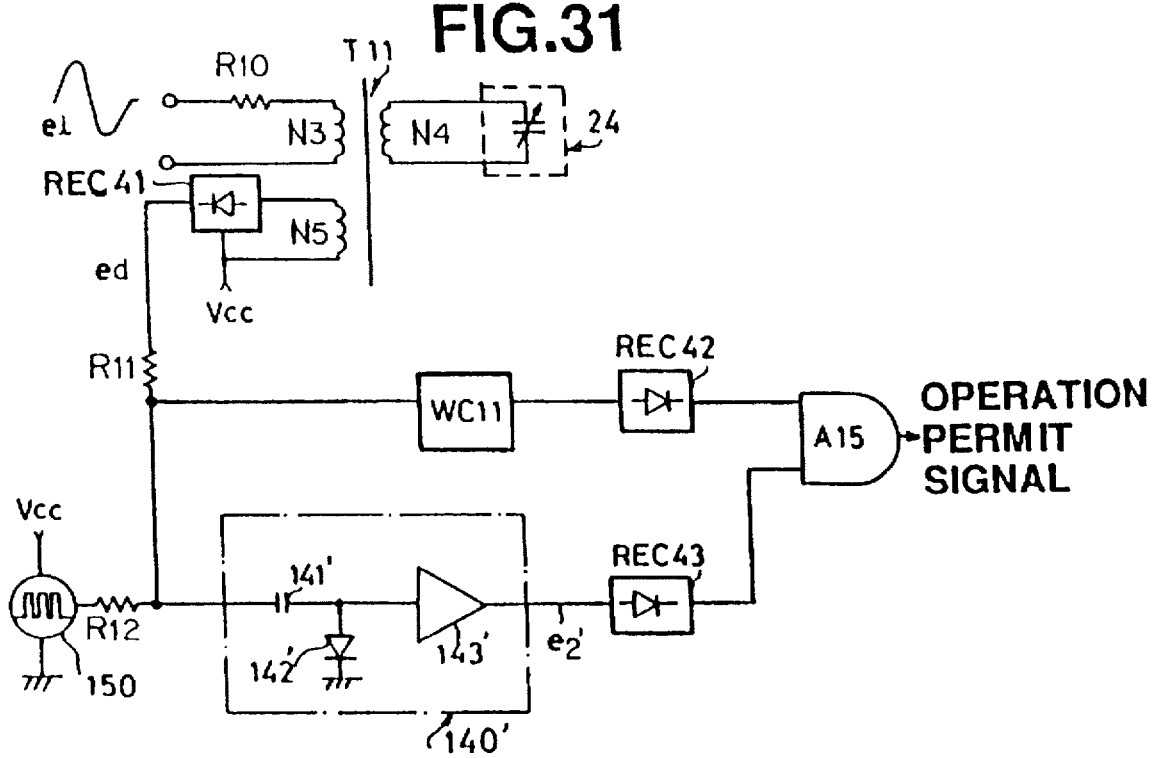
FIG. 31 is a circuit diagram of a fifth embodiment of the second aspect.

FIG. 31 shows a fail-safe construction for the circuit of FIG. 29. Components the same as for the fourth embodiment in FIG. 29 are indicated by the same symbols.

With the fifth embodiment of FIG. 31, a high frequency signal from a signal generator 150 serving as a high frequency signal generating device, is voltage divided by a resistor R11 and a resistor R12 and then superimposed with an output signal $e_d$ from a voltage doubler rectifying circuit REC41 serving as a second rectifying device, and input to an AC amplifying circuit 140' serving as a second AC amplifying device. The AC amplifying circuit 140' comprising a capacitor 141', a diode 142', and an amplifier 143', amplifies up to a saturation level for a change in the output signal $e_d$ from the voltage doubler rectifying circuit REC41. A voltage doubler rectifying circuit REC43 serving as a third rectifying device, is constructed such that a time constant is set so that the high frequency signal from the signal generator 150 is rectified, and the low frequency output signal $e_d$ from the voltage doubler rectifying circuit REC41 is blocked by a coupling capacitor inside the circuit. With this embodiment, the window comparator WC11 corresponds to the second window comparator disclosed in claim 32, while the AND gate A15 corresponds to the second logical product operating device.

Figure 32:
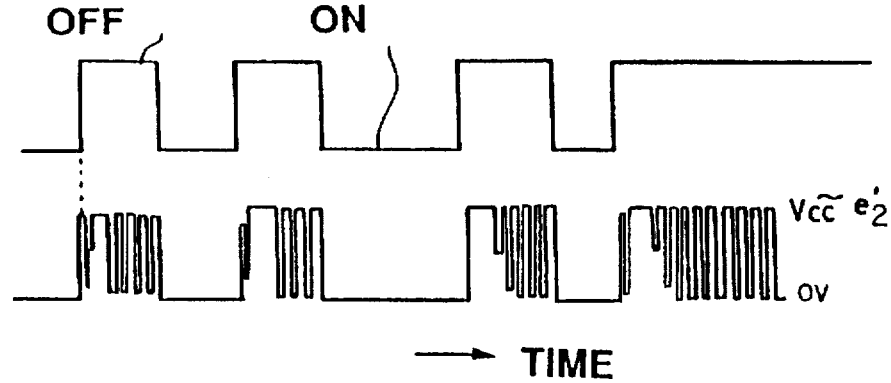
FIG. 32 is a time chart for explaining the operation of the fifth embodiment.

Next is a description of the operation of the fifth embodiment with reference to FIG. 32.

In the case where there is no change in the output signal $e_d$ from the voltage doubler rectifying circuit REC41, then the high frequency signal from the signal generator 150 is amplified by the AC amplifying circuit 140' and an amplified signal $e_2$' is rectified by the voltage doubler rectifying circuit REC43, so that a high level signal is input to the AND gate A15. In the case where the output signal $e_d$ from the voltage doubler rectifying circuit REC41 changes with the ON/OFF operation of the sensor portion 24, then the amplifier 143' becomes saturated so that the high frequency signal from the signal generator 150 is not transmitted to the voltage doubler rectifying circuit REC43. Hence the input signal level to the AND gate A15 becomes a low level. Moreover, with the input signal level to the amplifier 143', as mentioned before at the time of a change towards an increase in the output with the sensor portion 24 going OFF, this rapidly returns to the level for when there was no change, while at the time of a change towards a reduction in the output with the sensor portion 24 coming ON, this slowly returns to the level for when there was no change.

Consequently, as shown in FIG. 32, the amplified signal $e_2$' from the AC amplifying circuit 140' becomes an AC amplified signal immediately after the OFF time when the sensor portion 24 goes OFF, so that a high level signal is input to the AND gate A15. At this time, since the other input signal to the AND gate A15 is also a high level based on the output from the window comparator WC11, then an operation permit signal is produced from the AND gate A15. Furthermore, when the sensor portion 24 is ON, the AC amplified signal is not produced, so that one input signal level for the AND gate A15 becomes a low level and the operation permit signal is thus stopped. Moreover, with the circuit of this embodiment, the voltage doubler rectifying circuit, the window comparator, and the AND gate have a fail-safe construction in that at the time of a fault, the output becomes a logic value 0. Furthermore, the amplifier 143' is constructed so that it does not self oscillate, thus giving a fail safe construction.

At the actual work site, various widths of mat are required. In general, the electrostatic capacity (electrode plate area) for the sensor portion differs in accordance with the mat area. With the circuit configurations of FIG. 26 through FIG. 28, in the case where the resonance is severe (when Q is high; Q is a value indicting the sharpness of the resonance curve), then the electrostatic capacity for when the sensor portion goes OFF, must be set within a predetermined range. Therefore, with each change in the area of the mat (electrostatic capacity of the sensor portion) there is the problem that the self inductance of the secondary coils of the transformers T10, T11 must be changed. In the case where the resonance is not severe (when Q is low), then this is not affected with changes in the mat area (electrostatic capacity of the sensor portion). However, the change in the level when the mat is stood on (when the sensor portion is ON) is reduced. In this case, if the electrode plates are electrically contacted when normal, then the received signal level becomes zero, and hence the ON condition of the sensor portion can be detected. However, at the time of poor contact, due for example to the formation of an insulation film, the received signal level does not become zero, and hence there is the possibility that the drop in level cannot be detected.

With the circuit configurations of FIG. 29 and FIG. 31, since the received signal change for when the sensor portion comes ON is detected, then even if the drop in level is small, it is possible to detect that the sensor portion has come ON. However in the case where the sensor portion continues ON and there is no change in the received signal after a predetermined time, then an output is produced from the AC amplifying circuits 140, 140'. Therefore, if the operator remains on the mat for a long time, an undesirable situation can arise.

Figure 33:
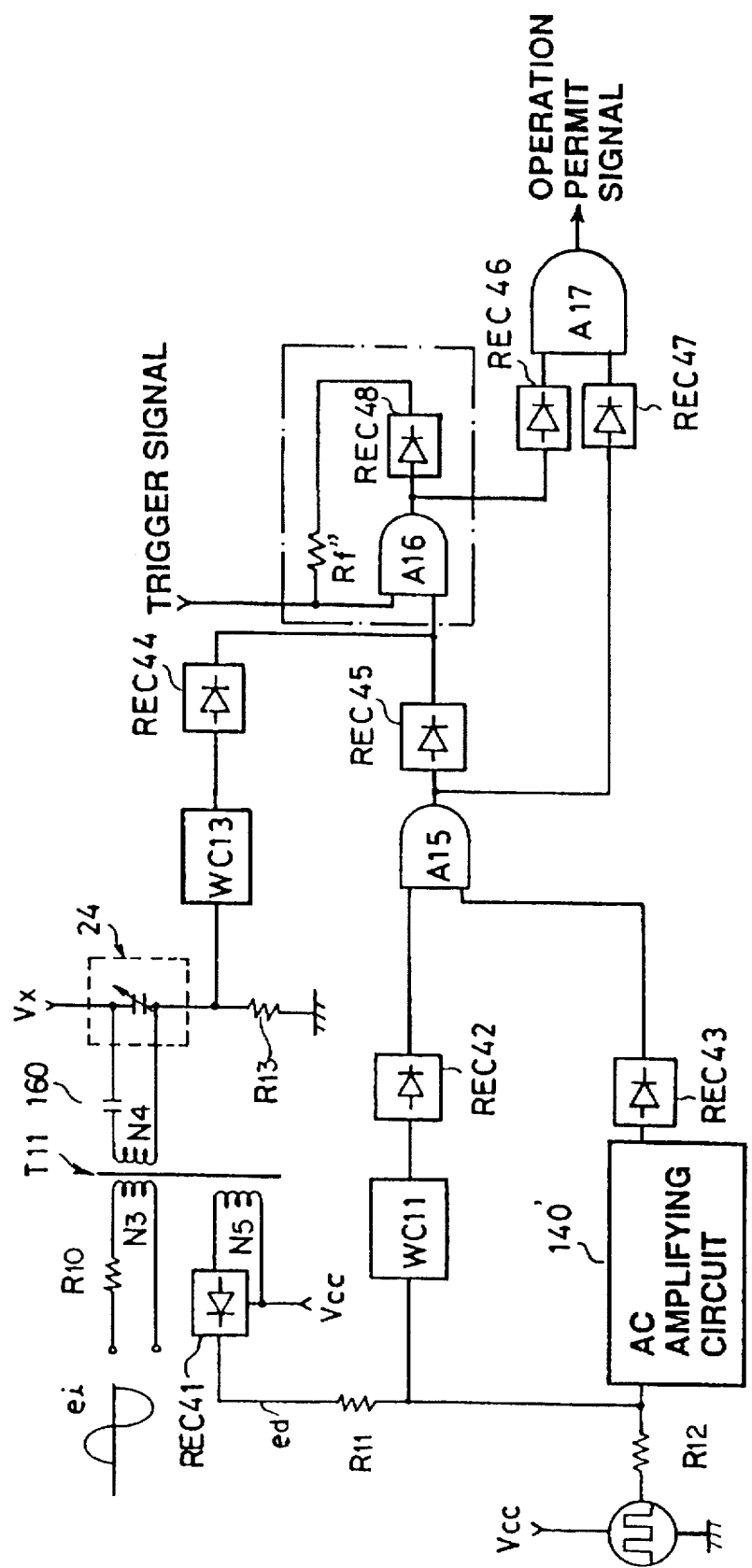
FIG. 33 is a circuit diagram of a sixth embodiment of the second aspect.

FIG. 33 shows a sixth embodiment constructed such that in the case where poor contact of the electrode plates of the sensor portion is monitored, and a poor contact is detected, then after this an operation permit signal will not be produced even if the sensor portion goes OFF.

With the sixth embodiment, the poor contact monitoring function and a function for storing information that a poor contact has been detected, have been added to the circuit of the fifth embodiment. Components the same as in the fifth embodiment are denoted by the same symbols, and description is omitted.

In FIG. 33, a DC signal Vx from a DC power source, is applied across the electrode plates of a sensor portion 24. A capacitor 160 is for blocking the DC signal Vx so that the core of a transformer T11 does not become saturated thereby. A terminal voltage of a resistor R13 serving as a current detection resistor, is input to a window comparator WC13 serving as a third level detection device. The output from the window comparator WC13 is rectified by a voltage doubler rectifying circuit REC44. A rectified output from the voltage doubler rectifying circuit REC44, and a rectified output from a voltage doubler rectifying circuit REC45 based on an output from an AND gate A15, are wired-OR connected and input to one input terminal of an AND gate A16. A power source switch on signal or the like is input to the other input terminal of the AND gate A16 as a trigger signal. The output from the AND gate A16 is input to one input terminal of an AND gate A17 via a voltage doubler rectifying circuit REC46. The output from the AND gate A15 is input to the other input terminal of the AND gate A17 via a voltage doubler rectifying circuit REC47. The output from the AND gate A16 is fed back to the trigger signal input terminal side via a voltage doubler rectifying circuit REC48 and a feed back resistor Rf". Consequently, a self hold circuit serving as a first self hold device is constructed by the AND gate A16, the voltage doubler rectifying circuit REC48 and the feed back resistor Rf", with the input side of the beforementioned wired-OR output as a reset terminal, and the power source switch on signal side as a trigger terminal, and is made fail-safe by having the same construction as the self hold circuit shown in FIG. 4.

The resistor R13 is set sufficiently large so as to have no influence on the parallel resonance. Furthermore, when the sensor portion 24 is OFF, the DC signal Vx is not transmitted directly to the resistor R13, however since the AC signal corresponding to that at the two ends on the secondary coil N4 of the transformer T11 is input, then the DC signal Vx is set sufficiently larger than this AC signal level. Here the wired-OR connection configuration corresponds to a first logical sum operating device, while the AND gate A17 corresponds to a third logical product operating device. Moreover, a poor contact checking device incorporates the resistor R13, the DC power source, the window comparator WC13, and the voltage doubler rectifying circuit REC44.

Next is a description of the operation.

When the sensor portion 24 comes ON, the DC signal Vx is applied to the resistor R13 via the electrode plates, so that the input level to the window comparator WC13 becomes Vx. If there is a poor contact at the electrode plates, the input level to the window comparator WC13 becomes less than the DC signal Vx. If the lower limit threshold value of the window comparator WC13 is set to be slightly lower than the DC signal Vx, then provided that the electrode plates of the sensor portion 24 are electrically contacted, an output is generated from the window comparator WC13. On the other hand, the AND gate A15 produces an output in the case where there is no change in the electrostatic capacity between the electrode plates with the sensor portion 24 OFF, in a similar manner to with the fifth embodiment of FIG. 31. The outputs from the window comparator WC13 and the AND gate A15 are respectively rectified by the voltage doubler rectifying circuit REC44 and the voltage doubler rectifying circuit REC45, and then wired-OR connected and input to the reset terminal of the AND gate A16. Here the voltage doubler rectifying circuit REC44 and the voltage doubler rectifying circuit REC45 alternately produce outputs following the ON and OFF switching of the sensor portion 24. However these are constructed with respective off-delay functions so that one does not go OFF until an output has been produced from the other, and hence the wired-OR output is not stopped during the transition between ON and OFF of the sensor portion 24.

Consequently, if the sensor portion 24 is normal, the input level to the reset terminal of the AND gate A16 is always a logic value of 1, and hence when, for example with switching on of the power source, a trigger signal is input to the trigger input of the AND gate A16, then an output is produced from the AND gate A16 due to the input of the wired-OR output to the reset terminal, thus giving self hold. Consequently, when the sensor portion 24 is normal, the output from the AND gate A16 is continually produced, and continuously input to one input terminal of the AND gate A17 via the voltage doubler rectifying circuit REC46.

Therefore, when the operator is not present on the mat so that the sensor portion 24 is OFF, an operation permit signal is produced due to the output from the AND gate A15 being input to the other input terminal of the AND gate A17 via the voltage doubler rectifying circuit REC47. When the operator is on the mat so that the sensor portion 24 is ON, then the output from the AND gate A15 ceases so that the operation permit signal from the AND gate A17 stops.

When the electrode plates of the sensor portion 24 are contacted due to the operator being on the mat, then in the case of poor contact, due for example to the formation of an insulation film, an output is not produced from the window comparator WC13, and moreover an output is not produced from the AND gate A15 side. Consequently, the reset input signal to the AND gate A16 stops and the output from the AND gate A17 ceases, so that the operation permit signal from the AND gate A16 stops. In the case where the reset input signal for the AND gate A16 is once stopped, then provided that the trigger signal is not again input, an output will not be produced from the AND gate A16. Consequently, if a poor contact is once detected, then this information is stored, and even if the sensor portion 24 subsequently goes OFF, provided that a trigger signal is not applied with switching on of the power source, an operation permit signal will not be produced.

To increase the poor contact checking sensitivity, the resistance value of the resistor R13 may be set small.

The respective voltage doubler rectifying circuits, the window comparator and the AND gate have a fail safe construction in that at the time of a fault, then the output becomes a logic value 0 corresponding to a low energy condition, and hence if a fault occurs therein, the operation permit signal is stopped. Moreover, in the case where the capacitor 160 has a short circuit fault, then the core of the transformer T11 becomes saturated so that the output from the voltage doubler rectifying circuit REC41 drops, and the operation permit signal is stopped. Consequently, the circuit of this embodiment has a fail safe construction, and is thus able to suitably maintain operator safety.

Figure 34:
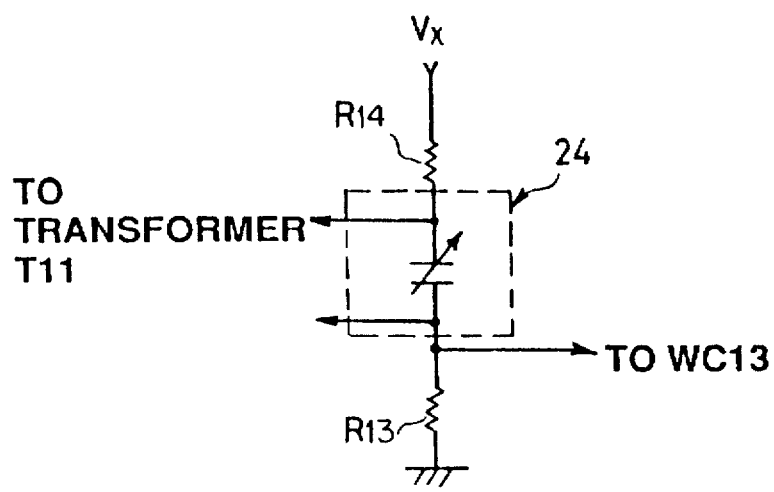
FIG. 34 is a partial circuit diagram of a seventh embodiment of the second aspect.

FIG. 34 shows a seventh embodiment where the circuit of the sixth embodiment of FIG. 33 is improved so as to be able to detect a disconnection fault in the resistor R13.

In FIG. 34, a resistor R14 is provided in series with the resistor R13 in the transmission path for the DC signal Vx.

With such a construction, when the sensor portion 24 is ON, the input level to the window comparator WC13, which corresponds to the third window comparator, becomes a level which has been voltage divided by the resistor $R_{14}$ and the resistor $R_{13}$ ($R_{13} \cdot V_x/(R_{13}+R_{14})$), where R13, R14 in this equation indicate the resistance values of the resistors R13, R14. At the time of a disconnection fault in the resistor $R_{13}$, then when the sensor portion 24 comes ON, if the input impedance of the window comparator WC13 is set sufficiently great, the input level to the window comparator WC13 becomes approximately Vx. Consequently, if the upper limit threshold value of the window comparator WC13 is set between $V_x$ and $R_{13} \cdot Vx/(R_{13}+R_{14})$, then at the time of a disconnection fault in the resistor $R_{13}$, the output from the window comparator WC13 stops.

For example, to detect that the contact resistance value is Rr or less, then the lower limit threshold value of the window comparator WC13 can be set between $R_{13} \cdot V_x/(R_{13}+R_{14})$, and $R_{13} \cdot V_x/(R_{13}+R_{14}+R_r)$.

Other details of the circuit configuration are not shown in the figure but are the same as for the sixth embodiment.

Figure 35:
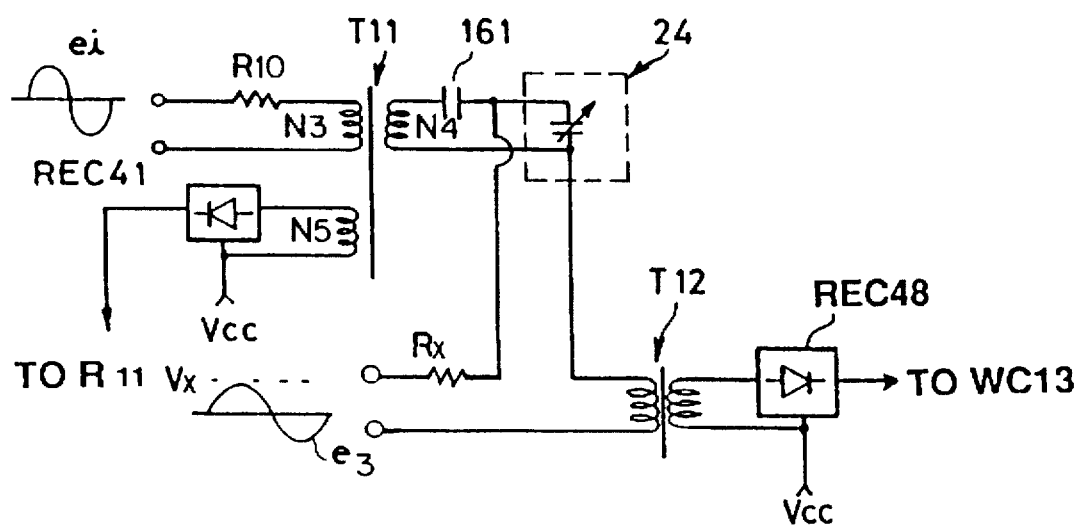
FIG. 35 is a partial circuit diagram of an eighth embodiment of the second aspect.

In FIG. 33 and FIG. 34, a DC signal is used to monitor the contact resistance, however as shown in FIG. 35, a low frequency AC signal may be used.

With the eighth embodiment shown in FIG. 35, a low frequency AC signal $e_3$ of a sufficiently lower frequency than the frequency of the input signal $e_i$, is applied across the electrode plates of the sensor portion 24, from an AC power source. A capacitor 161 is inserted so that the core of the transformer T11 does not become saturated due to the signal $e_3$. A transformer T12 serving as a fifth transformer, is provided in series with the sensor portion 24. The output from the secondary coil side of the transformer T12 is rectified by a voltage doubler rectifying circuit REC48 and then input to a window comparator WC13. Other details of the circuit configuration are not shown in the figure but are the same as for the sixth embodiment.

With such a construction, when the sensor portion 24 is ON, the signal $e_3$ is sampled via the transformer T12, and rectified by the voltage doubler rectifying circuit REC48, and then input to the window comparator WC13. At the time of poor contact of the sensor portion 24, the signal level sampled by the transformer T12 based on the signal $e_3$ drops, causing a drop in the input level to the window comparator WC13, so that the output from the window comparator WC13 stops.

When the sensor portion 24 is OFF, then the signal based on the input signal $e_i$, is transmitted to the transformer T12. However if the signal level Vx of the low frequency AC signal $e_3$ is set sufficiently larger than the input signal $e_i$, then by appropriately setting the threshold value of the window comparator WC13, it is possible to sufficiently discriminate between the input signal $e_i$ and the signal $e_3$ using the level detection function of the window comparator WC13. Hence it is possible to have a construction such that the window comparator WC13 does not produce an output with the input signal $e_i$. Moreover, at the time of a short circuit in the capacitor 161, the core of the transformer T11 becomes saturated due to the signal $e_3$ so that the output from the voltage doubler rectifying circuit REC41 drops, and the operation permit signal is stopped.

Figure 36:
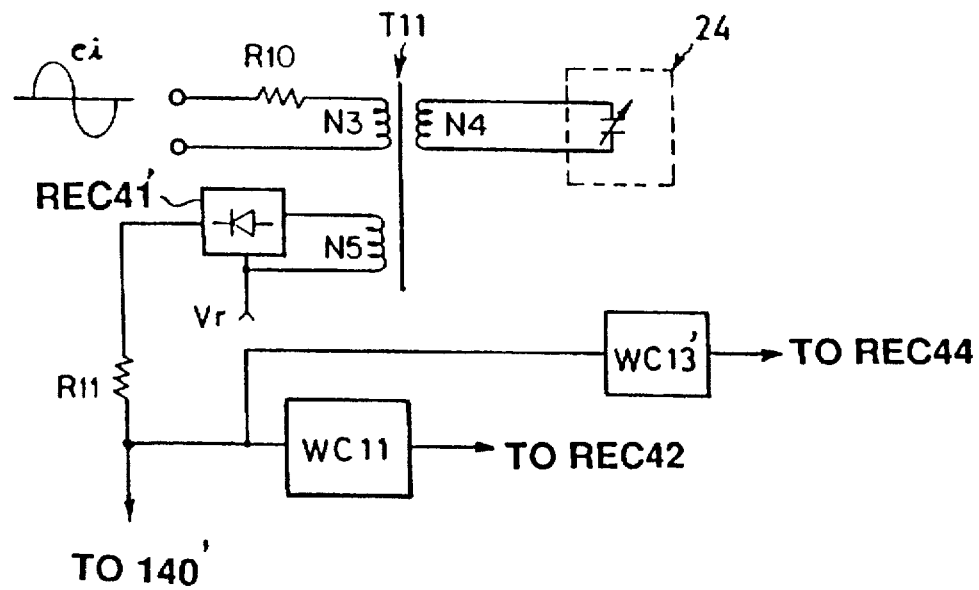
FIG. 36 is a partial circuit diagram of a ninth embodiment of the second aspect.

FIG. 36 shows a different embodiment for monitoring the contact resistance. With this embodiment, only the parts differing from the sixth embodiment of FIG. 33 are shown.

With the ninth embodiment of FIG. 36, the signal source for monitoring for poor contact is not connected to the sensor portion 24. The construction involves a voltage doubler rectifying circuit REC41' which rectifies the output sampled from the tertiary coil N5 of the transformer T11, and rather than the constant voltage $V_{cc}$ shown in FIG. 33, a bias signal Vr greater than $V_{cc}$ is superimposed onto the rectified output. A window comparator WC13' serving as a fourth window comparator, is provided instead of the window comparator WC13, and takes the output signal from the voltage doubler rectifying circuit REC41' in parallel with the window comparator WC11.

With such a construction, if the sensor portion 24 is normal, then when the sensor portion 24 comes ON, the output from the tertiary coil $N_5$ of the transformer T11 becomes zero. Consequently, the output level from the voltage doubler rectifying circuit REC41' becomes the bias signal Vr. On the other hand, if there is poor contact between the electrode plates of the sensor portion 24, then some output will be generated from the tertiary coil $N_5$ of the transformer T11, and hence the output level from the voltage doubler rectifying circuit REC41 will be greater than Vr. If the threshold value for the upper limit of the window comparator WC13 is set within a range which is less than the output level at the time of such poor contact but still greater than the level of the bias signal Vr, then when there is no output from the transformer T11, an output will be produced from the window comparator WC13.

With the abovementioned ninth embodiment, in the case where the insulation film is thin, then when the electrode plates are contacted under foot pressure, the insulation film is easily ruptured. Hence the thinner the insulation film the larger the change (increase) in electrostatic capacity when the foot pressure acts on the sensor portion 24, with the output level from the voltage doubler rectifying circuit REC41' ultimately approaching the level of the signal Vr. Consequently if the detection sensitivity for the insulation film is to be increased, then the requirements in setting the upper limit threshold value for the window comparator WC13' become strict. However, since when the insulation film is thin, the drop in the output from the transformer T11 is great, then by appropriately setting the threshold value for the window comparator WC11, the window comparator WC11 can be given the function of detecting the insulation film. By giving the thin insulation film detection function to the window comparator WC11 side, then the upper limit threshold value for the window comparator WC13' side can be set so as to have some margin. Hence the poor contact checking becomes stable, and the reliability of the circuit is thus improved.

Figure 37:
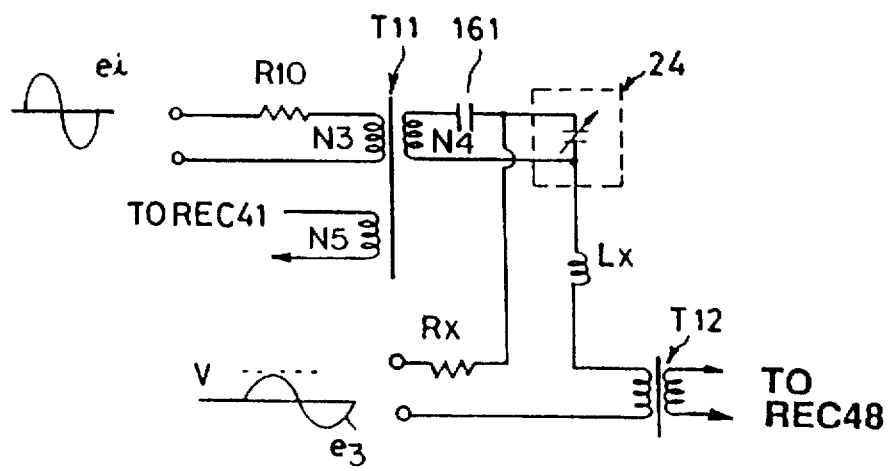
FIG. 37 is a partial circuit diagram of a tenth embodiment of the second aspect.

FIG. 37 shows a tenth embodiment, being an improvement on the circuit of the eight embodiment of FIG. 35. Components the same as for the eight embodiment are denoted by the same symbols, and description is omitted.

In FIG. 37, a coil Lx serving as an inductance coil, is inserted in the transmission path of the signal $e_3$ to the transformer T12.

With the construction of FIG. 35, since the input signal $e_i$ is transmitted to the secondary side of the transformer T12 when the sensor portion 24 is OFF, then the level of the input signal $e_i$ must be set so as to be smaller than the level of the signal $e_3$. If the transformer T12 is a low frequency transformer, then this becomes a capacitive load on the high frequency input signal $e_i$ and thus has an influence on the parallel resonance. If the resistor Rx is large, then it is difficult to set the through current at the time of contact between the electrode plates of the sensor portion 24 to a suitably large value. If this current value is small, then a current will not flow, even with slight corrosion on the contact faces of the electrode plates. Normally, for a mechanical switch, a minimum value for ensuring a current flow when switched ON is determined, and if less than this minimum value, a current cannot be ensured. Hence it is necessary to pass a current greater than this minimum value.

In FIG. 37, the coil Lx comprises a core having for example an air gap (open magnetic path), so that the high frequency characteristics are not degraded due to the core becoming saturated when superimposed with a low frequency. The inductance of the coil Lx is set so that the impedance of the coil Lx is sufficiently larger than the impedance at the time of parallel resonance determined by the transformer T11 and the electrostatic capacity of the sensor portion 24.

Consequently, with the transmission path of the low frequency signal $e_3$, transmission of the high frequency input signal $e_i$ to the sensor portion 24 is not disturbed. Moreover, since the high frequency signal $e_i$ of a low level due to attenuation by the coil Lx, is applied to the primary side of the transformer T12 serving as the signal receiving portion for the low frequency signal $e_3$, then the secondary side output from the transformer T12 based on the input signal $e_i$ is sufficiently small. The resistor Rx is set to a small value so that a sufficient current flow can be maintained at the time of contact of the sensor portion 24. In a worst case scenario with a short circuit of the coil Lx, then an impedance corresponding approximately to the resistance value of the resistor Rx is seen from the primary side of the transformer T11, so that the level applied to the primary side of the transformer T11 becomes extremely small. Therefore, a signal based on the received signal for the input signal $e_i$ is not produced. That is to say, whether or not the high frequency elimination function of the coil Lx is normal can be checked for by the received signal level of the input signal $e_i$.

Figure 38:
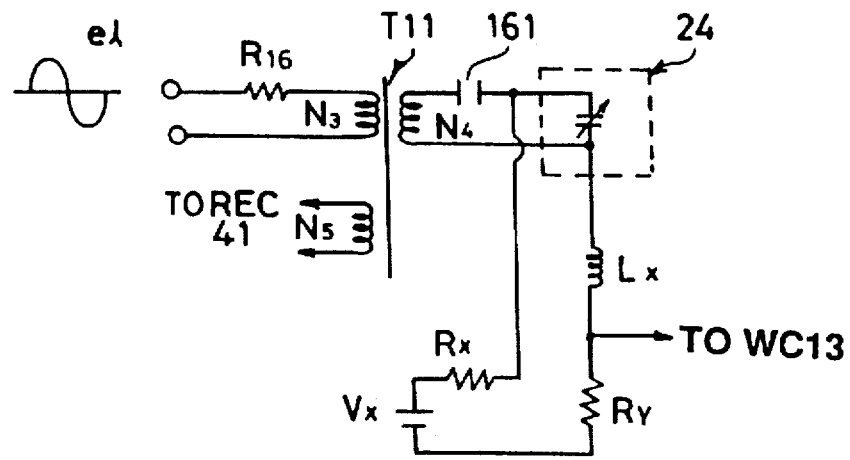
FIG. 38 is a partial circuit diagram of an eleventh embodiment of the second aspect.

Now instead of the low frequency AC signal $e_3$, a DC signal Vx may be used, as with an eleventh embodiment shown in FIG. 38. In this case, the construction may be such that a resistor RY is provided in place of the transformer T12, and the change in the terminal voltage of the resistor Ry is input to a window comparator WC13.

Moreover, with the circuit configuration of FIG. 37, the high frequency characteristics of the coil Lx for blocking high frequencies is changed by a low frequency signal. Consequently the high frequency signal can be amplitude modulated, and the resultant change component detected, so that when a change component exists, this is made to indicate the presence of an object.

That is to say, the coil Lx may be provided so that when a low frequency signal e3 is superimposed, the high frequency characteristics change. In this case, the coil Lx may for example comprise a core with no air gap (closed magnetic path).

In this way, in FIG. 37, if an operator is present on the mat, then even if the electrode plates do not pass a current due to the influence for example of the insulation film, since the distance between the electrode plates is reduced so that the electrostatic capacity increases, then the low frequency signal e3 flows along the path of the resistor Rx, the electrode plates of the sensor portion 24, the coil Lx and the transformer T12. Due to this low frequency signal $e_3$, the high frequency characteristics of the coil Lx (the characteristics related to the frequency of the input signal ei) are changed, so that the input signal ei component transmitted from the transformer T11 to the electrode plates of the sensor portion 24 is amplitude modulated and received by the transformer T12. If a circuit, for example an AC amplifier, for detecting the change component in the received signal is provided on the output side of the transformer T12, then the amplitude modulation of the input signal $e_i$ can be detected by the AC amplifier. Hence, even in the case where an insulation film is formed, the occurrence of an output indicating that the operator is not present can be prevented by the detection of the amplitude modulation, when an operator is present on the mat.

Figure 39:
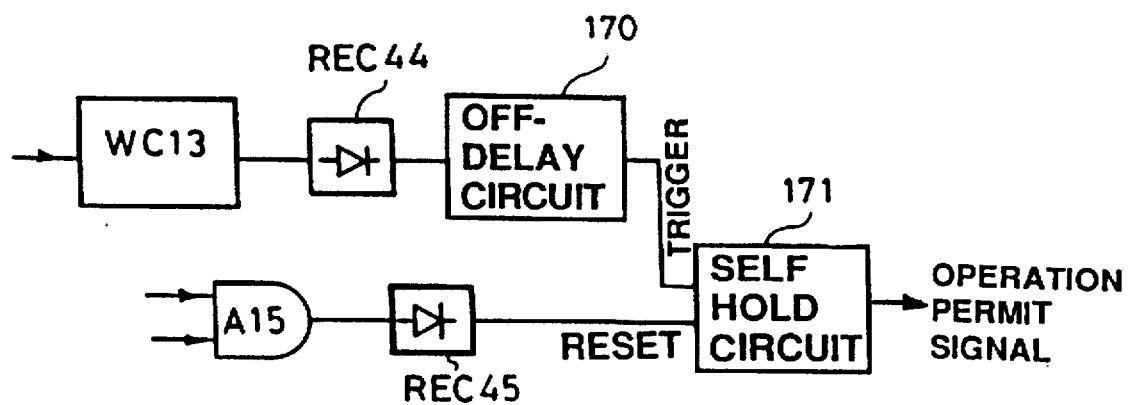
FIG. 39 is a partial circuit diagram of a twelfth embodiment of the second aspect.

FIG. 39 shows a twelfth embodiment constructed such that after verifying the generation of a detection signal for the sensor portion being ON, an operation permit signal is not generated until the sensor portion has gone OFF.

In FIG. 39, the rectified output from the voltage doubler rectifying circuit REC44 for the window comparator WC13 as per FIG. 33, is input to the trigger terminal side of a self hold circuit 171 serving as a second self hold device, via an off-delay circuit 170. Moreover, the rectified output from the voltage doubler rectifying circuit REC45 for the AND gate A15 as per FIG. 33, is input to the reset terminal side of the self hold circuit 171. The output from the self hold circuit 171 is made the operation permit signal. The self hold circuit 171 has a fail safe construction comprising the beforementioned AND gate, voltage doubler rectifying circuit, and feedback resistor.

Next is a description of the operation.

In the case where the sensor portion 24 is normal with no poor contact, then when an operator is present on the mat, an output is produced from the window comparator WC13 so that a signal is input to the trigger terminal of the self hold circuit 171 via the voltage doubler rectifying circuit REC44 and the off-delay circuit 170. After this, when the operator moves away from the mat, an output is produced from the AND gate A15 so that a signal is input to the reset terminal of the self hold circuit 171 via the voltage doubler rectifying circuit REC45. The sensor portion 24 thus goes from ON to OFF and at the same time the output from the window comparator WC13 stops. However due to the off-delay circuit 170, after the output from the window comparator WC13 stops, the trigger signal of the self hold circuit 171 is held for a predetermined time. If while the trigger signal is being held, a reset signal based on the output from the AND gate A15 is input to the self hold circuit 171, then an operation permit signal is produced from the self hold circuit 171.

With such a construction, at the time of first using the mat it is first verified that the mat sensor produces a normal ON detection signal when the mat is once stood on, after which the mat can be used. If an operation permit signal is produced when the mat has been stood on and the foot then removed, this verifies that the mat sensor is normal, while if an operation permit signal is not produced, this shows that the mat sensor is abnormal.

Figure 40:
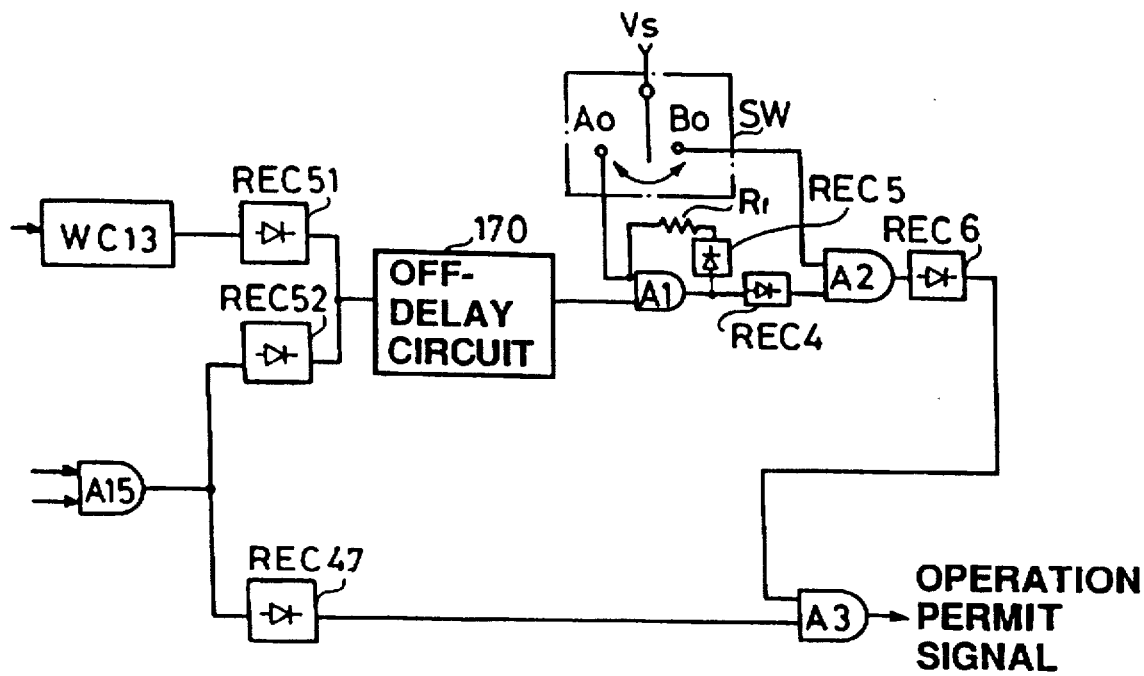
FIG. 40 is a partial circuit diagram of a thirteenth embodiment of the second aspect.

FIG. 40 shows a thirteenth embodiment, being an improvement on the twelfth embodiment of FIG. 39.

With the configuration of FIG. 39, when there is a poor contact at a portion between the electrode plates of the sensor portion 24, then in a situation where an operation permit signal is being produced, when the poor contact portion is stood on, the reset signal for the self hold circuit 171 is stopped thus stopping the self hold output. However, if after this a normal portion with no poor contact is stood on, then the trigger signal is produced so that again a self hold output is produced, and the operation permit signal is generated. That is to say, there is the possibility that the presence of a poor contact portion will be overlooked.

Furthermore, if the poor contact portion is spread out, then if the operator stands with one foot on the normal contact portion, and then stands on the poor contact portion with the other foot and removes the foot pressing on the normal contact portion, there is the possibility that a self hold output will be generated under conditions that the one foot remains on the poor contact portion. Now if the poor contact portion is stood on with the foot which has separated from the good contact portion, then the electrostatic capacity is further increased so that the level changes, and hence the output from the AND gate A15 side stops and the self hold output ceases.

With FIG. 40, the construction is such that if a poor contact portion is once stood on, then the self hold output is stopped so that the operation permit signal can be locked at the stop side. Hence the beforementioned overlooking of the poor contact portion can be avoided.

With the circuit of FIG. 40, the output from the window comparator WC13 and the AND gate A15 of FIG. 33, is treated using a pre-setting mechanism resembling the manual switch SW shown in FIG. 4.

That is to say, in FIG. 40, the respective voltage doubler rectified outputs from the respective voltage doubler rectifying circuits REC44 and REC45 for the window comparator WC13 side and the AND gate A15 side, are wired-OR connected and input to an off-delay circuit 170. The output from the off-delay circuit 170 is input to a reset terminal side of an AND gate A2 of a self hold circuit which is pre-set using the manual switch SW shown in FIG. 4. The output from the AND gate A1, is input to one input terminal of the AND gate A3 via the AND gate A2, in a similar manner to in FIG. 4. On the other hand, the voltage doubler rectified output from the voltage doubler rectifying circuit REC47 on the AND gate A15 side, is input to the other input terminal of the AND gate A3.

With such a construction, as with the circuit operation of FIG. 4, after power has been switched on to the sensor portion 24, then if the sensor portion 24 is normal, an output is produced from the AND gate A1 with switching on of the manual switch SW, and on switching off the manual switch SW, a normal judgment signal is input to the AND gate A3 from the AND gate A2. In this condition, if an operator is not present on the mat, then due to the output from the AND gate A15 side, an operation permit signal of logic value 1 indicating the absence of the operator is generated from the AND gate A3.

In the case where there is a poor contact portion on a part of the sensor portion 24, and the operator stands on that poor contact portion, then the self hold output from the AND gate A1 stops, the output from the AND gate A2 stops, and hence the operation permit signal from the AND gate A3 is stopped. Furthermore, even if subsequently the operator stands on a normal contact portion, then provided the manual switch is not again switched on, a trigger signal will not be input to the trigger terminal of the AND gate A1.

Consequently, with the thirteenth embodiment of FIG. 40, if once the poor contact portion is stood on, then after this, even if a normal contact portion is stood on, provided that the manual switch is not again switched on, an operation permit signal will not be not produced. Hence the presence of the poor contact portion is not overlooked.

Figure 41:
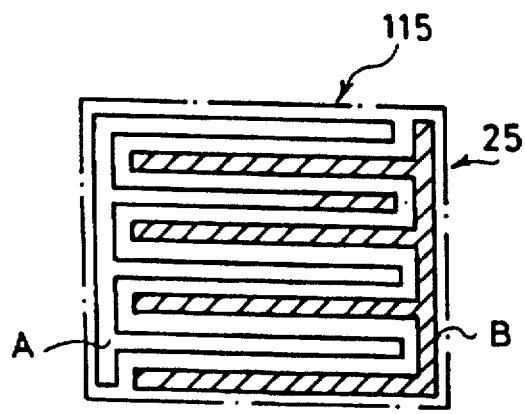
FIG. 41 is a structural diagram of a sensor portion of a fourteenth embodiment of the second aspect.

With the respective embodiments of the above described electrostatic capacity type mat sensor, a mat sensor which uses one type of electrode plate A as the electrodes inside the mat has been illustrated. However a sensor portion 25 as shown in FIG. 41 constructed with a pair of electrode plates A, B of two types of different electrode plate materials (for example copper and stainless steel) arranged alternately inside a mat 115, is also possible. In this case, the construction may be such that if there is at least one object detection signal based on the electrostatic capacity change of the two electrode plates A, B, then an operation permit signal is generated. With such a construction, since it is unlikely for the different electrode plate materials to produce the same fault simultaneously under the same circumstances, then even if one of the electrode plates faults, object detection is possible with the other electrode plates. Hence redundancy is possible, with the advantage that mat sensor reliability is increased and operator safety is even further ensured

INDUSTRIAL APPLICABILITY

The present invention can reliably detect the presence of an operator entering into a danger region in which a machine can move, and moreover, is able to detect abnormalities such as poor contact accompanying deterioration of the mat sensor. Hence operator safety can be ensured, and industrial applicability is thus considerable.

We claim:

1. A mat sensor comprising: mat shaped body detection means including a plurality of sensor portions, wherein each sensor portion includes a pair of mutually facing electrode plates which are contacted when the pressure from a body acts from above, thus producing a body present detection signal, and which are separated when the pressure is released, thus producing a body absent detection signal, agreement or disagreement detection means for detecting agreement or disagreement between detection signals from the sensor portions of said body detection means, judgment means for generating a normal judgment signal for said body detection means when agreement detection information is input from said agreement or disagreement detection means, and stopping said normal judgment signal when disagreement detection information is input from said agreement or disagreement detection means, and sensor output generating means for generating, on the condition that the normal judgment signal is being generated from said judgment means, a sensor output signal indicating the absence of the body, only when all said detection signals from said respective sensor portions of said body detection means are body absent detection signals.

2. A mat sensor according to claim 1, wherein said plurality of sensor portions including four lead type first and second sensor portions each with two pairs of leads connected to the planar of first and second electrode plates facing each other in spaced apart relation.

3. A mat sensor according to claim 2, wherein said body detection means comprises a first mat with said first and second of electrode plates of said first sensor portion covered with insulation material, and a second mat with said first and second electrode plates of said second sensor portion covered with insulation material, and said first mat and second mat are laid on top of each other.

4. A mat sensor according to claim 2, wherein said body detection means comprises a single mat with the electrode plates of said first sensor portion made up of a plurality of electrode plate members connected together in series, and the electrode plates of said second sensor portion similarly made up of a plurality of electrode plate members connected together in series, and the electrode plate members of said first sensor portion and the electrode plate members of said second sensor portion arranged alternately and at a narrower spacing than the footprint width of the body, within an insulation member.

5. A mat sensor according to claim 4, wherein said body detection means is constructed with an insulation plate incorporated into a peripheral portion of the mat, so that foot pressure acts simultaneously on an electrode plate member of the first sensor portion and an electrode plate member of the second sensor portion.

6. A mat sensor according to claim 4, wherein said body detection means is constructed with electrode plate members having surface areas less than those of the respective electrode plate members of the first and second sensor portions arranged at a central portion of the mat, densely arranged at a peripheral portion of the mat.

7. A mat sensor according to claim 4, wherein said plurality of sensor portions further including a third sensor portion at a peripheral portion of the mat, with a pair of mutually facing electrode plates which are contacted when the body pressure acts, thus producing a body present detection signal, and which are separated when the body pressure is released, thus producing the body absent detection signal, and said agreement or disagreement detection means outputs to said judgment means an output from a logical sum operation on the body present detection signal from the third sensor portion and the agreement or disagreement detection information from the first and second sensor portions, and an output from a logical product operation on the body absent detection signals from the first, second and third sensor portions is output to the sensor output generating means.

8. A mat sensor according to claim 4, wherein said plurality of sensor portions further including a third sensor portion at a peripheral portion of the mat, with a pair of mutually facing electrode plates which are contacted when the body pressure acts, thus producing a body present detection signal, and which are separated when the body pressure is released, thus producing the body absent detection signal, and power is respectively supplied to said first sensor portion and said second sensor portion via the electrode plates of said third sensor portion.

9. A mat sensor according to claim 2, wherein said body detection means has a DC power source connected to one lead of the first electrode plate of said first sensor portion, and an other lead of the first electrode plate of said first sensor portion and one lead of the second electrode plate of said first sensor portion connected together via a first resistor, and one lead of the first electrode plate of said second sensor portion connected to one lead of the second electrode plate of said second sensor portion via a second resistor, and an other lead of the second electrode plate of said first sensor portion and an other lead of the first electrode plate of said second sensor portion connected together in series, and an other lead of the second electrode plate of said second sensor portion made a detection output terminal, and said agreement or disagreement detection means comprises: a first window comparator with a first threshold value range set such that a voltage is input from the detection output terminal when the respective first and second electrode plates of said first and second sensor portions are contacted simultaneously, an agreement detection output signal of logic value 1 is produced; a second window comparator with a second threshold value range set such that a voltage is input from the detection output terminal when the respective first and second electrode plates of said first and second sensor portions are separated simultaneously, an agreement detection output signal of logic value 1 is produced; and a first logical sum operating means for carrying out a logical sum operation on the respective output signals from said first and second window comparators, and an output signal from said first logical sum operating means is output to said judgment means, and the output signal from said second window comparator is output to said sensor output generating means.

10. A mat sensor according to claim 2, wherein said body detection means comprises: an AC signal source connected between one leads of the respective electrode plates of said first and second sensor portions; first light emitting elements for ON detection of the sensor portions connected in parallel between said AC signal source and the respective sensor portions; second light emitting elements for OFF detection of the sensor portions connected in reverse current directions to said first light emitting elements between the other leads of the respective electrode plates of said first and second sensor portions; and first and second light receiving elements which respectively form photocouplers with the first and second light emitting elements of said respective sensor portions, and said agreement or disagreement detection means comprises: first logical product operating means for carrying out a logical product operation on the output signals from said respective first light receiving elements of said first and second sensor portions; second logical product operating means for carrying out a logical product operation on output signals from said respective second light receiving elements of said first and second sensor portions; and a logical sum operating means for carrying out a logical sum operation on the output signals from said first logical product operating means and said second logical product operating means, and an output signal from said logical sum operating means is output to said judgment means, and the output signal from said second logical product operating means is output to said sensor output generating means.

11. A mat sensor according to claim 2, wherein said body detection means comprises: one lead of the first electrode plate of the first sensor portion connected to a positive pole of a signal generator via a resistor, an other lead of the first electrode plate of said first sensor portion connected to one lead of the first electrode plate of the second sensor portion via a second resistor, and one lead of the second electrode plate of the first sensor portion connected to an other lead of the first electrode plate of the second sensor portion via a series circuit of a first light emitting element and a third resistor, and an other lead of the second electrode plate of the first sensor portion connected to one lead of the second electrode plate of the second sensor portion via a fourth resistor, and an other lead of the second electrode plate of the second sensor portion connected to a negative pole of said signal generator; a series circuit of a fifth resistor and second and third light emitting elements with current directions opposite to that of the first light emitting element connected in parallel with the series circuit of said third light emitting element and third resistor; and has first, second and third light receiving elements which respectively form photocouplers with the first, second and third light emitting elements of said respective sensor portions, and said agreement or disagreement means comprises a logical sum operating means for carrying out a logical sum operation on output signals from said first and second light emitting elements, and an output signal from said logical sum operating means is output to said judgment means, and an output signal from said third light receiving element is output to said sensor output generating means.

12. A mat sensor according to claim 11, wherein there is provided a current monitoring means for detecting whether or not a current equal to or greater than a predetermined level is being supplied to the first and second sensor portions, and a logical product operating means for carrying out a logical product operation on an output signal from said current monitoring means and the output signal from said logical sum operating means, and an output signal from said logical product operating means is output to said judgment means.

13. A mat sensor according to claim 2, wherein said body detection means comprising: said first and second sensor portions connected in series to an AC signal source; a first light emitting element for detecting an off condition of the first sensor portion connected in series between the first and second electrode plates of the first sensor portion via a current reducing resistor; a second light emitting element for detecting an off condition of the second sensor portion connected in series between the first and second electrode plates of the second sensor portion via a current reducing resistor, and first and second light receiving elements which respectively form photocouplers with the first and second light emitting elements of said respective sensor portions, and said agreement or disagreement detection means comprises: a logical product operating means for carrying out a logical product operation on output signals from said first and second light emitting elements; a current detection means for detecting a current flowing in a series circuit of said AC signal source and the first and second sensor portions; a current level judgment means for judging if the level of the detection current of said current detection means is equal to or above a predetermined value, and a logical sum operating means for carrying out a logical sum operation on an output signal from said logical product operating means and an output signal from the current level judgment means, and an output signal from said logical sum operating means is output to said judgment means, and the output signal from said logical product operating means is output to said sensor output generating means.

14. A mat sensor according to claim 2, wherein the first and second sensor portions of said body detection means are connected in parallel with an AC signal source; a first light emitting element for detecting an off condition of the first sensor portion connected in series between the first and second electrode plates of the first sensor portion via a current reducing resistor; a second light emitting element for detecting an off condition of the second sensor portion connected in series between the first and second electrode plates of the second sensor portion via a current reducing resistor, and first and second light receiving elements which respectively form photocouplers with the first and second light emitting elements of said respective sensor portions, and wherein said agreement or disagreement detection means comprises: a first logical product operating means for carrying out a logical product operation on output signals from said first and second light emitting elements; two current detection means for detecting currents respectively flowing in said first sensor portion and second sensor portion; two current level judging means for judging if the level of the detection currents of said two current detection means is equal to or above a respective predetermined value, and a second logical product operating means for carrying out a logical product operation on output signals from the two current detection means, and a first logical sum operating means for carrying out a logical sum operation on an output signal from said first logical product operating means and an output signal from the second logical product operating means, and output signal from said first logical sum operating means is output to said judgment means, and the output signal from said first logical product operating means is output to said sensor output generating means.

15. A mat sensor according to claim 2, wherein said body detection means is constructed with a positive pole of a DC power source connected to one lead of the first electrode plate of said first sensor portion, a first electromagnetic relay disposed in series between an other lead of the first electrode plate of said first sensor portion and one lead of the second electrode plate of said first sensor portion, a second electromagnetic relay disposed in series between one lead of the first electrode plate of said second sensor portion and one lead of the second electrode plate of the second sensor portion, an other lead of the second electrode plate of the first sensor portion and an other lead of the first electrode plate of the second sensor portion connected in series, and an other lead of the second electrode plate of the second sensor portion connected to a negative pole of the DC power source via a resistor, said agreement or disagreement detection means is constructed with a first series circuit of first make contact points of said first electromagnetic relay and first make contact points of said second electromagnetic relay, and a second series circuit of break contact points of said first electromagnetic relay and break contact points of said second electromagnetic relay connected in parallel, said judgment means comprises a third electromagnetic relay, a manual switch and a fourth electromagnetic relay, and is constructed with a series circuit of the third electromagnetic relay and an ON contact points of the manual switch connected in series to said first and second series circuits, and first make contact points of the third electromagnetic relay connected in parallel with the ON contact points of the manual switch to give self hold contact points for the third electromagnetic relay, and a series circuit of the fourth electromagnetic relay, second make contact points of the third electromagnetic relay, and OFF contact points of the manual switch connected in parallel with the first and second series circuits and the third electromagnetic relay, and said sensor output generating means comprises a series circuit of second make contact points of said first electromagnetic relay, second make contact points of said second electromagnetic relay, and make contact points of said fourth electromagnetic relay.

16. A mat sensor according to claim 2, wherein said body detection means is constructed with said first and second sensor portions connected in parallel with an AC signal source, a first electromagnetic relay connected between the first and second electrode plates of the first sensor portion via a first rectifying circuit, a primary side coil of a first transformer connected in series between the first sensor portion and the AC signal source, a second electromagnetic relay connected to a secondary side coil of said first transformer via a second rectifying circuit, a third electromagnetic relay connected between the first and second electrode plates of the second sensor portion via a third rectifying circuit, a primary side coil of a second transformer connected in series between the second sensor portion and the AC signal source, and an fourth electromagnetic relay connected to a secondary side coil of said second transformer via a fourth rectifying circuit, said agreement or disagreement detection device is constructed with a series circuit of first make contact points of said first electromagnetic relay and first make contact points of said third electromagnetic relay, and a series circuit of first make contact points of said second electromagnetic relay and first make contact points of said fourth electromagnetic relay connected in parallel, said judgment means comprises a fifth electromagnetic relay and a manual switch, and is constructed with a series circuit of the fifth electromagnetic relay and an ON contact points of the manual switch connected in series to the parallel circuit of the series circuit of the first make contact points of said first and third electromagnetic relays, and the series circuit of the first make contact points of said second and fourth electromagnetic relays, a first make contact points of said fifth electromagnetic relay connected in parallel with the ON contact points of the manual switch to give self hold contact points for the fifth electromagnetic relay, and said sensor output generating means is constructed with an OFF contact points of said manual switch connected in series to a series circuit of respective second make contact points of said first electromagnetic relay, third electromagnetic relay and fifth electromagnetic relay, wherein each relay is not susceptible to fusion faults.

17. A mat sensor according to claim 2 wherein said body detection means is constructed with said first and second sensor portions connected in parallel with an AC signal source, a first electromagnetic relay connected between the first and second electrode plates of the first sensor portion via a first rectifying circuit, a primary side coil of a first transformer connected in series between the first sensor portion and the AC signal source, an second electromagnetic relay connected to a secondary side coil of said first transformer via a second rectifying circuit, a third electromagnetic relay connected between the first and second electrode plates of the second sensor portion via a third rectifying circuit, a primary side coil of a second transformer connected in series between the second sensor portion and the AC signal source, and a fourth electromagnetic relay connected to a secondary side coil of said second transformer via an fourth rectifying circuit, said agreement or disagreement means is constructed with a series circuit of first make contact points of said first electromagnetic relay, break contact points of the second electromagnetic relay, first make contact points of the third electromagnetic relay and break contact points of the fourth electromagnetic relay, and a series circuit of break contact points of said first electromagnetic relay, first make contact points of the second electromagnetic relay, break contact points of the third electromagnetic relay, and first make contact points of the fourth electromagnetic relay, connected in parallel, said judgment means comprises fifth, sixth and seventh electromagnetic relays and a manual switch, and is constructed with a series circuit of series connected respective break contact points of said sixth and seventh electromagnetic relays and the fifth electromagnetic relay, a series circuit of parallel connected first make contact points of the fifth electromagnetic relay and first make contact points of the sixth electromagnetic relay, and the series connected sixth electromagnetic relay, and a series circuit of parallel connected second make contact points of the fifth electromagnetic relay and a first make contact points of the seventh electromagnetic relay, and the series connected seventh electromagnetic relay, connected together in parallel, and the parallel circuit of the series circuits incorporating the fifth, sixth, and seventh electromagnetic relays is connected in series to an ON contact points of said manual switch, while a series circuit of respective second make contact points of the sixth and seventh electromagnetic relays, and the first break contact points of the fifth electromagnetic relay is connected in parallel with the ON contact points of said manual switch, to thus constitute a self hold contact point circuit, and said sensor output generating means is constructed with an OFF contact points of said manual switch connected in series to a series circuit of a respective second make contact points of said first and third electromagnetic relays, respective third make contact points of the sixth and seventh electromagnetic relays, and the second break contact, points of the fifth electromagnetic relay.

18. A mat sensor according to claim 1, wherein said judgment means is constructed such that when the agreement detection information is input thereto from said agreement or disagreement detection means, said agreement detection information is self held by switching on a manual switch, and the normal judgment signal for said body detection means is then generated based on a self hold information when said manual switch is switched OFF, and when the disagreement detection information is input thereto from said agreement or disagreement detection means, the self hold information is released and said normal judgment signal is stopped.

19. A mat sensor according to claim 18 wherein said judgment means comprises: first self hold means with output information from said agreement or disagreement means input to a reset terminal, and a power source voltage signal applied to a trigger terminal via an ON contact point of a first manual switch, and the output information fed back to the trigger terminal, and a first logical product operating means for carrying out a logical product operation on the output from said first self hold means and the power source voltage signal input via an OFF contact point of said first manual switch, and an output from said first logical product operating means is made the normal judgment signal.

20. A mat sensor according to claim 19, wherein said judgment means comprises: a second self hold circuit with a power source voltage input to a reset terminal, and a power source voltage signal applied to a trigger terminal via an ON contact point of a second manual switch linked to said first manual switch, and an output therefrom fed back to the trigger terminal of said second manual switch; display means which is illuminated with an output of logic value 1 from said second self hold circuit; and a second logical product operating means for carrying out a logical product operation on the power source voltage signal input via an OFF contact point of said second manual switch and the logical product output from said first logical product operating means, and the output from said second logical product operating means is made the normal judgment signal.

21. A mat sensor according to claim 1, wherein said agreement or disagreement detection means comprises timer means for measuring running time when the detection signals from the respective sensor portions are in disagreement, and outputting the disagreement detection information to said judgment means when this time continues for at least a predetermined time.

22. A mat sensor according to claim 1, wherein said agreement or disagreement means comprises: a first logical product operating means for generating an output of logic value 1 when high level outputs of logic value 1 respectively generated from first and second sensor portions of said plurality of sensor portions when the pressure of the body acts thereon are simultaneously input; NOT operating means for carrying out a NOT operation on logical outputs from said first and second sensor portions; and a first logical sum operating means for carrying out a logical sum operation on both of outputs from said first logical product operating means and said NOT operating means, and an output signal from said first logical sum operating means is output to said judgment means, and the output signal from said first logical product operating means is output to said sensor output generating means.

23. A mat sensor according to claim 1, wherein said sensor output generating means comprises a first logical product operating means for carrying out a logical product operation on the normal judgment signal and the body absent detection signal, and an output from said first logical product operating means is made the sensor output signal.

24. A mat sensor according to claim 1, wherein electrode plate materials for the plurality of sensor portions are respectively different.

25. A mat sensor comprising mat shaped body detection means including a sensor portion with a pair of mutually facing electrode plates which are contacted when the pressure from a body acts from above, and which are separated when the pressure is released, electrostatic capacitance value detection means for detecting a change in electrostatic capacitance value based on a change in spacing between the electrode plates of the sensor portion of said body detection means, said electrostatic capacitance value detection means including a first transformer with an AC input signal applied to a primary side coil and a secondary side coil connected in series to the electrode plates of said sensor portion, and sensor output generating means for generating a sensor output indicating the presence or absence of the body based on detection results from said electrostatic capacitance value detection means wherein said electrostatic capacitance value detection means comprises a parallel resonance circuit including said first transformer with the electrode plates of said sensor portion as a capacitor, which resonates in parallel when the electrode plates of said sensor portion are separated;

wherein said sensor output generating means comprising:
a first rectifying means for rectifying an output from said parallel resonance circuit;
a first level detection means for generating an output of logic value 1 when a rectified output from said first rectifying means is equal to or greater than a predetermined level;
a first AC amplifying means for amplifying the rectified output from said first rectifying means and for magnifying along a time axis the change in the rectified output from said first rectifying means when the electrode plates of said sensor portion change from a separated condition to a contacted condition;
a second level detection means for generating an output when an amplified output from said first AC amplifying means is equal to or greater than a predetermined level; and
a first logical product operating means for carrying out a logical product operation on both of the outputs from said first and second level detection means, and an output of logic value 1 from said first logical product operating means is made the sensor output indicating the absence of the body.

26. A mat sensor according to claim 25, wherein the sensor portion of said body detection means is of a two lead construction with one lead connected to each electrode plate of a pair of opposing electrode plates, said electrostatic capacitance detection means comprises said first transformer with said secondary side coil connected in series to the two leads of the electrode plates of said sensor portion to thus constitute said parallel resonance circuit, and a detection output is taken from a point between a resistor and the primary coil of said first transformer.

27. A mat sensor according to claim 26, wherein said sensor output generating means comprises a first window comparator which generates an output of logic value 1 indicating the absence of the body when the detection output taken out from the point between the primary coil of the first transformer and the resistor of said electrostatic capacitance value detection means is within a previously set upper threshold value and lower threshold value range, and which gives an output of logic value 0 at the time of a fault.

28. A mat sensor according to claim 25, wherein the sensor portion of said body detection means is of a two lead construction with one lead connected to each electrode plate of a pair of opposing electrode plates, said electrostatic capacitance value detection means comprises said first transformer is connected in series to the two leads of the electrode plates of said sensor portion to thus constitute said parallel resonance circuit, and a detection output is taken from a tertiary coil.

29. A mat sensor according to claim 25, wherein the sensor portion of said body detection means is of a four lead construction with two leads connected to each of respective electrode plate members of a plurality of pairs of mutually opposing electrode plate members, with the electrode plate members connected in series to each other to form pairs of said electrode plates, said first transformer is connected in series to one end of said plurality of electrode plate members to thus constitute said parallel resonance circuit, and said electrostatic capacitance value detection means includes a second transformer with a primary coil connected in series to an other end of said plurality of electrode plate members, and a detection output is generated from a secondary coil of said second transformer.

30. A mat sensor according to claim 25, wherein said sensor output generating means comprises: wherein said first level detection means comprises a first window comparator for generating an output of logic value 1 when the rectified output from said first rectifying means is equal to or greater than a predetermined value, and which gives an output of logic value 0 at the time of a fault; a high frequency signal generating means for generating a high frequency signal for superimposing on the rectified output from said first rectifying means; said first AC amplifying means with the amplified output saturated when the rectified output superimposed with the high frequency signal is changing; wherein said second level detection means comprises a second rectifying means for rectifying the amplified output from said first AC amplifying means; and said first logical product operating means for carrying out the logical product operation on the rectified output from said first window comparator, and the rectified output from said second rectifying means, and the sensor output indicating the absence of the body is generated based on an output of logic value 1 from said first logical product operating means.

31. A mat sensor according to claim 30, wherein said sensor output generating means comprises: poor contact checking means for checking for the presence of poor contact of the electrode plates of said sensor portion and generating an output of logic value 1 when there is no poor contact, first logical sum operating means for carrying out a logical sum operation on the output from said poor contact checking means and the output from said first logical product operating means, first self hold means which generates an output when an input signal of logic value 1 is applied to a trigger terminal while a logical sum output from said first logical sum operating means is being input to a reset terminal, and self holds the trigger input signal, and second logical product operating means for carrying out a logical product operation on the output from said first self hold means and the output from said first logical product operating means, and an output of logic value 1 from said second logical product operating means is made the sensor output.

32. A mat sensor according to claim 31, wherein said poor contact checking means supplies a poor contact checking current to the electrode plates of said sensor portion, and checks for the presence of poor contact of the electrode plates based on the value of said poor contact checking current at the time of contact of said electrode plates, and generates an output of logic value 1 when there is no poor contact.

33. A mat sensor according to claim 32, wherein said poor contact checking means comprises: a DC power source connected in series to said electrode plates, for supplying the poor contact checking current thereto, a current detection resistor connected in series to the electrode plates, and a third level detection circuit for generating an output of logic value 1 indicating the absence of poor contact when a terminal voltage level of said current detection resistor is equal to or greater than a predetermined level.

34. A mat sensor according to claim 33, wherein said poor contact checking means is constructed with a resistor disposed in a conducting path between said DC power source and said current detecting resistor, and said third level detection circuit comprises a second window comparator for generating an output of logic value 1 when the terminal voltage level of said current detection resistor is within a previously set predetermined threshold value range.

35. A mat sensor according to claim 32, wherein said poor contact checking means comprises: an AC power source connected in series to the electrode plates, for supplying a low frequency AC poor contact checking current of lower frequency than an electrostatic capacity detection input signal; a second transformer incorporating a primary coil connected in series to the electrode plates and a secondary coil for sampling an output corresponding to the AC poor contact current flowing in said primary coil; and third level detection means for generating an output of logic value 1 indicating the absence of poor contact when an output voltage level from said second transformer is equal to or greater than a predetermined level.

36. A mat sensor according to claim 35, wherein with said poor contact checking means, has an inductance coil inserted in series in the power supply path of said poor contact checking current.

37. A mat sensor according to claim 31, wherein with said poor contact checking means, a bias voltage of a predetermined level is superimposed on the output from said first rectifying means, and there is provided a second window comparator which generates an output of logic value 1 indicating no poor contact when the output from said first rectifying means is approximately the bias voltage level, and the output from said second window comparator is input to said first logical sum operating means.

38. A mat sensor according to claim 30, wherein said sensor output generating means comprises: poor contact checking means for checking for the presence of poor contact of the electrode plates of said sensor portion and generating an output of logic value 1 when there is no poor contact, off-delay means for delaying a drop in the output from said poor contact checking means for a predetermined time, and first self hold means with an output from said off-delay means input to a trigger terminal and an output from a second logical product operating means input to a reset terminal, with an output fed back to said trigger terminal, and an output of logic value 1 from said first self hold means is made the sensor output.

39. A mat sensor according to claim 30, wherein said sensor output generating means is constructed such that a drop in an output of a logical sum of an output from a poor contact checking means which checks for the presence of poor contact of the electrode plates of said sensor portion and generates an output of logic value 1 when there is no poor contact, and an output from a second logical product operating means, is delayed for a predetermined time by an off-delay means, and an output from said off-delay means is self held by switching on a manual switch, and a normal detection signal of said sensor portion is generated based on a self hold output when said manual switch is switched OFF, and an output of a logical product operation on a normal judgment signal and the output from said second logical product operating circuit is made the sensor output.

* * * * *